US012561373B1

(12) United States Patent
Schilders

(10) Patent No.: US 12,561,373 B1
(45) Date of Patent: Feb. 24, 2026

(54) GRAPH-BASED MODELS WITH FRACTAL NODES

(71) Applicants: Infosys Limited, Bangalore (IN); InvertIT Inc., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 19/043,927

(22) Filed: Feb. 3, 2025

(51) Int. Cl.
G06F 16/901 (2019.01)
(52) U.S. Cl.
CPC ............................... G06F 16/9024 (2019.01)
(58) Field of Classification Search
None
See application file for complete search history.

(56) References Cited

U.S. PATENT DOCUMENTS

| | | | |
|---|---|---|---|
| 12,056,190 B1 | 8/2024 | Schilders | |
| 12,164,569 B2 | 12/2024 | Schilders | |
| 12,222,986 B2 | 2/2025 | Schilders | |
| 12,229,191 B2 | 2/2025 | Schilders | |
| 2022/0036270 A1* | 2/2022 | Benyo | ................... G06F 9/5027 |
| 2023/0394722 A1* | 12/2023 | Shrivastava | .......... G06F 16/288 |
| 2024/0256369 A1 | 8/2024 | Schilders | |
| 2024/0256603 A1 | 8/2024 | Schilders | |
| 2024/0257417 A1 | 8/2024 | Schilders | |
| 2024/0288841 A1 | 8/2024 | Schilders | |
| 2024/0289311 A1 | 8/2024 | Schilders | |
| 2024/0289390 A1 | 8/2024 | Schilders | |
| 2024/0296185 A1 | 9/2024 | Schilders | |

* cited by examiner

*Primary Examiner* — Eddy Cheung
(74) *Attorney, Agent, or Firm* — Finnegan, Henderson, Farabow, Garrett & Dunner, LLP

(57) ABSTRACT

An overlay system is provided that includes a storage element and processing circuitry coupled thereto. The storage element stores an executable graph-based model having various fractal nodes and various connection links. The processing circuitry receives a stimulus and identifies a first fractal node based on the stimulus. The first fractal node includes various bi-directional nodes and connection links. Further, the processing circuitry determines a set of bi-directional nodes and a set of connection links from the first fractal node for processing the stimulus. The set of connection links couples the set of bi-directional nodes to each other. Additionally, the processing circuitry executes an operation associated with the stimulus based on the determined bi-directional nodes and connection links.

20 Claims, 19 Drawing Sheets

300B

400B

800B

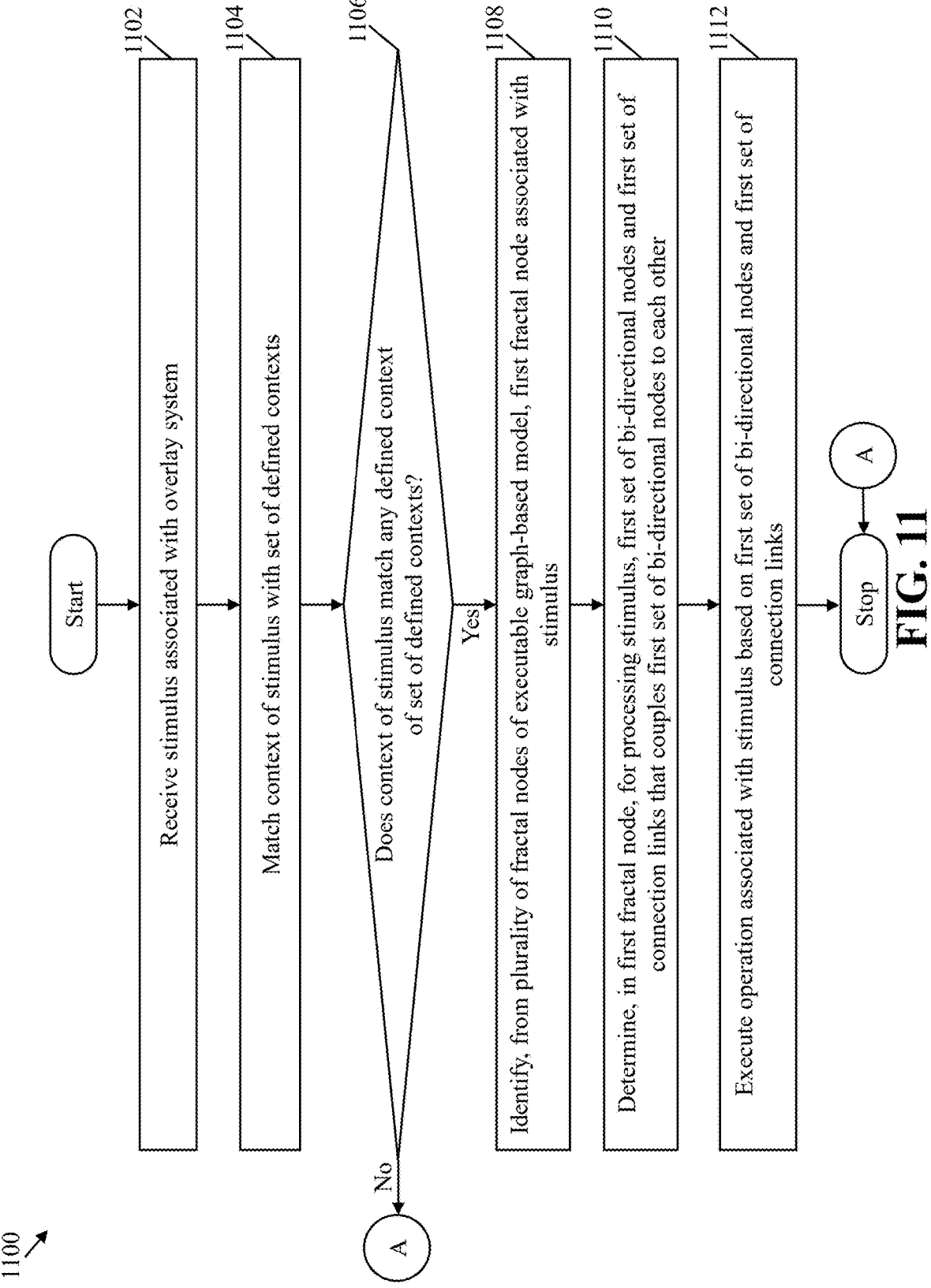

1100

Start

1102 — Receive stimulus associated with overlay system

1104 — Match context of stimulus with set of defined contexts

1106 — Does context of stimulus match any defined context of set of defined contexts?

No → A

Yes

1108 — Identify, from plurality of fractal nodes of executable graph-based model, first fractal node associated with stimulus 1110 — Determine, in first fractal node, for processing stimulus, first set of bi-directional nodes and first set of connection links that couples first set of bi-directional nodes to each other 1112 — Execute operation associated with stimulus based on first set of bi-directional nodes and first set of connection links Stop

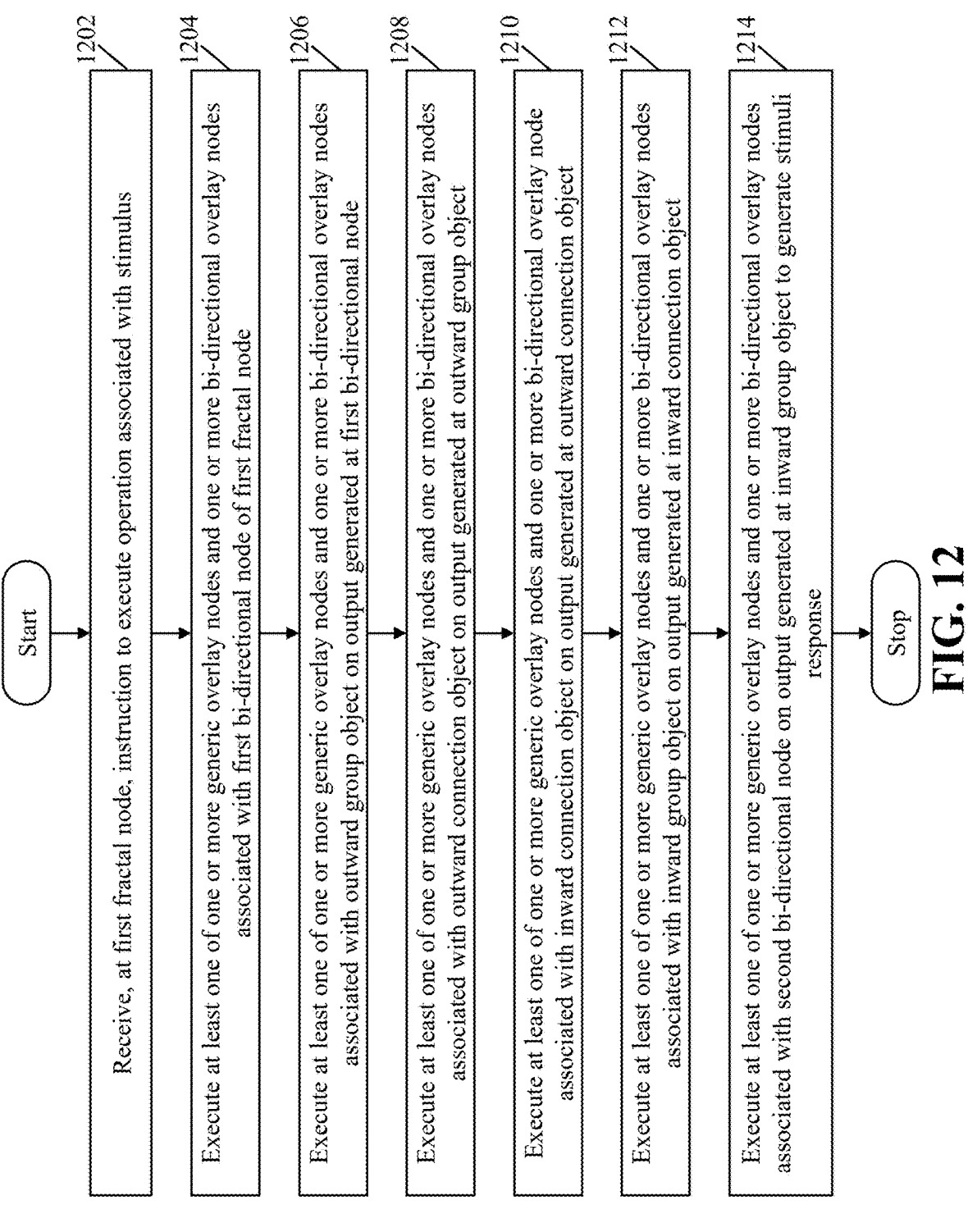

1200

1202 Start

Receive, at first fractal node, instruction to execute operation associated with stimulus 1204 Execute at least one of one or more generic overlay nodes and one or more bi-directional overlay nodes associated with first bi-directional node of first fractal node 1206 Execute at least one of one or more generic overlay nodes and one or more bi-directional overlay nodes associated with outward group object on output generated at first bi-directional node 1208 Execute at least one of one or more generic overlay nodes and one or more bi-directional overlay nodes associated with outward connection object on output generated at outward group object 1210 Execute at least one of one or more generic overlay nodes and one or more bi-directional overlay node associated with inward connection object on output generated at outward connection object 1212 Execute at least one of one or more generic overlay nodes and one or more bi-directional overlay nodes associated with inward group object on output generated at inward connection object 1214 Execute at least one of one or more generic overlay nodes and one or more bi-directional overlay nodes associated with second bi-directional node on output generated at inward group object to generate stimuli response Stop

FIG. 12

GRAPH-BASED MODELS WITH FRACTAL NODES

FIELD OF THE DISCLOSURE

Various embodiments of the present disclosure relate generally to graph-based models. More specifically, various embodiments of the present disclosure relate to executable graph-based models with fractal nodes.

BACKGROUND

With exponential growth in the field of computing, graph-based models have found their application in numerous domains leading to various technologies being implemented using graph-based models. A technology that is implemented by way of a graph-based model has each unit associated therewith realized as a node of the graph-based model. Such use of the graph-based model enables complete control over even the smallest unit of the technology. Data and processing logic associated with the technology are stored in the graph-based model in the form of nodes. This allows for the data and processing logic to be used by accessing relevant nodes. Typically, for optimized use of resources, some nodes may be unloaded from the graph-based model when not used for a specific time duration. Such a configuration requires frequent retrieving and re-loading of each node required for a specific operation, individually in the graph-based model prior to use, as each node is at the same granularity in the graph-based model. Thus, such graph-based models may be rendered complicated, time-intensive, cost-intensive, and inconvenient to use.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating fractal nodes in executable graph-based models are provided substantially as shown in, and described in connection with, at least one of the figures.

Certain embodiments of the disclosure may disclose an overlay system. The overlay system comprises a storage element and processing circuitry that is coupled to the storage element. The storage element is configured to store an executable graph-based model that includes a plurality of fractal nodes. The processing circuitry is configured to receive a stimulus associated with the overlay system. The processing circuitry is further configured to identify, based on the stimulus, a first fractal node from the plurality of fractal nodes. The first fractal node includes a first plurality of bi-directional nodes and a first plurality of connection links. The processing circuitry is further configured to determine, in the first fractal node, for processing the stimulus, (i) a first set of bi-directional nodes of the first plurality of bi-directional nodes, and (ii) a first set of connection links, of the first plurality of connection links, that couples the first set of bi-directional nodes to each other. The processing circuitry is further configured to execute an operation associated with the stimulus based on the first set of bi-directional nodes and the first set of connection links.

In some embodiments, the first set of bi-directional nodes includes a first bi-directional node and a second bi-directional node that are coupled by way of a first connection link of the first set of connection links. Further, the first connection link includes a first outward connection object and a first inward connection object that define association with the first bi-directional node and the second bi-directional node, respectively.

In some embodiments, the executable graph-based model further includes a plurality of overlay nodes. The processing circuitry is further configured to identify, from the plurality of overlay nodes, a first set of overlay nodes that is associated with the first fractal node. The first set of overlay nodes is configured to extend the functionality of at least one of a group consisting of the first fractal node or one or more bi-directional nodes of the first set of bi-directional nodes. Additionally, the operation associated with the stimulus is executed further based on the first set of overlay nodes.

In some embodiments, the processing circuitry is further configured to identify, from the plurality of overlay nodes, a second set of overlay nodes that is associated with a first bi-directional node of the first set of bi-directional nodes. Further, the second set of overlay nodes is configured to extend the functionality of the first bi-directional node. During the execution of the operation associated with the stimulus, the first set of overlay nodes overrides the second set of overlay nodes.

In some embodiments, the first set of overlay nodes extends the functionality of at least one of the group consisting of the first fractal node or the one or more bi-directional nodes based on a set of rules associated with each overlay node of the first set of overlay nodes.

In some embodiments, an overlay node of the plurality of overlay nodes corresponds to one of a group consisting of a bi-directional overlay node or a generic overlay node.

In some embodiments, the executable graph-based model further includes a plurality of overlay nodes. The processing circuitry is further configured to identify, from the plurality of overlay nodes, a set of overlay nodes that is associated with a first bi-directional node of the first set of bi-directional nodes. The set of overlay nodes is configured to extend functionality of the first bi-directional node and the operation associated with the stimulus is executed further based on the set of overlay nodes.

In some embodiments, the first set of bi-directional nodes includes a first bi-directional node. The executable graph-based model further includes a third bi-directional node and a second connection link that couples the first bi-directional node to the third bi-directional node. The second connection link includes a second inward connection object and a second outward connection object that define association with the first bi-directional node and the third bi-directional node, respectively. The operation associated with the stimulus is executed further based on the third bi-directional node and the second connection link.

In some embodiments, the first bi-directional node is public such that the coupling between the first bi-directional node and the third bi-directional node corresponds to a direct coupling.

In some embodiments, the first bi-directional node is private such that the coupling between the first bi-directional node and the third bi-directional node corresponds to an indirect coupling. The first fractal node further includes a first port that is configured to facilitate the indirect coupling between the first bi-directional node and the third bi-directional node. The operation associated with the stimulus is executed further based on the first port.

In some embodiments, the first port is further configured to expose the second inward connection object to the third bi-directional node.

In some embodiments, the executable graph-based model further includes a fourth bi-directional node and a third connection link that couples the first bi-directional node to the fourth bi-directional node. The third connection link includes a third inward connection object and a third outward connection object that define association with the first bi-directional node and the fourth bi-directional node, respectively. The second inward connection object and the third inward connection object constitute a first inward group object associated with the first bi-directional node. The operation associated with the stimulus is executed further based on the first inward group object, the fourth bi-directional node, and the third connection link.

In some embodiments, the first port is further configured to expose the first inward group object to the third bi-directional node and the fourth bi-directional node.

In some embodiments, the executable graph-based model further includes a plurality of overlay nodes. The processing circuitry is further configured to identify, from the plurality of overlay nodes, a set of overlay nodes that is associated with the first inward group object. The set of overlay nodes is configured to extend the functionality of the first inward group object, and the operation associated with the stimulus is executed further based on the set of overlay nodes.

In some embodiments, the first set of bi-directional nodes includes a first bi-directional node. The executable graph-based model further includes (i) a fifth bi-directional node, (ii) a fourth connection link that couples the first bi-directional node to the fifth bi-directional node, (iii) a sixth bi-directional node, (iv) a fifth connection link that couples the first bi-directional node to the sixth bi-directional node. The fourth connection link includes a fourth outward connection object and a fourth inward connection object that define association with the first bi-directional node and the fifth bi-directional node, respectively. The fifth connection link includes a fifth outward connection object and a fifth inward connection object that define association with the first bi-directional node and the sixth bi-directional node, respectively. The fourth outward connection object and the fifth outward connection object constitute a first outward group object associated with the first bi-directional node. The operation associated with the stimulus is executed further based on the first outward group object, the fifth bi-directional node, the sixth bi-directional node, the fourth connection link, and the fifth connection link.

In some embodiments, the executable graph-based model further includes a plurality of overlay nodes. The processing circuitry is further configured to identify, from the plurality of overlay nodes, a set of overlay nodes that is associated with the first outward group object. The set of overlay nodes is configured to extend the functionality of the first outward group object, and the operation associated with the stimulus is executed further based on the set of overlay nodes.

In some embodiments, the executable graph-based model further includes a second plurality of connection links. The processing circuitry is further configured to determine a sixth connection link, of the second plurality of connection links, that is coupled to the first fractal node, the sixth connection link including a sixth outward connection object defining association with the first fractal node and a sixth inward connection object defining association with a second fractal node of the plurality of fractal nodes. The processing circuitry is further configured to identify, based on the sixth connection link, the second fractal node in the executable graph-based model. The operation associated with the stimulus is executed further based on the second fractal node and the sixth connection link.

In some embodiments, the second fractal node includes a second plurality of bi-directional nodes and a third plurality of connection links. The processing circuitry is further configured to determine, in the second fractal node, for processing the stimulus, (i) a second set of bi-directional nodes of the second plurality of bi-directional nodes, and (ii) a second set of connection links, of the third plurality of connection links, that couples the second set of bi-directional nodes to each other. The operation associated with the stimulus is executed further based on the second set of bi-directional nodes and the second set of connection links.

In some embodiments, the first set of bi-directional nodes and the second set of bi-directional nodes include at least one common bi-directional node.

In some embodiments, the sixth outward connection object and the sixth inward connection object have a primary role and a secondary role, respectively. The primary role and the secondary role, collectively, indicate a capacity in which the first fractal node and the second fractal node are mutually associated. The operation associated with the stimulus is executed in conformity with the primary role and the secondary role.

In some embodiments, the primary role and the secondary role are complementary.

In some embodiments, the sixth connection link is a bi-directional node with a role node-type.

In some embodiments, the sixth connection link is indicative of a dependency between the first fractal node and the second fractal node. The dependency between the first fractal node and the second fractal node is one of a group consisting of an own-owned dependency, a use-used dependency, or a share-shared dependency.

In some embodiments, based on the dependency being the own-owned dependency, the first fractal node owns the second fractal node.

In some embodiments, based on the dependency being the share-shared dependency, the first fractal node shares the second fractal node with one or more fractal nodes of the plurality of fractal nodes.

In some embodiments, based on the dependency being the use-used dependency, the first fractal node uses the second fractal node based on an absence of simultaneous use of the second fractal node by one or more other fractal nodes of the plurality of fractal nodes.

In some embodiments, the first fractal node is further coupled to a third fractal node of the plurality of fractal nodes by way of a seventh connection link of the second plurality of connection links. The seventh connection link includes a seventh outward connection object and a seventh inward connection object that define association with the first fractal node and the third fractal node, respectively. The sixth outward connection object and the seventh outward connection object constitute a second outward group object associated with the first fractal node. The operation associated with the stimulus is executed further based on the second outward group object, the third fractal node, and the seventh connection link.

In some embodiments, the executable graph-based model further includes a plurality of overlay nodes. The processing circuitry is further configured to identify, from the plurality of overlay nodes, a set of overlay nodes that is associated with the second outward group object. The set of overlay nodes is configured to extend the functionality of the second outward group object, and the operation associated with the stimulus is executed further based on the set of overlay nodes.

In some embodiments, the executable graph-based model further includes a second plurality of connection links that include (i) an eighth connection link that couples the first fractal node to a fourth fractal node of the plurality of fractal nodes and (ii) a ninth connection link that couples the first fractal node to a fifth fractal node of the plurality of fractal nodes. The eighth connection link includes an eighth inward connection object and an eighth outward connection object that define association with the first fractal node and the fourth fractal node, respectively. The ninth connection link includes a ninth inward connection object and a ninth outward connection object that define association with the first fractal node and the fifth fractal node, respectively. The eighth inward connection object and the ninth inward connection object constitute a second inward group object associated with the first fractal node. The operation associated with the stimulus is executed further based on the second inward group object, the fourth fractal node, the fifth fractal node, the eighth connection link, and the ninth connection link.

In some embodiments, the executable graph-based model further includes a plurality of overlay nodes. The processing circuitry is further configured to identify, from the plurality of overlay nodes, a set of overlay nodes that is associated with the second inward group object. The set of overlay nodes is configured to extend the functionality of the second inward group object, and the operation associated with the stimulus is executed further based on the set of overlay nodes.

In some embodiments, the first fractal node further includes a set of fractal nodes of the plurality of fractal nodes, and the operation associated with the stimulus is executed further based on the set of fractal nodes.

In some embodiments, each fractal node of the plurality of fractal nodes is a run-time node that includes a node template and a node instance, where the node template corresponds to a predefined node structure, whereas the node instance corresponds to an implementation of the node template.

In some embodiments, prior to the execution of the operation associated with the stimulus, the processing circuitry is further configured to load, in the executable graph-based model, the first fractal node.

In some embodiments, prior to the execution of the operation associated with the stimulus, the processing circuitry is further configured to identify, at least one of a group consisting of: (i) one or more fractal nodes, (ii) one or more bi-directional nodes, or (iii) one or more overlay nodes, associated with the first fractal node, based on the stimulus. The processing circuitry is further configured to load, in the executable graph-based model, at least one of the group consisting of (i) the one or more fractal nodes, (ii) the one or more bi-directional nodes, or (iii) the one or more overlay nodes, associated with the first fractal node.

In some embodiments, upon execution of the operation associated with the stimulus, the processing circuitry is further configured to unload the first fractal node from the executable graph-based model.

In some embodiments, upon execution of the operation associated with the stimulus, the processing circuitry is further configured to unload at least one of a group consisting of (i) one or more fractal nodes, (ii) one or more bi-directional nodes, or (iii) one or more overlay nodes, associated with the first fractal node, from the executable graph-based model.

In some embodiments, the first fractal node is associated with a predefined operation.

In some embodiments, the executable graph-based model further includes a plurality of generic nodes. A node-type of each generic node of the plurality of generic nodes is one of a group consisting of a vertex node-type, an edge node-type, a role node-type, or an overlay node-type. The first fractal node is associated with a first generic node of the plurality of generic nodes by way of a first generic role that indicates a capacity in which the first fractal node is associated with the first generic node. The operation associated with the stimulus is executed further based on the first generic node and the first generic role.

In certain additional embodiments, a method is disclosed. The method comprises receiving, by processing circuitry of an overlay system, a stimulus associated with the overlay system. An executable graph-based model is stored in a storage element of the overlay system and the executable graph-based model includes a plurality of fractal nodes. The method further includes identifying, by the processing circuitry, based on the stimulus, a first fractal node from the plurality of fractal nodes. The first fractal node includes a first plurality of bi-directional nodes and a first plurality of connection links. The method further includes determining, by the processing circuitry, from the first fractal node, for processing the stimulus, a first set of bi-directional nodes, and a first set of connection links that couples the first set of bi-directional nodes to each other. The method further includes executing, by the processing circuitry, an operation associated with the stimulus based on the first set of bi-directional nodes and the first set of connection links.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 11 illustrates a flowchart of a method for processing a stimulus using a fractal node, consistent with disclosed embodiments of the present disclosure; and FIG. 12 illustrates a flowchart of a method for execution of operation associated with a stimulus using the executable graph-based model, consistent with disclosed embodiments of the present disclosure.

DETAILED DESCRIPTION

Figure 1:
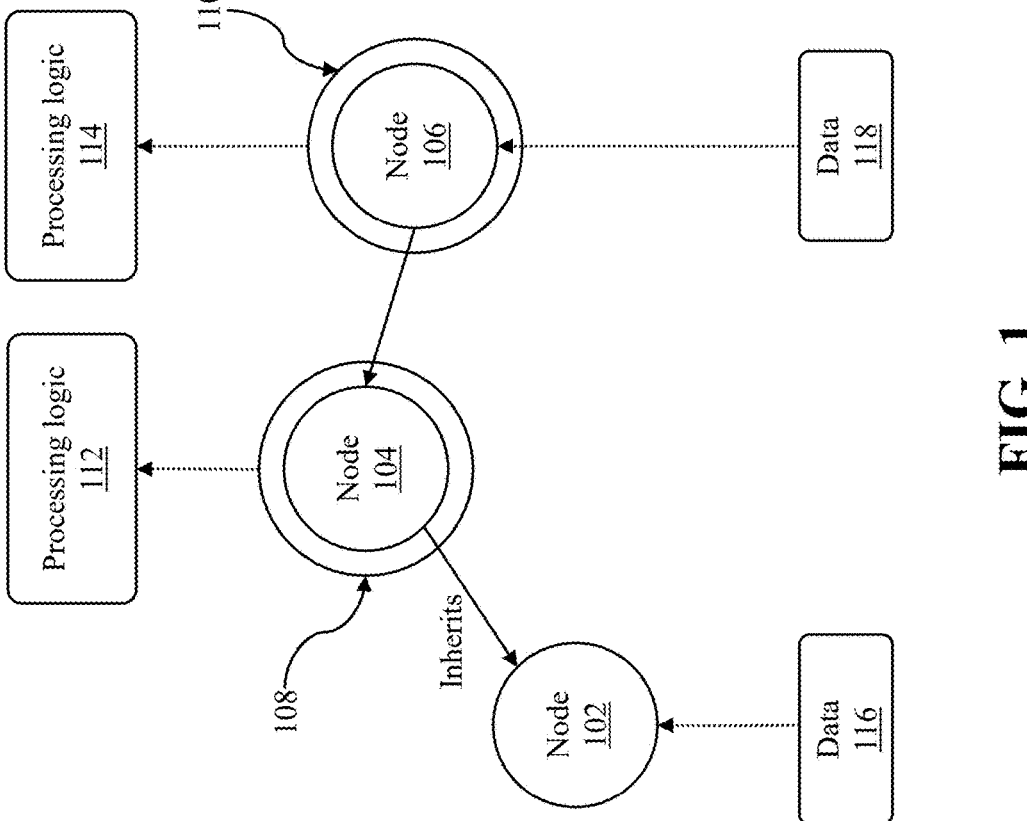
FIG. 1 is a graph that illustrates a composition of an executable graph-based model, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Traditionally, graph-based models are used to implement systems associated with various domains such as neural networks, artificial intelligence, database models, or the like. In a graph-based model, data and processing logic are stored in the form of nodes. This allows for the data and processing logic to be used by accessing relevant nodes. Further, while using one node, other associated nodes may also be required to be used. Typically, for a node to be used, the node is required to be loaded in the graph-based model. While loading the node, a look-up operation may be performed to determine association of the node with the other nodes, and based on the identification, the associated nodes may also be loaded. The need to perform lookup operations to identify connected nodes can be time-consuming and resource-intensive, leading to increased costs and execution time. In real-world scenarios, especially when a large number of nodes are interconnected, this can result in significant latency, which negatively impacts overall system performance. Additionally, some nodes of the graph-based model may be associated with frequently executed system operations, and hence, may be frequently retrieved and accessed. Furthermore, the nodes associated with a few frequently executed system operations may involve complex connections and interactions that are exposed to all other nodes in the graph-based model, thereby there is no scope to hide any complex connections and interactions in the graph-based model. Moreover, in many instances, the same processing logic may be required to be executed on multiple nodes of the graph-based model, and hence, the processing logic may be retrieved and executed separately for each node. Such frequent retrieval may lead to significant time and cost complexity.

The present disclosure is directed to the facilitation of fractal nodes in an executable graph-based model of an overlay system. The executable graph-based model is a customized hypergraph with hyper-edges that are realized by way of executable nodes. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features in the overlay system. Each overlay node is associated with one or more nodes (for example, a vertex node, an edge node, or the like) of the executable graph-based model and includes a processing logic that when executed implements a functionality thereof on the associated nodes. Hence, the processing logic is implemented within the executable graph-based model and is not required to be retrieved from any external system.

The overlay system disclosed herein facilitates fractal nodes in the executable graph-based model. A fractal node includes various bi-directional nodes that are associated with one or more predefined operations. In other words, a fractal node may be indicative of one or more frequently executed operations. A bi-directional node is realized by way of a hyper-edge in the executable graph-based model. A bi-directional node may be associated with another bi-directional node by way of a connection link that includes an outward connection object and an inward connection object. The outward connection object may indicate how the bi-directional node is associated with the other bi-directional node, whereas the inward connection object may indicate how the other bi-directional node is associated with the bi-directional node. Therefore, the connection link is indicative of a capacity in which the two bi-directional nodes are mutually associated. Additionally, the fractal node may be associated with one or more overlay nodes. Processing logic associated with the one or more overlay nodes may be applied to the fractal node and one or more bi-directional nodes of the fractal node.

A fractal node including two or more bi-directional nodes may be loaded in the executable graph-based model depending on the execution requirement. For example, when all the bi-directional nodes of the fractal node are required for execution of an operation, only the fractal node may be retrieved, and the processing logic may be executed directly on the fractal node. In such a scenario, a single transaction is executed for the retrieval of the fractal node. Thus, the time required for loading each bi-directional node and executing the processing logic on each bi-directional node is saved. Further, as the same processing logic is required to be executed on various bi-directional nodes of the fractal node, the execution of the processing logic on the fractal node significantly reduces duplication within the executable graph-based model and optimizes resource utilization within the overlay system. In some embodiments, the bi-directional nodes of the fractal node may not be exposed to one or more nodes (e.g., fractal nodes or bi-directional nodes) that are coupled to the fractal node in the executable graph-based model. In other words, complex connections and interactions between the bi-directional nodes of the fractal nodes are isolated from the one or more nodes. Therefore, any confidential operations in the fractal node remain protected, thereby strengthening the security of the overlay system. Additionally, the fractal node corresponds to a high-level node that is optimized to perform one or more complex operations in an efficient way in comparison to independent nodes that are at the same granularity and are coupled to each other to perform various operations.

Presently, the conventional graph-based models do not have a high-level node structure. Therefore, each node is separately looked up and loaded into the graph-based model, and the processing logic is executed on each node separately which adds to the time and cost associated with the execution of the processing logic. Additionally, in the conventional graph-based models, all the nodes are at the same granularity. Further, a provision to isolate any complex connections and interactions in the graph-based model is not available in the conventional graph-based models. In the present disclosure, an overlay node, that includes processing logic to be executed on the nodes, may be associated with the fractal node. Thus, the processing logic is executed exclusively on the fractal node. Hence, the executable graph-based model is simplified and the time and cost associated with the execution of the processing logic are optimized. Further, in the present disclosure, bi-directional nodes of the fractal node are associated with each other by way of connection links. Thus, while loading one bi-directional node, the associated connection link is also loaded, and based on the reference to the other bi-directional node in the connection link, the other bi-directional node is also loaded. Hence, the node loading operation of the present disclosure is simplified and expedited as compared to that in the conventional graph-based models where one node is loaded, and a lookup operation is then executed to identify other connected nodes. Additionally, the fractal node provides a provision to isolate one or more operations in the fractal node from remaining nodes in the executable graph-based model, thereby strengthening the security of the overlay system. Furthermore, the use of fractal nodes in the executable graph-based model simplifies complex connections and operations in the executable graph-based model.

Notably, the present disclosure allows for the fractal nodes within the executable graph-based model of the overlay system. Each fractal node includes bi-directional nodes that are coupled to each other by way of connection links. This allows the fractal node to exhibit a high-level node behavior that is a culmination of node behaviors of each constituent bi-directional node. Thus, the fractal nodes simplify a previously complex structure of the executable graph-based model. Based on an association of an overlay node with the fractal node, the processing logic associated with the overlay node may be executed on the bi-directional nodes included in the fractal node. Hence, the overlay node is required to be coupled only with the fractal node to be logically associated with each bi-directional node of the fractal node. Such a use of the fractal node allows the overlay node to be associated with only one node (i.e., the fractal node) which further simplifies the structure of the executable graph-based model. In another instance, frequently executed operations may use bi-directional nodes of the fractal node. Therefore, the fractal node allows for easy retrieval and execution of the processing logic using bi-directional nodes as opposed to complicated and time-consuming separate retrieval of each node and processing logic. Hence, time complexity and cost complexity for execution of the processing logic is significantly reduced.

It is appreciated that the human mind is not equipped to identify the fractal node associated with the stimulus from a high volume of fractal nodes present in the overlay system, determine bi-directional nodes and connection links associated with the bi-directional nodes for processing the stimulus, and execute the operation associated with the stimulus utilizing the determined bi-directional nodes and the connection links. It is appreciated that the approaches discussed herein improve the technical field of computer performance by reducing time complexity.

FIGURE DESCRIPTION

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
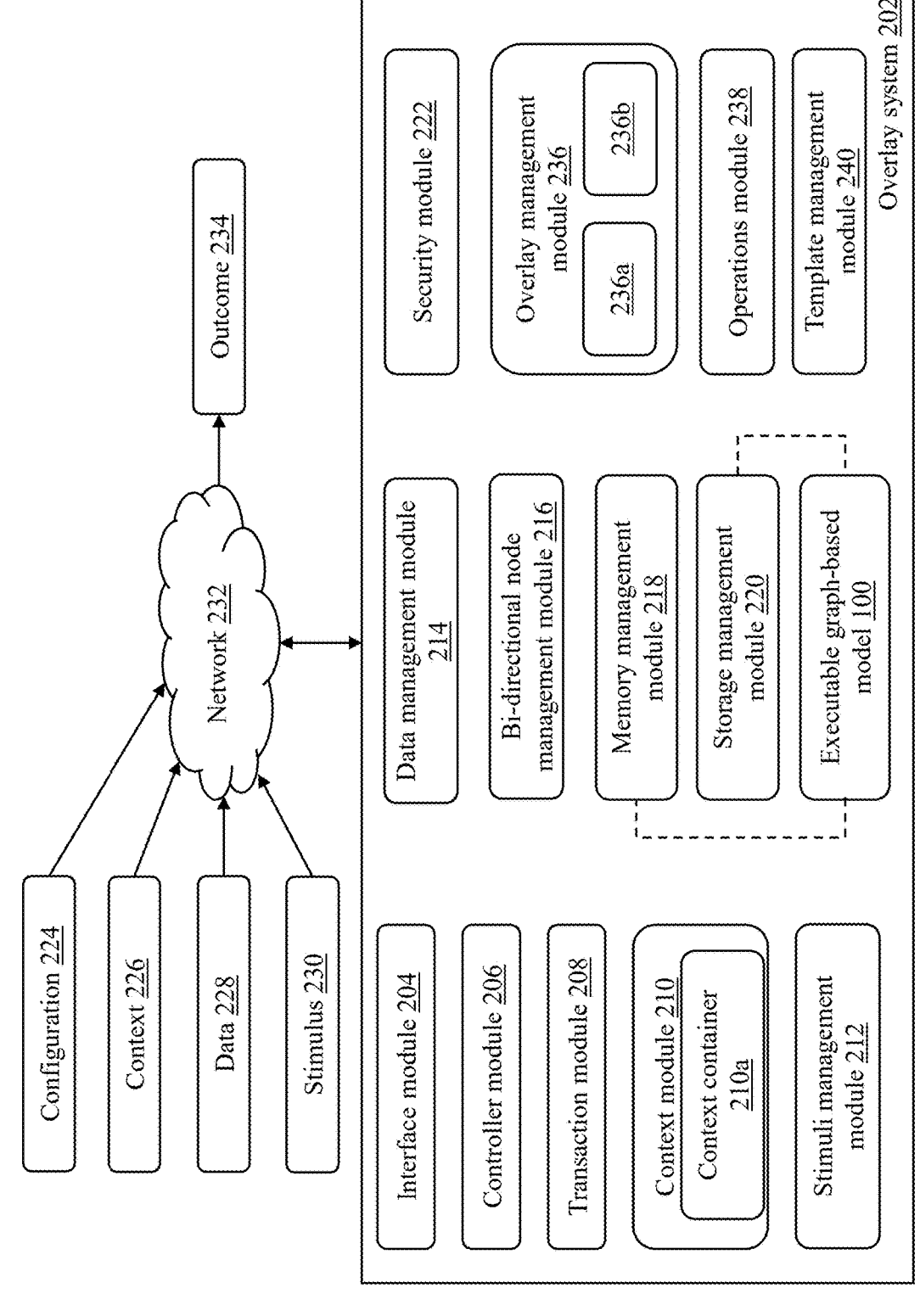
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a data management module 214, a bi-directional node management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes an overlay management module 236, an operations module 238, and a template management module 240. In some embodiments, all the modules of the overlay system 202 except for the executable graph-based model 100 may collectively form processing circuitry that facilitates operations associated with a plurality of nodes including generic nodes, bi-directional nodes, and fractal nodes, in the executable graph-based model 100. A generic node may refer to a node, in the executable graph-based model 100, with an edge node-type, a role node-type, or a vertex node-type. A generic node with the vertex node-type is coupled to another generic node with the vertex node-type by way of a node with the edge node-type indicative of a role of the generic node. A bi-directional node refers to a node with an edge node-type that associates with another bi-directional node by way of a connection link that includes a primary role for the bi-directional node and a secondary role for the other bi-directional node. A fractal node refers to a bi-directional node that includes two or more bi-directional nodes. A fractal node may be associated with a predefined operation. That is to say, the fractal node may include a plurality of bi-directional nodes that are associated with a predefined operation of a plurality of predefined operations associated with the overlay system 202. In an example, the fractal node may include the plurality of bi-directional nodes that are associated with feature extraction for image classification.

The overlay system 202 may include suitable logic, circuitry, interfaces, and/or code, executable by the circuitry, that may be configured to facilitate one or more operations associated with the bi-directional nodes in the executable graph-based model 100.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts (such as the context 226) provide the basis for all interactions within the executable graph-based model 100. Processing of such stimuli may lead to the execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in the event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as username, password, access token, device information, time stamp, one or more relevant identifiers (IDs), or the like, that are required for processing of the stimulus 230 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

As shown, the context module 210 includes a context container 210a that includes a set of defined contexts. Each defined context of the set of defined contexts pertains to a context that is associated with one or more operations for facilitating the application and management of the plurality of nodes (for example, the fractal nodes) in the overlay system 202. That is say that one or more contexts of the set of defined contexts are indicative of the one or more operations to be executed by way of one or more fractal nodes in the overlay system 202. The one or more operations are executed when a context of a corresponding stimuli matches one of the set of defined contexts.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a signal, a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on the processing of data by any of its nodes. In some examples, the processing of a stimulus (such as the stimulus 230) results in the generation, communication, or processing of data that further results in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The data management module 214 may include suitable logic, circuitry, interfaces, and/or code, executable by the circuitry, configured to manage all data or information within the overlay system 202 (e.g., the data 228) for a given application. Operations performed by the data management module 214 include data loading, data unloading, data modeling, and data processing. The data management module 214 is communicatively coupled (e.g., connected either directly or indirectly) to one or more other modules within the overlay system 202 to complete some or all of these operations. For example, data storage is handled by the data management module 214 in conjunction with the storage management module 220.

The bi-directional node management module 216 may include suitable logic, circuitry, interfaces, and/or code, executable by the circuitry, configured to manage design and implementation of bi-directional nodes and fractal nodes in the overlay system 202. The bi-directional node management module 216 is further configured to facilitate one or more operations associated with the execution of one or more operations associated with the fractal nodes and/or bi-directional nodes.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100. Throughout the description, the terms 'overlay' and 'overlay node' are used interchangeably.

The storage management module 220 may include suitable logic, circuitry, interfaces, and/or code, executable by the circuitry, configured to manage the temporary or permanent storage of data associated with the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device that stores the executable graph-based model 100. The overlay system 202 further includes a plurality of manifest storages. The manifest storages are used by the memory management module 218 and the storage management module 220 to facilitate the storage of manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 5.

The security module 222 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the overlay management module 236 for managing and executing security-based overlays.

The overlay management module 236 may include suitable logic, circuitry, interfaces, and/or code, executable by the circuitry, configured to manage all overlays within the overlay system 202. The overlays may be generic overlays or bi-directional overlays. Generic overlays are associated with generic nodes and/or bi-directional nodes and extend the functionality of the generic nodes and/or bi-directional nodes. Generic nodes are nodes of the executable graph-based model 100 that are not bi-directional nodes. Bi-directional overlays are nodes that are associated with one or more bi-directional nodes by way of a direct connection or a connection link. A bi-directional overlay may be associated with a bi-directional node by extending the functionality of the bi-directional node. Alternatively, the bi-directional overlay node may be associated with the bi-directional node by way of a connection link such that the connection link includes a primary role for the bi-directional node and a secondary role for the bi-directional overlay. Operations performed by the overlay management module 236 include overlay storage management, overlay system modeling, overlay logic creation and execution, and overlay loading and unloading (within the executable graph-based model 100). The overlay management module 236 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The overlay management module 236 may include a generic overlay management sub-module 236a and a bi-directional overlay management sub-module 236b. The generic overlay management sub-module 236a is configured to perform operations of the overlay management module 236 that are associated with the generic overlays. The bi-directional overlay management sub-module 236b is configured to perform operations of the overlay management module 236 that are associated with the bi-directional overlays.

The operations module 238 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The template management module 240 may include suitable logic, circuitry, interfaces, and/or code, executable by the circuitry, configured to enable the overlay system 202 to implement a templated version of one or more nodes of the executable graph-based model 100. The template management module 240 may be configured to create one or more predefined templates in the executable graph-based model 100. The template management module 240 may be further configured to generate one or more node instances of the predefined templates for the implementation of a templated version of the executable graph-based model 100. Notably, the template management module 240 ensures ontology integrity by enforcing the structure and rules of a template when generating instances of the template at run-time. Ontology integrity refers to the consistency, accuracy, and correctness of an ontology. Thus, the template management module 240 ensures that the consistency, accuracy, and correctness of the ontology of the executable graph-based model 100 is maintained while generating the instances of the template at run-time. The template management module 240 may be communicatively coupled (i.e., connected either directly or indirectly) to one or more nodes and/or one or more overlays within the executable graph-based model 100.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or functional programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model 100 are implemented as nodes. As will become clear, this allows executable graph-based models to be flexible, extensible, and highly configurable.

Figure 3A:
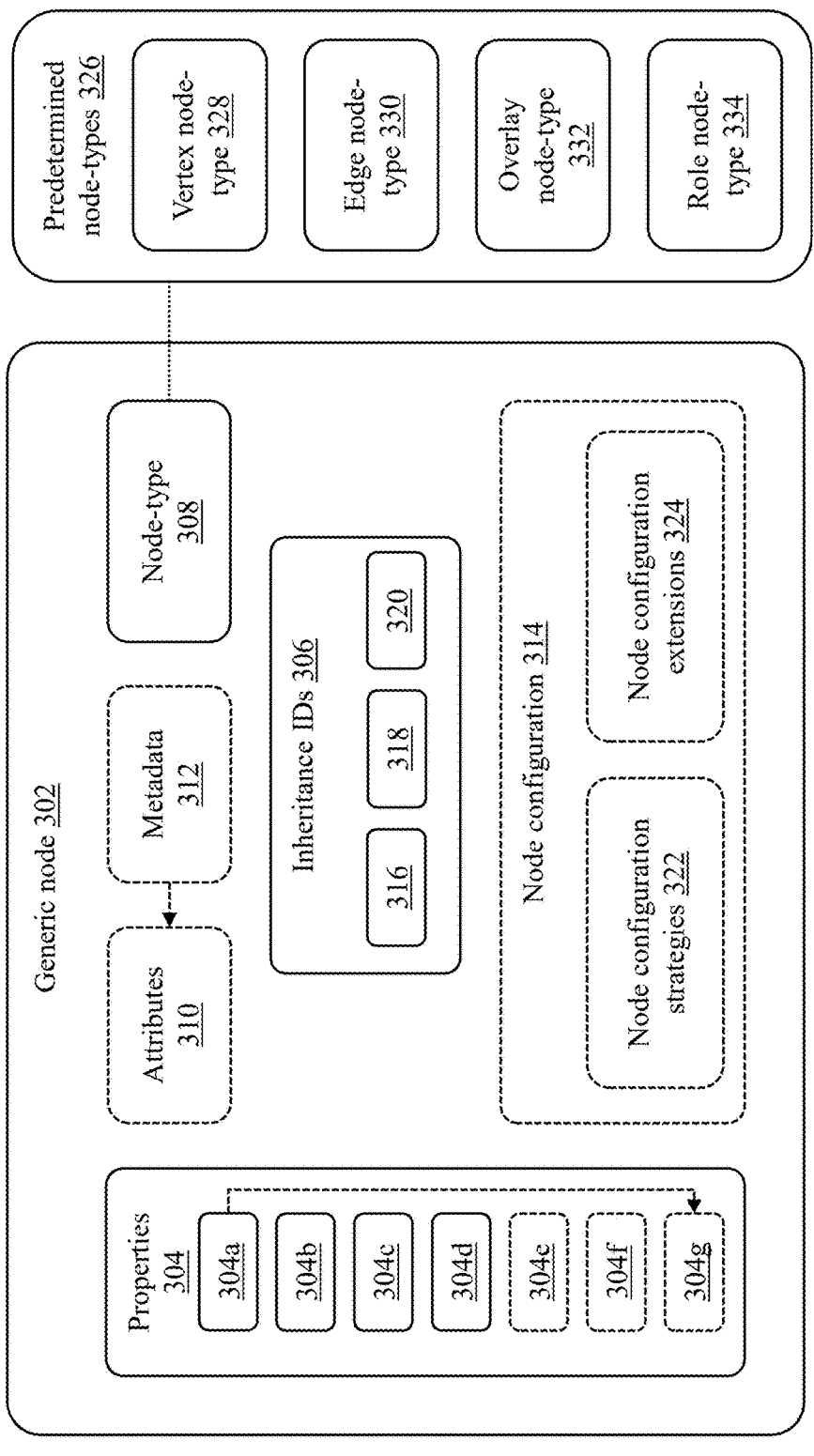
FIG. 3A is a block diagram that illustrates a structure of a generic node within the executable graph-based model, consistent with disclosed embodiments of the present disclosure.

FIG. 3A is a block diagram 300A that illustrates a structure of a generic node 302 within the executable graph-based model 100, consistent with disclosed embodiments of the present disclosure. Referring to FIG. 3A, the generic node 302 corresponds to a generic node of the executable graph-based model 100. The generic node 302 further corresponds to the core structure of the executable graph-based model 100 and forms the foundational building block for all data and processing logic within the executable graph-based model 100. The generic node 302 includes properties 304, inheritance IDs 306, and a node-type 308. The generic node 302 optionally includes one or more attributes 310, metadata 312 associated with the attributes 310, and a node configuration 314.

The properties 304 of the generic node 302 include a unique ID 304a, a version ID 304b, a namespace 304c, and a name 304d. The properties 304 optionally include one or more icons 304c, one or more labels 304f, and one or more alternative IDs 304g. The inheritance IDs 306 of the generic node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the generic node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the generic node 302 is incremented when the generic node 302 undergoes transactional change. This allows the historical changes between versions of the generic node 302 to be tracked by modules or overlays within the overlay system 202. The namespace 304c of the generic node 302, along with the name 304d of the generic node 302, is used to help organize nodes within the executable graph-based model 100. That is, the generic node 302 is assigned a unique name 304d within the namespace 304c such that the name 304d of the generic node 302 need not be unique within the entire executable graph-based model 100, only within the context of the namespace 304c to which the generic node 302 is assigned. The generic node 302 optionally includes one or more icons 304e which are used to provide a visual representation of the generic node 302 when visualized via a user interface. The one or more icons 304e can include icons at different resolutions and display contexts such that the visualization of the generic node 302 is adapted to different display settings and contexts. The generic node 302 also optionally includes one or more labels 304f which are used to override the name 304d when the generic node 302 is rendered or visualized.

The generic node 302 supports the concept of inheritance of data and processing logic associated with any other node of the executable graph-based model 100 that is inherited by the generic node 302. This allows the behavior and functionality of the generic node 302 to be extended or derived from the inherited node of the executable graph-based model 100. The inheritance IDs 306 of the generic node 302 indicate the inheritance-based information, which may apply to the generic node 302. The inheritance IDs 306 comprise a set of Boolean flags that identify the inheritance structure of the generic node 302. The abstract flag 316 allows the generic node 302 to support the construct of abstraction. When the abstract flag 316 takes a value 'true', the generic node 302 is flagged as abstract that is to say that it cannot be instantiated or created within an executable graph-based model (e.g., the executable graph-based model 100). Thus, in an instance when the generic node 302 has the abstract flag 316 set to 'true', the generic node 302 may only form the foundation of other nodes that inherit therefrom. By default, the abstract flag 316 of the generic node 302 is set to 'false'. The leaf flag 318 is used to indicate whether any other node may inherit from the generic node 302. If the leaf flag 318 is set to 'true', no other node may inherit from the generic node 302 (but unlike an abstract node, a node with the leaf flag 318 set to 'true' may be instantiated and created within the executable graph-based model 100). The root flag 320 is used to indicate whether the generic node 302 inherits from any other node. If the root flag 320 is set to 'true', the generic node 302 does not inherit from any other node. The generic node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the generic node 302 is used to extend the functionality of the generic node 302. All nodes within the executable graph-based model 100 comprise a node-type that defines additional data structures and implements additional executable functionality. A node-type thus includes data structures and functionality that are common across all nodes that share that node-type. Therefore, the composition of a node with a node-type improves extensibility by allowing the generation of specialized node functionalities for specific application areas. Such extensibility is not present in prior art graph-based models. As illustrated in FIG. 3A, the generic node 302 and the node-type 308 are one logical unit that is not separated in the context of an executing system at run-time (e.g., in the context of execution of an executable graph-based model).

FIG. 3A further shows the plurality of predetermined node-types 326 which provides a non-exhaustive list of node-types for the node-type 308 associated with the generic node 302. The plurality of predetermined node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node-types 326 further includes an overlay node-type 332 and a role node-type 334. As will be described in more detail below, a node with the overlay node-type 332 is used to extend the functionality of a node, such as the generic node 302, to incorporate processing logic. Unlike non-overlay nodes, an overlay node (e.g., a node having the overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type can have is not limited.

The one or more attributes 310 correspond to the data associated with the generic node 302 (e.g., the data represented by the generic node 302 within the executable graph-based model 100 as handled by the data management module 214). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the generic node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the generic node 302 further includes the metadata 312 (e.g., data stored as a name, a confidentiality indicator for indicating data as sensitive and/or confidential, an average processing time required for processing data, or the like) which is associated with either the generic node 302 or an attribute (for example, the one or more attributes 310) of the generic node 302. An attribute within the one or more attributes 310 may either have an independent state or a shared state. That is to say, an attribute may be a value-shared attribute or a non-value-shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, updating the data (e.g., the value) of this shared attribute will be reflected across both nodes.

The node configuration 314 provides a high degree of configurations for the different elements of the generic node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the generic node 302, which creates message source IDs. A further example of a concrete node configuration strategy 322 is a versioning strategy, associated with the configuration of the version ID 304b of the generic node 302, which supports major and minor versioning (depending on the type of transactional change incurred by the generic node 302). The versioning strategy may be adapted to a native filing system of a user device hosting the overlay system 202 or a third-party data storage (for example, Snowflake®) associated with the overlay system 202.

Figure 3B:
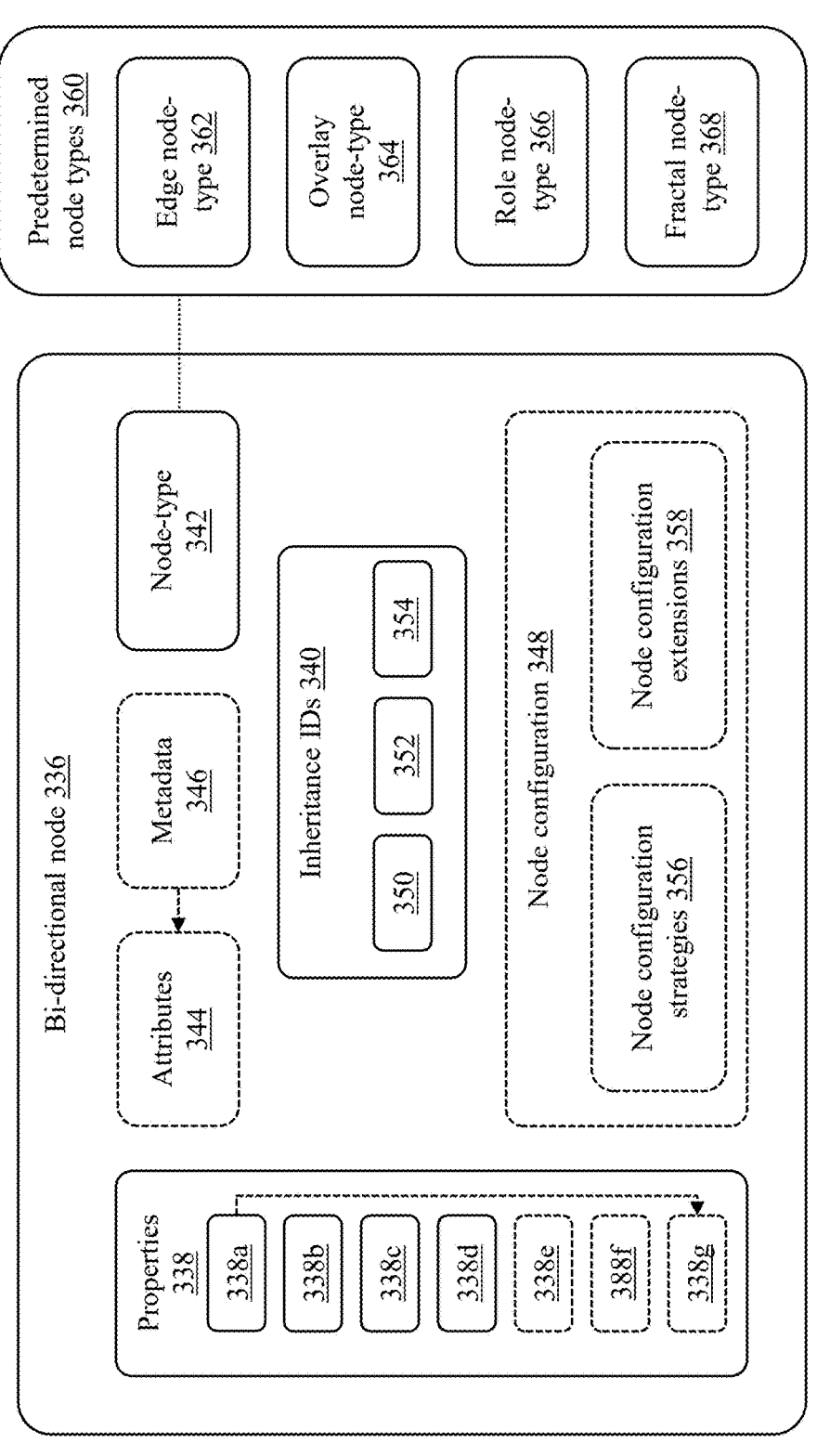
FIG. 3B is a block diagram that illustrates a generic structure of a bi-directional node within the executable graph-based model, consistent with disclosed embodiments of the present disclosure.

FIG. 3B is a block diagram 300B that illustrates a generic structure of a bi-directional node 336 within the executable graph-based model 100, consistent with disclosed embodiments of the present disclosure. Referring to FIG. 3B, the bi-directional node 336 corresponds to the core structure of the executable graph-based model 100 and forms the foundational building block for various data and processing logics within the executable graph-based model 100. The bi-directional node 336 includes properties 338, inheritance IDs 340, a node-type 342, attributes 344, metadata 346, and a node configuration 348.

The properties 338 include a unique ID 338a, a version ID 338b, a namespace 338c, a name 338d, one or more icons 338c, one or more labels 338f, and one or more alternative IDs 338g. The properties 338 of the bi-directional node 336 is the same as the properties 304 of the generic node 302. In other words, the unique ID 338a, the version ID 338b, the namespace 338c, the name 338d, the one or more icons 338c, the one or more labels 338f, and the one or more alternative IDs 338g are same as the unique ID 304a, the version ID 304b, the namespace 304c, the name 304d, the one or more icons 304c, the one or more labels 304f, and the one or more alternative IDs 304g, respectively, of the generic node 302.

The inheritance IDs 340 of the bi-directional node 336 include an abstract flag 350, a leaf flag 352, and a root flag 354. The inheritance IDs 340 of the bi-directional node 336 is same as the inheritance IDs 306 of the generic node 302. In other words, the abstract flag 350, the leaf flag 352, and the root flag 354 are the same as the abstract flag 316, the leaf flag 318, and the root flag 320, respectively, of the generic node 302.

The node configuration 348 of the bi-directional node 336 includes node configuration strategies 356 and node configuration extensions 358. The node configuration 348 is the same as the node configuration 314 of the generic node 302. In other words, node configuration strategies 356 and node configuration extensions 358 of the bi-directional node 336 are the same as the node configuration strategies 322 and the node configuration extensions 324, respectively, of the generic node 302.

The bi-directional node 336 may have the node-type 342 that may be one of predetermined node-types 360. The predetermined node-types 360 of the bi-directional node 336 may include an edge node-type 362, an overlay node-type 364, a role node-type 366, and a fractal node-type 368. The edge node-type 362 is the same as the edge node-type 330. The overlay node-type 364 is the same as the overlay node-type 332 whereas the role node-type 366 is the same as the role node-type 334. The bi-directional node 336 with the fractal node-type 368 refers to a high-level node that includes a plurality of nodes. The plurality of nodes may include at least two bi-directional nodes with the edge node-type 362 and one or more generic nodes.

Notably, the bi-directional node 336 has the edge node-type 362. In some embodiments, the bi-directional node 336 may be a combination of the edge node-type 362 and the overlay node-type 364. In such embodiments, the bi-directional node 336 may exhibit properties of the edge node-type 362 as well as the overlay node-type 364. Also, in such embodiments, the bi-directional node 336 may be a bi-directional overlay node. In some embodiments, the bi-directional node 336 may be a combination of the edge node-type 362 and the role node-type 366. In such embodiments, the bi-directional node 336 may exhibit properties of the edge node-type 362 as well as the role node-type 366. Also, in such embodiments, the bi-directional node 336 may be a connection node and form a part (for example, an inward connection object (ICO), an outward connection object (OCO), or the like) of a connection link that couples an associated bi-directional node with another bi-directional node. In some embodiments, the bi-directional node 336 may be associated with another bi-directional node by way of a connection link that includes an ICO and an OCO. The bi-directional node 336 may be associated with the ICO or the OCO such that the bi-directional node may own the associated ICO or OCO. Further, the associated ICO or the OCO may also be indicative of a primary role or secondary role associated with the bi-directional node 336.

For the sake of brevity, a node of the executable graph-based model 100, that is not a bi-directional node, is referred to as a generic node. Additionally, an overlay node of the executable graph-based model 100, that is a bi-directional node is referred to as a bi-directional overlay node. Further, a bi-directional with the fractal node-type 368 is referred to as a fractal node.

Figure 3C:
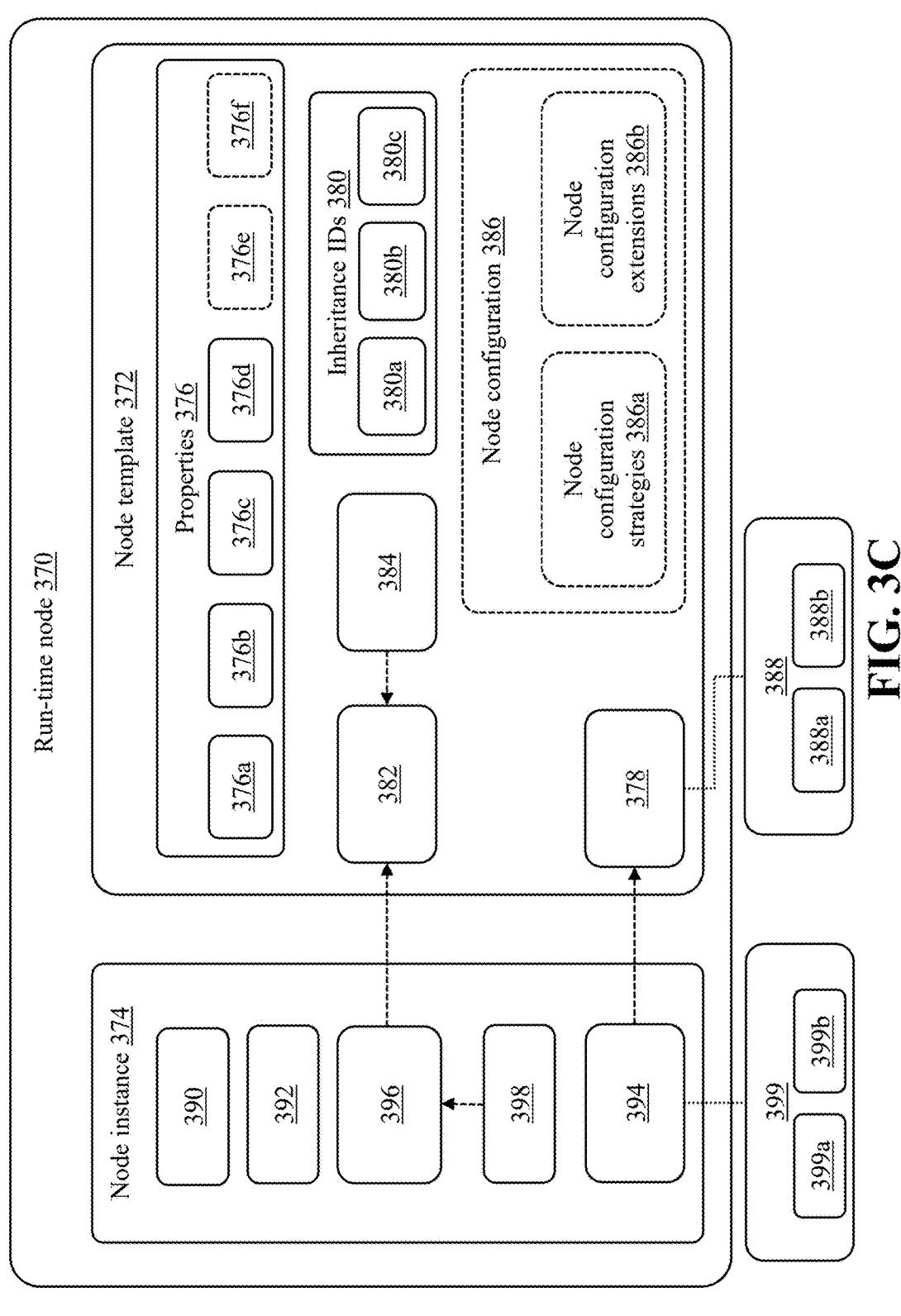
FIG. 3C is a block diagram that illustrates a generic structure of a run-time node within the executable graph-based model, consistent with disclosed embodiments of the present disclosure.

FIG. 3C is a block diagram 300B that illustrates a generic structure of a run-time node 370 within the executable graph-based model 100, consistent with disclosed embodiments of the present disclosure. Referring to FIG. 3C, the run-time node 370 corresponds to the core structure of the executable graph-based model 100 and forms the foundational building block for all data and processing logic within the executable graph-based model 100. The run-time node 370 is shown to include a node template 372 and a node instance 374. The node instance 374 is generated according to the node template 372. The node template 372 forms a data structure for the node instance 374. The run-time node 370 shown in FIG. 3C is a compositional structure that is generated and executed at run-time as part of the executable graph-based model 100. In other words, the node template 372 is defined as 'offline', and the node instance 374 and the run-time node 370 are run-time structures that are dynamically generated during the execution of the executable graph-based model 100.

The node template 372 comprises a predetermined node structure. Further, the node template 372 defines one or more rules that govern the generation of the node instance 374. The node instance 374 is an implementation of the node template 372. In other words, the node instance 374 is generated based on the predetermined node structure and the one or more rules of the node template 372. The node template 372 cannot be modified during the execution but may be modified during offline mode or at rest. During execution, only the node instance 374 of the run-time node 370 may be modified.

The node template 372 includes properties 376, a node-type template 378, inheritance IDs 380, and a set of attribute templates 382. The node template 372 may optionally include metadata 384 and a node configuration 386. The properties 376 of the node template 372 include a unique identifier (ID) 376a, a version ID 376b, a namespace 376c, a name 376d, and optionally include one or more icons 376e and a set of labels 376f. The inheritance IDs 380 may comprise an abstract flag 380a, a leaf flag 380b, and a root flag 380c. The node configuration 386 optionally comprises one or more node configuration strategies 386a and/or one or more node configuration extensions 386b. FIG. 3C further shows a plurality of predetermined node-type templates 388 of the node-type template 378. The plurality of predetermined node-type templates 388 includes a generic node-type template 388a and a bi-directional node-type template 388b. Further, the node instance 374 includes a unique ID 390, a version ID 392, a node-type instance 394, and a set of attribute instances 396. The node instance 374 may optionally include metadata 398. FIG. 3C further shows a plurality of predetermined node-type instances 399 of the node-type instance 394. The plurality of predetermined node-type instances 399 includes a generic node-type instance 399a and a bi-directional node-type instance 399b.

The unique ID 376a is unique for each node template within the executable graph-based model 100. Similarly, the unique ID 390 is unique for each node instance within the executable graph-based model 100. The unique ID 376a and the unique ID 390 are used to register, manage, and reference the node template 372 and the node instance 374, respectively, within the overlay system 202. The version ID 376b of the node template 372 is incremented when the node template 372 undergoes transactional change. Similarly, the version ID 392 of the node instance 374 is incremented when the node instance 374 undergoes transactional change. The namespace 376c of the node template 372, along with the name 376d of the node template 372, is used to help organize node templates within the executable graph-based model 100. That is, the node template 372 is assigned a unique name 376d within the namespace 376c such that the name 376d of the node template 372 need not be unique within the entire executable graph-based model 100, only within the context of the namespace 376c to which the node template 372 is assigned. The node template 372 optionally comprises one or more icons 376e which are used to provide a visual representation of the node template 372. The one or more icons 376e can include icons at different resolutions and display contexts such that the visualization of the node is adapted to different display contexts and settings. The node template 372 also optionally comprises the set of labels 376f which are used to override the name 376d when the node template 372 is rendered or visualized.

The node template 372 supports the software development feature of multiple inheritance by maintaining references (not shown) to zero or more other node templates, which then act as the base of the node template 372. This allows the behavior and functionality of a node template to be extended or derived from one or more other node templates within an executable graph-based model (such as the executable graph-based model 100). The node instance 374 likewise supports multiple inheritance because it is an instance representation of the node template 372. The multiple inheritance structure of the node instance 374 is, however, limited to the corresponding instance realization of the multiple inheritance structure defined by the node template 372, i.e., one node instance 374 is created and managed for each node template 372 defined in the inheritance hierarchy for a node instance of a node template.

The inheritance IDs 380 of the node template 372 provide an indication of the inheritance-based information, which is applicable, or can be applicable, to the node template 372. The inheritance IDs 380 have a description that is similar to the inheritance IDs 306. The abstract flag 380a has a description that is similar to the abstract flag 316, the leaf flag 380b has a description that is similar to the leaf flag 318, and the root flag 380c has a description that is similar to the root flag 320.

All elements within the executable graph-based model 100 are defined as node templates or node instances. The functionality of the node template 372 and the node instance 374 are realized due to the use of the node-type template 378 and the node-type instance 394. The node-type template 378 of the node template 372 is used to extend the functionality of the node template 372 by defining the standard set of capabilities, including data and associated behavior.

The run-time node 370 with the generic node-type template 388a and the generic node-type instance 399a may correspond to a templated version of the generic node 302. Similarly, the run-time node 370 with the bi-directional node-type template 388b and the bi-directional node-type instance 399b may correspond to a templated version of the bi-directional node 336.

The set of attribute templates 382 corresponds to the data defined by the node template 372. For example, the set of attribute templates 382 may define the names and value types (e.g., integer, string, float, etc.) of one or more attributes but not the values of these attributes. The values of the set of attribute templates 382 may be defined by the set of attribute instances 396 of the node instance 374 through one or more values or instance values. For example, the node template 372 may define a string attribute 'surname' and the corresponding node instance 374 may assign the instance value 'Bell-Richards' to this string attribute. Each attribute instance of the set of attribute instances 396 is associated with an attribute template of the set of attribute templates 382. The node template 372 may define one or more default values for the set of attribute templates 382. The default values correspond to the values that the attributes take if no value is assigned. The metadata 384 (e.g., data stored as a name, a value type, and a value triplet) is associated with either the node template 372 or one or more of the set of attribute templates 382 of the node template 372. Similarly, the node instance 374 also optionally comprises the metadata 398 (e.g., data stored as a name, a value type, and a value triplet) which is associated with either the node instance 374 or one or more of the set of attribute instances 396.

The node configuration 386 provides a high degree of configurability for the different elements of a node template and/or a node instance. The node configuration 386 optionally includes the one or more node configuration strategies 386a and/or the one or more node configuration extensions 386b which are complex data types. An example of a concrete node configuration strategy is an ID strategy, associated with the configuration of the unique ID 376a of the node template 372. A further example of a concrete node configuration strategy is a versioning strategy, associated with the configuration of the version ID 376b of the node template 372 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Figure 4A:
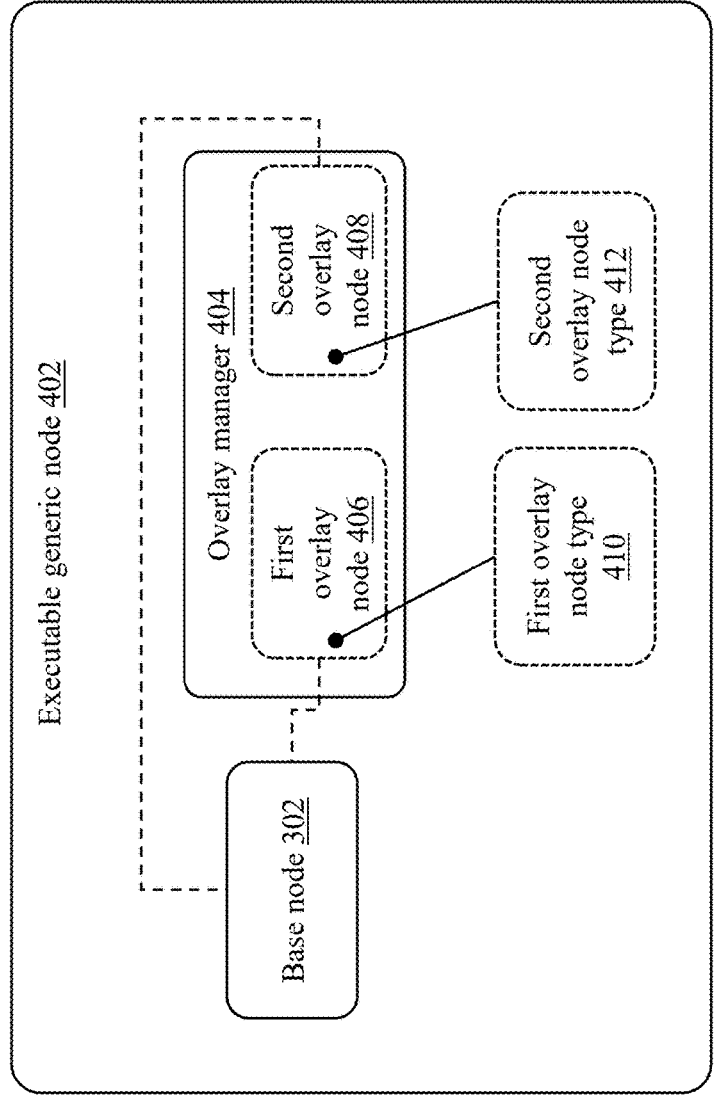
FIG. 4A is a block diagram that illustrates an executable generic node within the executable graph-based model, consistent with disclosed embodiments of the present disclosure.
Figure 4A:

FIG. 4A is a block diagram 400A that illustrates an executable generic node 402 within the executable graph-based model 100, consistent with disclosed embodiments of the present disclosure. Referring to FIG. 4A, the executable generic node 402 is shown to include a base node (e.g., the generic node 302) and an overlay manager 404. For the sake of ongoing discussion, the base node corresponds to the generic node 302, and is hereinafter referred to as the "base node 302". The base node 302 when extended by way of one or more overlay nodes becomes the executable generic node 402.

The overlay manager 404 includes a first overlay node 406 and a second overlay node 408. The executable generic node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable generic node 402). As shown, the first overlay node 406 has a first overlay node-type 410, and the second overlay node 408 has a second overlay node-type 412. Examples of overlay node-type include, but are not limited to, an encryption overlay node-type and a publisher overlay node-type.

A node with the encryption overlay node-type is an encryption overlay node that is indicative of an encryption technique using which an associated node is to be secured. The encryption overlay node also includes processing logic to secure a corresponding node. Examples of the encryption technique include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output.

Although, the executable generic node 402 is shown to include the first and second overlay nodes 406 and 408, in other embodiments, the executable generic node 402 may include any number of overlay nodes, without deviating from the scope of the present disclosure.

The executable generic node 402 extends the base node 302 (or is a subtype of the base node 302) such that all the functionality and properties of the base node 302 are accessible to the executable generic node 402. The executable generic node 402 also dynamically extends the functionality of the base node 302 by associating the overlay nodes maintained by the overlay manager 404 with the base node 302. The executable generic node 402 may thus be considered a combination of the base node 302 and the first and second overlay nodes 406 and 408. The executable generic node 402 may be alternatively referred to as a node with overlay(s). Therefore, the executable generic node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4A) and the functionality that acts upon that data (e.g., an overlay node) can be separated and independently maintained offline, but at run-time, an association between the data node and the overlay node is determined and an executable node is generated (e.g., the executable generic node 402 shown in FIG. 4A).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 406 or the second overlay node 408, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable generic node 402 is responsible for executing all overlays registered therewith. The overlay manager 404 also coordinates the execution of all associated overlay nodes. As shown in FIG. 4A, the executable generic node 402 associates the base node 302 with two overlay nodes, that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

Figure 4B:
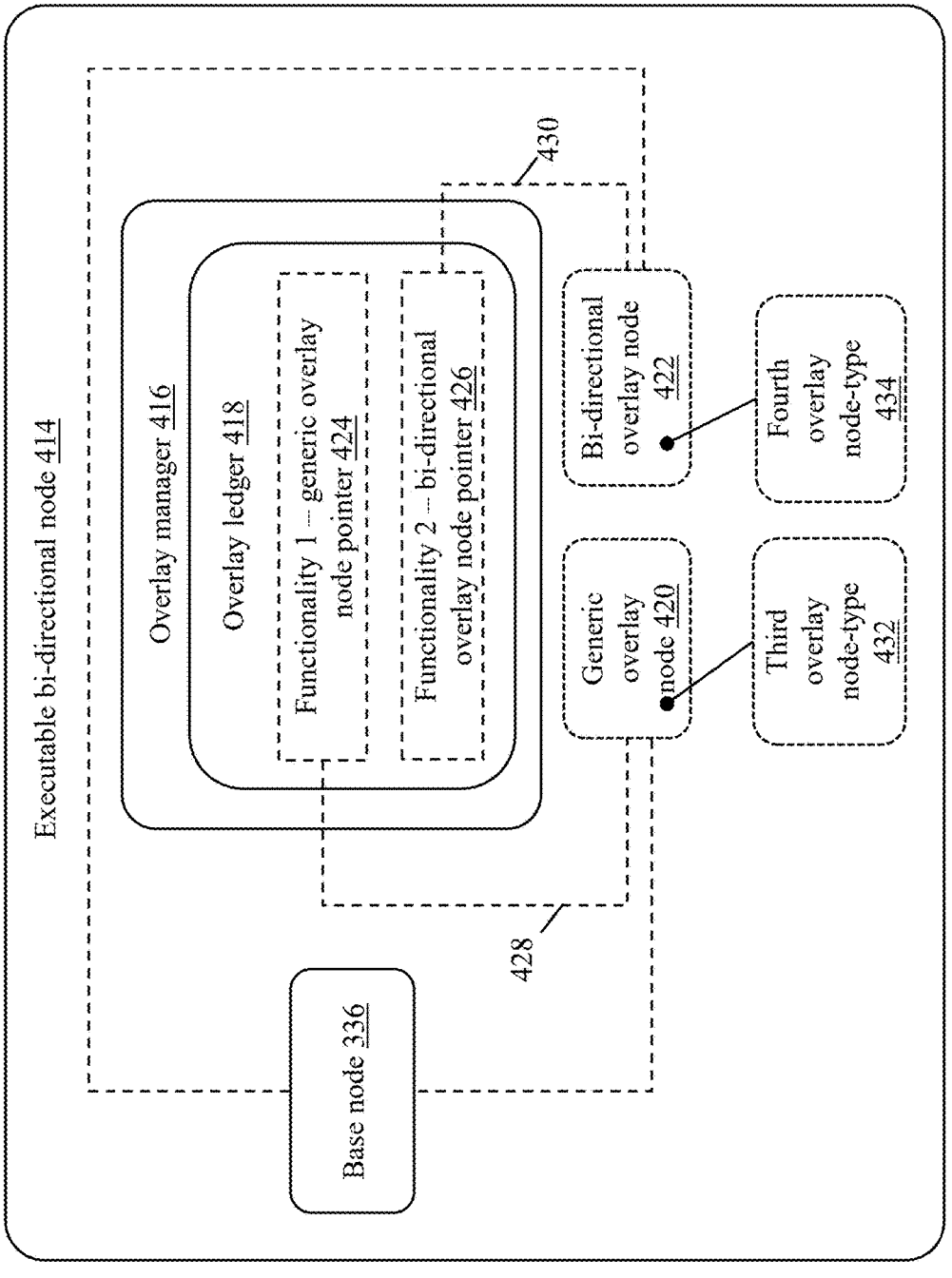
FIG. 4B is a block diagram that illustrates an executable bi-directional node within the executable graph-based model, consistent with disclosed embodiments of the present disclosure.

FIG. 4B is a block diagram 400B that illustrates an executable bi-directional node 414 within the executable graph-based model 100, consistent with disclosed embodiments of the present disclosure. Referring to FIG. 4B, the executable bi-directional node 414 is shown to include a base node (for example, the bi-directional node 336) and an overlay manager 416. Hereinafter, the base node is referred to as the base node 336. The base node 336 being a bi-directional node may have the edge node-type 362 or the fractal node-type 368. The base node 336 may be associated with a generic overlay node and/or a bi-directional overlay node. Notably, a bi-directional overlay node may be associated only with a bi-directional node, an ICO, an OCO, or any other component of the bi-directional node. In other words, the bi-directional overlay node may not be associated with a generic node. The overlay manager 416 has a description that is similar to the description of the overlay manager 404. In addition, the overlay manager 416 creates and maintains an overlay ledger 418.

The overlay ledger 418 may refer to a list of overlays associated with the base node 336 and functionalities associated with each of the overlays. The overlay ledger 418 further includes a pointer associated with each entry in the overlay ledger 418 that points to a corresponding overlay node associated with the base node 336. As shown, the base node 336 is extended by way of a generic overlay node 420 and a bi-directional overlay node 422. Based on the association of the generic overlay node 420 and the bi-directional overlay node 422 with the base node 336, the overlay manager 416 creates entries 424 and 426 for the generic overlay node 420 and the bi-directional overlay node 422, respectively. As shown, for the generic overlay node 420 and the bi-directional overlay node 422, the entries 424 and 426 include functionalities and pointers 428 and 430, respectively, that point to corresponding overlay nodes. For example, the pointer 428 associated with the entry 424 points to the generic overlay node 420, and the pointer 430 associated with the entry 426 points to the bi-directional overlay node 422. The generic overlay node 420 may have a third overlay node-type 432 whereas the bi-directional overlay node 422 may have a fourth overlay node-type 434. The third overlay node-type 432 and the fourth overlay node-type 434 may be the same as the first and second overlay node-types 410 and 412 as described in conjunction with FIG. 4A. Notably, the structure of the bi-directional overlay node 422 may be the same as the bi-directional node 336 whereas processing logic associated with the bi-directional overlay node 422 may be similar to generic overlay nodes (for example, the first overlay node 406 and the second overlay node 408) shown in FIG. 4A. In other embodiments, processing logic associated with the bi-directional overlay node 422 may be different from generic overlay nodes in the executable graph-based model 100.

In an instance, one of the generic overlay node 420 or the bi-directional overlay node 422 may be required to be executed. In such an instance, the overlay manager 416 may identify a relevant overlay node based on the functionality of one of the generic overlay node 420 or the bi-directional overlay node 422 as per the overlay ledger 418. Upon identification of the relevant overlay node, the overlay manager 416 may trigger the relevant overlay node by way of a corresponding pointer.

In some embodiments, the data and the processing logic associated with generic overlays and bi-directional overlays may be non-persistent. Such generic overlays and bi-directional overlays are known as stateless overlays. Notably, processing logic and outputs associated with stateless overlays cease to exist based on the unloading of the overlays and require to be recreated as and when required.

In some embodiments, the data and the processing logic associated with generic overlays and bi-directional overlays may be persistent. Such generic overlays and bi-directional overlays are known as stateful overlays. Notably, processing logic and outputs associated with stateful overlays are stored in the storage element of the overlay system 202 and may be loaded in the executable graph-based model 100 and used as and when required. The persistent nature of the data and the processing logic associated with an executable node and an associated generic overlay node are described in detail in conjunction with FIG. 5.

Throughout the description, an executable node (for example, the executable generic node 402 and the executable bi-directional node 414) is represented by way of two concentric circles. In other words, the executable node is represented by way of an inner circle encircled by an outer circle, where the incircle represents a base node and the outer circle represents an overlay node associated with the base node.

Figure 5:
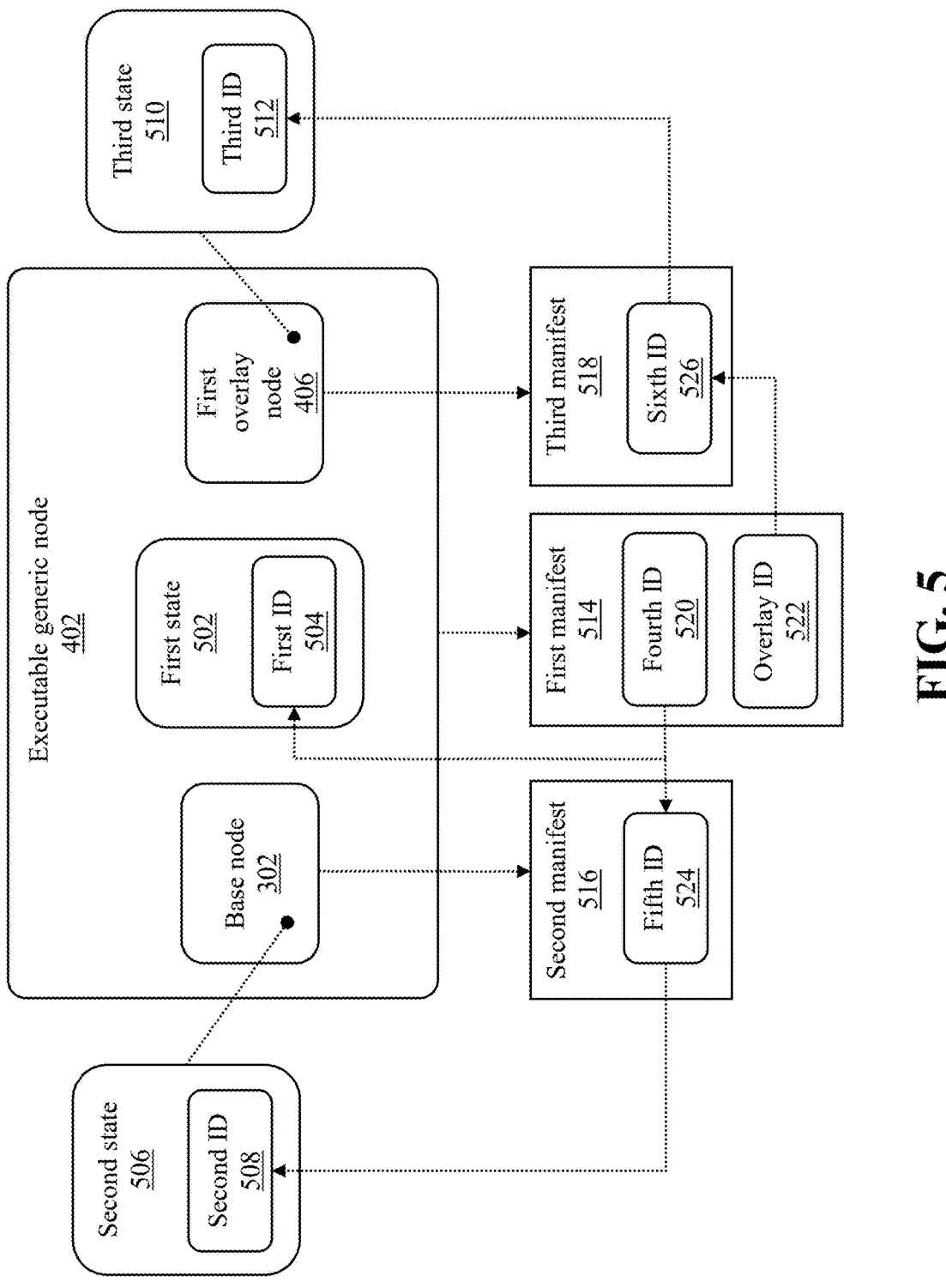
FIG. 5 is a block diagram that illustrates a composition of the executable generic node that enables persistent storage of data and processing logic associated therewith, consistent with disclosed embodiments of the present disclosure.

FIG. 5 is a block diagram 500 that illustrates a composition of the executable generic node 402 that enables persistent storage of data and the processing logic associated therewith, consistent with disclosed embodiments of the present disclosure.

As described in conjunction with FIG. 4A, the executable generic node 402 includes the base node 302 and one or more overlay nodes (e.g., the first and second overlay nodes 406 and 408). For the brevity of the ongoing description, the persistent storage is explained for the executable generic node 402 including only the first overlay node 406. One or more operations performed for ensuring the persistence of the first overlay node 406 may be performed for the second overlay node 408 as well.

Referring to FIG. 5, the executable generic node 402 includes the base node 302 and the first overlay node 406. The executable generic node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable generic node 402, and the first overlay node 406. In an embodiment, the manifests may be generated by the storage management module 220. The first manifest 514 is associated with the executable generic node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable generic node 402 includes data required to reconstruct the executable generic node 402 (e.g., attributes, properties, etc.). The first state 502 of the executable generic node 402 is persistently stored along with the first ID 504. The first manifest 514 is generated for the executable generic node 402 and has (i) the fourth ID 520 (which is the same as the first ID 504), (ii) the storage location of the first state 502 of the executable generic node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable generic node 402. Further, the overlay ID 522 is the same as the sixth ID 526 of the state of the first overlay node 406. Therefore, the first manifest 514 may be used to identify and retrieve the states of the base node 302, the executable generic node 402, and the first overlay node 406. Subsequently, the retrieved states may be used to reconstruct the executable generic node 402 and the first overlay node 406. In an instance, the executable generic node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has the fifth ID 524 and the storage location of the second state 506 of the base node 302. The second ID 508 of the second state 506 and the fifth ID 524 of the second manifest 516 are the same as the first ID 504 of the first state 502 of the executable generic node 402 (which is also the same as the fourth ID 520 of the first manifest 514 of the executable generic node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable generic node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable generic node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node 302 is a node with overlay. Based on the fourth ID 520 (that is the same as the first ID 504 of the first state 502 of the executable generic node 402) of the first manifest 514, the first state 502 is identified and retrieved. Subsequently, the executable generic node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state 510) of the third manifest 518, the third state 510 is identified and retrieved. Based on the third state 510, the first overlay node 406 is reconstructed and loaded in the executable graph-based model 100.

Based on a context of a stimulus (for example, the stimulus 230) associated with the overlay system 202, the processing circuitry (such as the context module 210) may determine an ID that is the same as the fifth ID 524. Based on the determined ID, the processing circuitry (such as the memory management module 218 and the storage management module 220) may identify the second manifest 516. Subsequently, the processing circuitry (such as the memory management module 218 and the storage management module 220) may identify the second state 506 that has the second ID 508 that matches the fifth ID 524. Further, the processing circuitry (such as the memory management module 218 and the storage management module 220) may retrieve the second state 506 associated with the second manifest 516 from a corresponding storage element. Subsequently, the processing circuitry (such as the memory management module 218 and the storage management module 220) may determine, by checking the manifest storage(s) associated with the overlay system 202, whether there is another manifest (such as the first manifest 514 of the executable generic node 402) with an ID that matches the second ID 508 and the fifth ID 524. Notably, the first manifest 514 includes storage locations of each overlay node (for example, the first overlay node 406) of the executable generic node 402. Based on the overlay ID 522 included in the first manifest 514 that matches the sixth ID 526 included in the third manifest 518, the processing circuitry (such as the memory management module 218 and the storage management module 220) may identify and retrieve the third manifest 518 from a manifest storage of a plurality of manifest storages of the overlay system 202. Subsequently, the processing circuitry (such as the memory management module 218 and the storage management module 220) may identify the third state 510 that has the third ID 512 that matches the sixth ID 526. Further, the processing circuitry (such as the memory management module 218 and the storage management module 220) may retrieve the third state 510 associated with the third manifest 518 from a corresponding storage element. To determine whether the first overlay node 406 has an overlay node associated therewith, the processing circuitry (such as the memory management module 218 and the storage management module 220) may also perform a check to determine whether any of the plurality of manifest storages of the overlay system 202 includes any other manifest with an ID that matches the sixth ID 526. Since the first overlay node 406 does not have an overlay associated therewith, no other manifest has the ID that matches the sixth ID.

Notably, the manifest (the third manifest 518) of the first overlay node 406 includes a reference (such as an identifier that is common to the second manifest 516 and the third manifest 518, a link, a path, a storage location, or the like) to the second manifest 516 of the base node 302. Therefore, the re-formation of the executable generic node 402 includes a re-creation of the first overlay node 406 prior to a re-creation of the base node 302. Subsequently, the first overlay node 406 and the base node 302 are organized by associating the base node 302 with the first overlay node 406 to re-form the executable generic node 402.

In some embodiments, the first overlay node 406 may not be loaded in case it is not required for executing the operation associated with the stimulus 230. The loaded executable generic node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 218, the storage management module 220, a combination of these, or any other module of the overlay system 202. Also, all manifest states are stored together at a storage location (such as a manifest storage) that is known to the storage management module 220. Such centralized storage of the manifest states ensures that node states associated therewith are easily accessible.

It will be apparent to a person skilled in the art that although FIG. 5 illustrates only a single generic overlay node associated with a generic node, in other embodiments, the executable generic node 402 may include additional or different generic overlay nodes (for example, the second overlay node 408). It will also be apparent to a person skilled in the art that only those overlay nodes that are required for responding to the stimulus 230 may be loaded.

It will be apparent to a person skilled in the art that the executable bi-directional node 414 may be loaded in a manner that is similar to the loading of the executable generic node 402.

The overlay system 202 described in conjunction with FIGS. 1-5 is used to facilitate one or more operations associated with a plurality of fractal nodes in the executable graph-based model 100. Various concepts and features associated with the fractal nodes are described in detail later in the description.

Figure 6A:
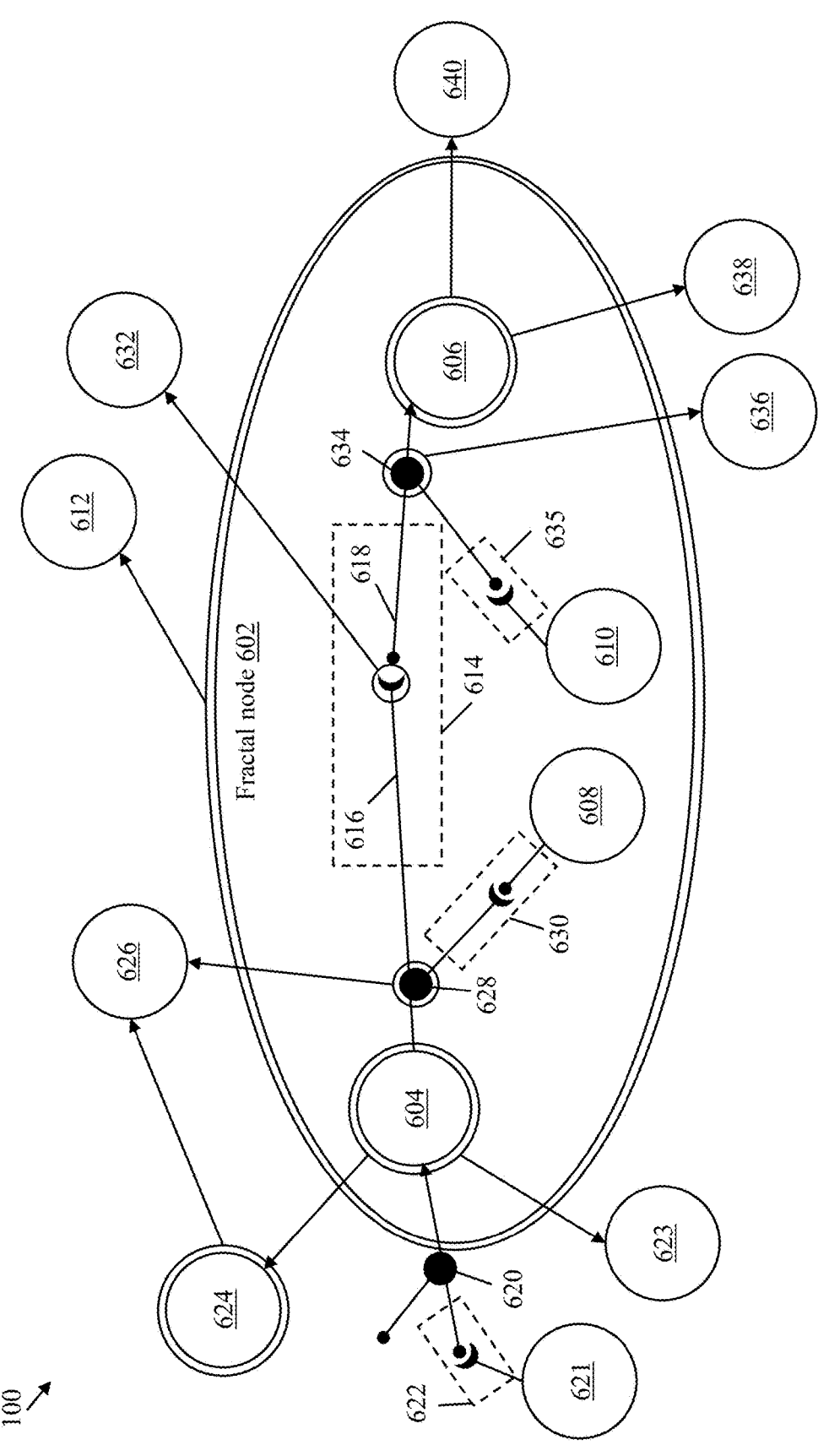
FIGS. 6A-6C, collectively, illustrates features of a fractal node in the executable graph-based model, consistent with disclosed embodiments of the present disclosure.
Figure 6B:
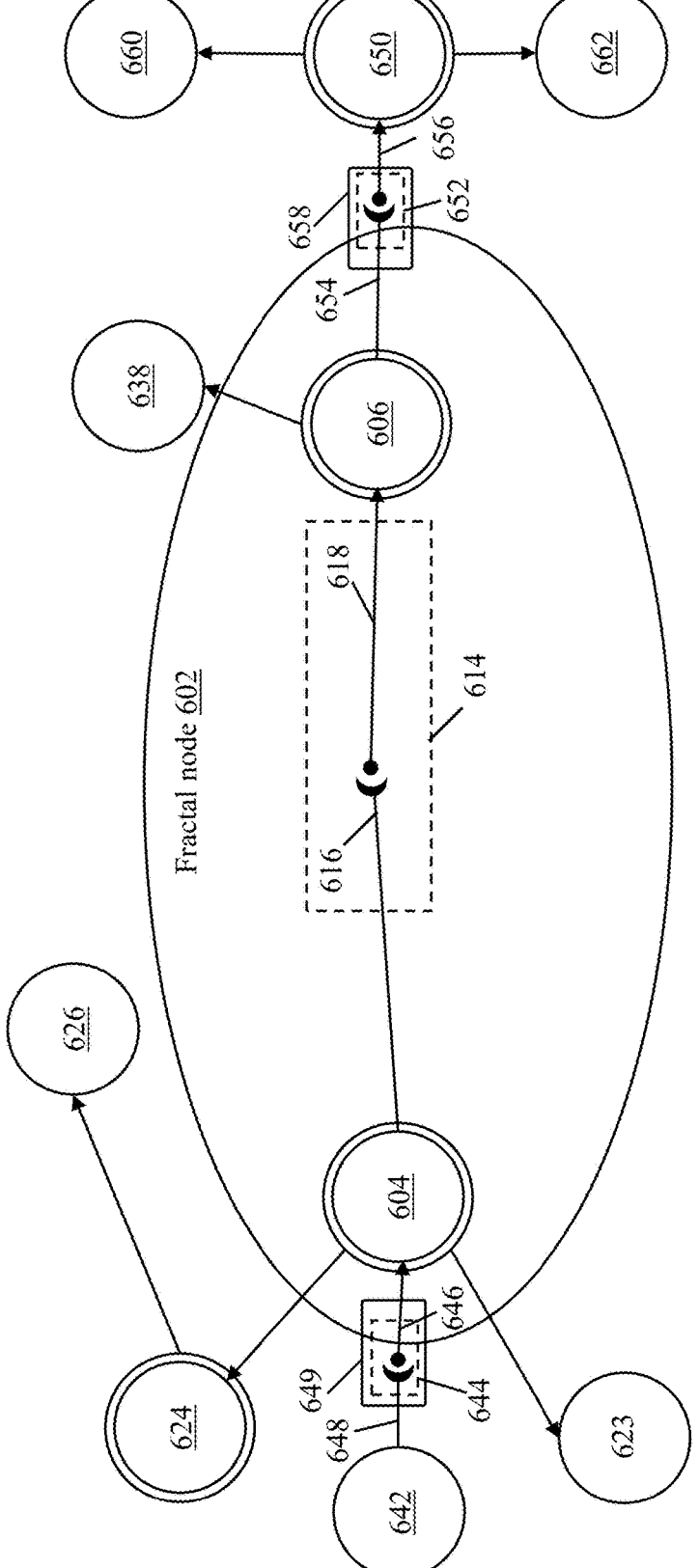
Figure 6C:
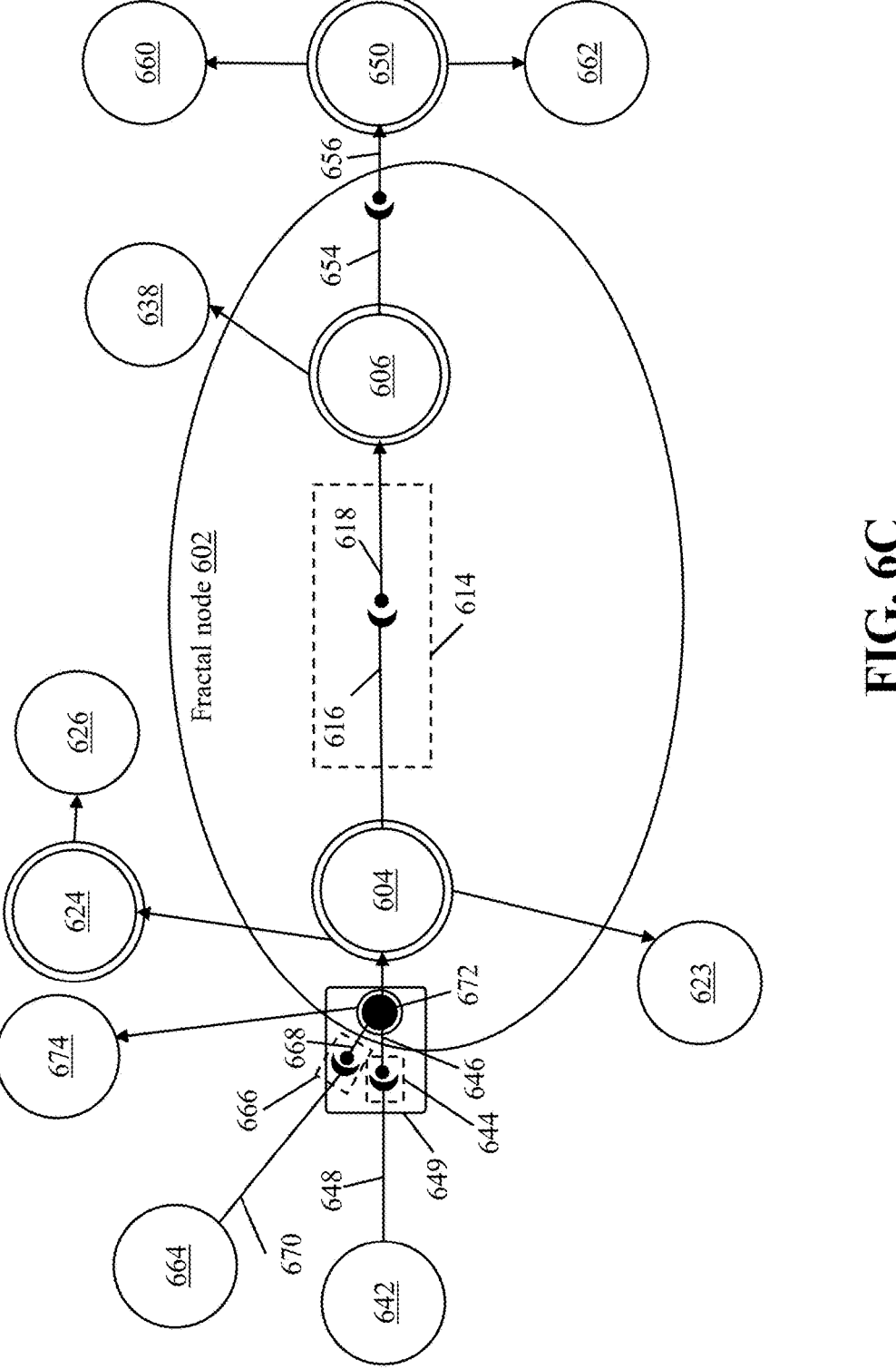

FIGS. 6A-6C, collectively, illustrates features of a fractal node in the executable graph-based model 100, consistent with disclosed embodiments of the present disclosure. Referring to FIG. 6A, shown is the executable graph-based model 100 that includes a fractal node 602. The fractal node 602 includes a first plurality of bi-directional nodes. The first plurality of bi-directional nodes may include bi-directional nodes 604-610. Each bi-directional node of the bi-directional nodes 604-610 has the edge node-type 362. The fractal node 602 is extended by way of an overlay node 612. The fractal node 602 may thus correspond to an executable node. The overlay node 612 may be a generic overlay node or a bi-directional overlay node.

As shown in FIG. 6A, the bi-directional node 604 is associated with the bi-directional node 606 by way of a connection link 614. The connection link 614 includes an OCO 616 and an ICO 618 that define association with the bi-directional node 604 and the bi-directional node 606, respectively. In other words, the OCO 616 and the ICO 618, collectively, form the connection link 614. The OCO 616 is owned by the bi-directional node 604, whereas the ICO 618 is owned by the bi-directional node 606. The OCO 616 may include a primary role, whereas the ICO 618 may include a secondary role. The primary role may be indicative of a capacity in which the bi-directional node 604 is associated with the bi-directional node 606, whereas the secondary role may be indicative of a capacity in which the bi-directional node 606 is associated with the bi-directional node 604. The primary role and the secondary role may be complementary. In other words, the primary role and the secondary role, collectively, are indicative of a mutual relationship/association between the bi-directional nodes 604 and 606. In an example, the bi-directional node 604 may represent a manager of a team whereas the bi-directional node 606 may represent an associate working under the manager of the team. In such an example, the primary role may be 'manager' and the secondary role may be 'associate'. Hence, the connection link 614 may indicate that the mutual association between the bi-directional nodes 604 and 606 may be a manager-associate relationship.

In some embodiments, the connection link 614 may be realized as a node with role node-type. In such embodiments, the OCO 616 and the ICO 618 may also be associated with corresponding generic overlay nodes and/or bi-directional overlay nodes.

In some embodiments, the association between the bi-directional nodes 604 and 608 may be based on a dependency therebetween. The connection link 614 may be further indicative of the dependency between the bi-directional nodes 604 and 606. The dependency between the bi-directional nodes 604 and 606 may be an own-owned dependency, a use-used dependency, or a share-shared dependency.

In some embodiments, based on the dependency between the bi-directional nodes 604 and 606 being the own-owned dependency, the bi-directional node 604 may own the bi-directional node 606. Thus, the bi-directional node 606 may be exclusive to the bi-directional node 604. In other words, exclusively the bi-directional node 604 may use data and/or processing logic associated with the bi-directional node 606. In an instance, when the dependency between the bi-directional nodes 604 and 606 may be the own-owned dependency, the primary role may be 'own' and the secondary role may be 'owned'.

In some embodiments, based on the dependency between the bi-directional nodes 604 and 606 being the use-used dependency, the bi-directional node 604 may exclusively use the bi-directional node 606 at a given time instance. In other words, the bi-directional node 604 may exclusively use data and/or processing logic associated with the bi-directional node 606 at the given time instance. The bi-directional node 606 may be used by another bi-directional node associated therewith at a time instance later or prior to the given time instance. In an instance, when the dependency between the bi-directional nodes 604 and 606 may be the use-used dependency, the primary role may be 'use' and the secondary role may be 'used'.

In some embodiments, based on the dependency between the bi-directional nodes 604 and 606 being the share-shared dependency, the bi-directional node 604 may use the bi-directional node 606 while sharing the bi-directional node 606 with one or more other bi-directional nodes associated therewith. Thus, the bi-directional node 604 may use the data and/or processing logic associated with the bi-directional node 606 while sharing the bi-directional node 606 with the one or more other bi-directional nodes. In other words, the bi-directional node 606 may be simultaneously used by the bi-directional node 604 and the one or more other bi-directional nodes. In an instance, when the dependency between the bi-directional nodes 604 and 606 may be the share-shared dependency, the primary role may be 'share' and the secondary role may be 'shared'.

The bi-directional node 604 is extended by way of a generic overlay node 623 and a bi-directional overlay node 624. Thus, the bi-directional node 604 corresponds to an executable bi-directional node. Additionally, the bi-directional overlay node 624 is extended by way of an overlay node 626. The overlay node 626 may be a generic overlay node or another bi-directional overlay node.

The executable graph-based model 100 may further include a second plurality of bi-directional nodes that are external to the fractal node 602. As shown in FIG. 6A, the bi-directional node 604 may receive input from a set of bi-directional nodes at an inward group object 620. An inward group object is a logical part of an associated bi-directional node that receives inputs via ICOs of one or more connection links associated therewith. The inward group object 620 may be a convergence point for one or more ICOs of various connection links associated with the bi-directional node 604. In an embodiment, the inward group object 620 may forward the received inputs separately to the bi-directional node 604. In another embodiment, the inward group object 620 may forward the received inputs as a combined input signal to the bi-directional node 604.

For the sake of brevity, only one bi-directional node 621 associated with the bi-directional node 604 by way of a connection link 622 is shown in FIG. 6A. In other words, the connection link 622 couples the bi-directional node 604 to the bi-directional node 621. The connection link 622 includes an ICO and an OCO that define association with the bi-directional node 604 and the bi-directional node 621, respectively. Further, the bi-directional node 604 may be public such that the coupling between the bi-directional node 604 and the bi-directional node 621 corresponds to a direct coupling. That is to say, the fractal node 602 exposes the bi-directional node 604 to the bi-directional node 621, and the bi-directional node 621 is aware that the connection link 622 is coupling to the bi-directional node 604.

In some embodiments, the inward group object 620 may be associated with one or more overlay nodes (for example, generic overlay nodes and bi-directional overlay nodes). In such embodiments, functionalities of the one or more overlay nodes may be executed on the received inputs. Subsequently, an output of the execution may be provided to the bi-directional node 604 as the input.

In some embodiments, one or more connection links that provide input to the bi-directional node 604 may be directly associated with the bi-directional node 604. In other words, the one or more connection links that provide the input to the bi-directional node 604 may be associated with the bi-directional node 604 without being associated with the inward group object 620. In such embodiments, the overlay node functionalities may not be executed on the received input.

The input received by the bi-directional node 604 may act as a stimulus (for example, the stimulus 230). Based on the stimulus, the processing circuitry (for example, the controller module 206, the transaction module 208, the bi-directional node management module 216, or the like) may use the bi-directional node 604 to generate a message (for example, a signal, an event, a query, a command, an instruction, or the like). The message may be generated based on an execution of processing logic associated with at least one of the generic overlay node 623, the bi-directional overlay node 624, or the overlay node 626 associated with the bi-directional overlay node 624. The message may have to be communicated to the bi-directional node 606 for further processing of the stimulus. For communication of the message to the bi-directional node 606, the message passes through an outward group object 628 associated with the bi-directional node 604. An outward group object is a logical part of an associated bi-directional node that communicates a message via outward connection objects of one or more connection links associated therewith. The outward group object 628 may be a divergence point for one or more OCOs of various connection links associated with the bi-directional node 604. Notably, the message being communicated via the outward group object 628 may be communicated to each bi-directional node that may be associated with the bi-directional node 604 via connection links with corresponding OCOs diverging from the outward group object 628. For example, the connection link 614 and a connection link 630 may diverge from the outward group object 628. The connection link 614 may associate the bi-directional node 604 to the bi-directional node 606 such that the bi-directional node 604 may communicate one or more messages to the bi-directional node 606, whereas the connection link 630 may associate the bi-directional node 604 to the bi-directional node 608 such that the bi-directional node 604 may communicate one or more messages to the bi-directional node 608.

Further, the outward group object 628 may be extended by way of the overlay node 626. Thus, at the outward group object 628, the processing circuitry (for example, the controller module 206, the transaction module 208, the bi-directional node management module 216, or the like) may execute the processing logic associated with the overlay node 626 on the message. Subsequently, the message may be communicated to the bi-directional nodes 606 and 608 via the connection links 614 and 630, respectively.

While being communicated to the bi-directional node 606, the message passes through the OCO 616. As mentioned previously, an OCO is depicted herein by way of a half-moon associated with a solid line, and an ICO is depicted herein by way of an oval arrow. In addition, the half-moon enclosed within a circle indicates that an OCO may be associated with an overlay (for example, a generic overlay node or a bi-directional overlay node). Further, an oval arrow-head of the oval arrow enclosed within a circle indicates that an ICO may be associated with an overlay node (for example, a generic overlay node or a bi-directional overlay node). As shown in FIG. 6A, the OCO 616 is associated with an overlay node 632 (for example, a generic overlay node or a bi-directional overlay node). At the OCO 616, the processing circuitry (for example, the controller module 206, the transaction module 208, the bi-directional node management module 216, or the like) may execute the processing logic associated with the overlay node 632 on the message received from the outward group object 628. Subsequently, the message passes through the ICO 618. The message is further communicated to an inward group object 634. The inward group object 634 is a convergence point associated with the bi-directional node 606 for receiving inputs from the bi-directional node 604 and the bi-directional node 610. The bi-directional node 606 may be coupled to the bi-directional node 610 by way of a connection link 635. The connection links 622, 630, and 635 may be structurally similar to the connection link 614.

Further, the inward group object 634 may be extended by way of an overlay node 636 (for example, a generic overlay node or a bi-directional overlay node). Thus, at the inward group object 634, the processing circuitry (for example, the controller module 206, the transaction module 208, the bi-directional node management module 216, or the like) may execute the processing logic associated with the overlay node 636 on the message received from the ICO 618. Subsequently, the message may be communicated to the bi-directional node 606. The bi-directional node 606 may be extended by way of an overlay node 638 (for example, a generic overlay node or a bi-directional overlay node). Thus, at the bi-directional node 606, the processing circuitry (for example, the controller module 206, the transaction module 208, or the like) may execute the processing logic associated with the overlay node 638 on the message. Based on the execution of the processing logic associated with the overlay node 638, the operation associated with the stimulus may be completed and a stimulus response may be generated by the bi-directional node 606. The stimulus response may be published using a publisher overlay node 640 associated with the bi-directional node 604.

In the aforementioned description, prior to utilization of any overlay node, connection link, or bi-directional node, the processing circuitry may be configured to identify the corresponding overlay node, connection link, or bi-directional node in the executable graph-based model 100.

It will be apparent to a person skilled in the art that a message being executed between two bi-directional nodes (for example, the bi-directional nodes 604 and 606) passes through various junctures (for example, the bi-directional node 604, the outward group object 628, the OCO 616, the ICO 618, the inward group object 634, and the bi-directional node 606) in a sequential manner. At each juncture, in case one or more associated overlay nodes (for example, a generic overlay node and/or a bi-directional overlay node) are present, the processing logic of each overlay node may be executed on the message and a modified message may be transmitted to the next juncture.

To summarize, the processing circuitry (for example, the controller module 206, the transaction module 208, the bi-directional node management module 216, or the like) may receive the stimulus associated with the overlay system 202 and identify the fractal node 602 from the first plurality of fractal nodes in the executable graph-based model 100 based on the stimulus. Further, the processing circuitry may determine, in the fractal node 602, for processing the stimulus, a set of bi-directional nodes (e.g., the bi-directional nodes 604 and 606) and a set of connection links (the connection link 614) that couples the set of bi-directional nodes to each other. The processing circuitry may further execute an operation associated with the stimulus based on the determined set of bi-directional nodes and the determined set of connection links as described in the foregoing description. Although the fractal node 602 of FIG. 6A is shown to include four bi-directional nodes and three connection links, the scope of the present disclosure is not limited to it. In several embodiments, the fractal node may include any number of bi-directional nodes and connection links, without deviating from the scope of the disclosure.

Although the executable graph-based model 100 of FIG. 6A is shown to include one external bi-directional node coupled to the fractal node 602 by way of one connection link, the scope of the present disclosure is not limited to it. In several embodiments, the two or more bi-external directional nodes may be coupled to the fractal node 602 by way of corresponding connection links, without deviating from the scope of the disclosure.

Although not shown, the bi-directional node 606 may have an outward group object via which the bi-directional node 606 may be associated with two or more bi-directional nodes. In some embodiments, the processing circuitry (for example, the controller module 206, the transaction module 208, the bi-directional node management module 216, or the like) may execute the operation associated with the stimulus further based on the two or more bi-directional nodes associated with the bi-directional node 606 via the outward group object.

For the sake of brevity, the connection link 614 is assumed to be the node with the role node-type. In other embodiments, the connection link 614 may be implemented as roles that are integral to the bi-directional nodes 604 and 606. In other words, the primary role may be realized as part of the bi-directional node 604 and the secondary role may be realized as part of the bi-directional node 606. In such embodiments, the OCO 616 and the ICO 618 of the connection link 614 may not be associated with any overlay nodes.

It will be apparent to a person skilled in the art that operations being performed by a node of the executable graph-based model 100 are realized by the processing circuitry (for example, the controller module 206, the transaction module 208, the bi-directional node management module 216, or any other component of the overlay system 202) while using relevant nodes.

For the sake of brevity, a single communication link (for example, the connection link 614) is shown between the bi-directional nodes 604 and 606. The connection link 614 allows the bi-directional node 604 to communicate with the bi-directional node 606. For the bi-directional node 606 to be able to communicate with the bi-directional node 604, another communication link (not shown) may be instantiated between the bi-directional nodes 604 and 606 such that an ICO may be associated with the bi-directional node 604 and an OCO may be associated with the bi-directional node 606.

In some embodiments, the fractal node 602 may include a first plurality of generic nodes. In such a scenario, the bi-directional nodes 604 and 606 may be further associated with one or more generic nodes of the first plurality of generic nodes and the operation associated with the stimulus may be executed further based on the one or more generic nodes.

In some embodiments, the executable graph-based model 100 may further include a second plurality of generic nodes. A node-type of each generic node of the second plurality of generic nodes may be one of a group consisting of the vertex node-type 328, the edge node-type 330, the role node-type 334, or the overlay node-type 332. Further, the fractal node 602 may be associated with at least a first generic node of the second plurality of generic nodes by way of a first generic role that indicates a capacity in which the fractal node 602 is associated with the first generic node. Additionally, the operation associated with the stimulus may be executed further based on the first generic node and the first generic role.

In some embodiments, the operation associated with the stimulus may be executed further based on the overlay node 612 of the fractal node 602. In such a scenario, the processing logic of the overlay node 612 may be executed on the stimulus response.

Although not shown, the executable graph-based model 100 may include a plurality of overlay nodes (for example, generic overlay nodes and/or bi-directional overlay nodes). Further, a first set of overlay nodes of the plurality of overlay nodes may be associated with the fractal node 602. Additionally, the set of overlay nodes may extend the functionality of at least one of the fractal node 602 or one or more bi-directional nodes of the fractal node 602. In such embodiment, the processing circuitry (for example, the controller module 206, the transaction module 208, the bi-directional node management module 216, or the like) may identify the set of overlay nodes associated with the fractal node 602. The operation associated with the stimulus may be further executed based on the set of overlay nodes. Additionally, a second set of overlay nodes of the plurality of overlay nodes may extend the functionality of a bi-directional node (for example, the bi-directional node 604) of the fractal node 602. In such a scenario, the processing circuitry may identify the second set of overlay nodes associated with the bi-directional node. During the execution of the operation associated with the stimulus, the first set of overlay nodes overrides the second set of overlay nodes.

Although it is described that the fractal node 602 is associated with the overlay node 612, the scope of the present disclosure is not limited to it. In numerous embodiments, the fractal node 602 may not be associated with the overlay node 612. Further, the executable graph-based model 100 may include the plurality of overlay nodes that includes a set of overlay nodes associated with a bi-directional node (for example, the bi-directional node 604) of the fractal node 602. The set of overlay nodes may be configured to extend the functionality of the bi-directional node. In such embodiments, the processing circuitry (for example, the controller module 206, the transaction module 208, the bi-directional node management module 216, or the like) may identify the set of overlay nodes associated with the bi-directional node. The operation associated with the stimulus may be further executed based on the set of overlay nodes.

Although it is described that the functionality of the bi-directional node 604 is extended by the generic overlay node 623 and the bi-directional overlay node 624, and the functionality of the bi-directional node 606 is extended by the overlay node 638, the scope of the present disclosure is not limited to it. In numerous additional embodiments, the overlay nodes associated with a fractal node (e.g., the overlay node 612 associated with the fractal node 602) may further extend the functionality of at least one of the bi-directional nodes 604 and 606. The functionality may be extended based on a set of rules associated with each of the overlay nodes. The set of rules may be indicative of priority associated with the overlay nodes, one or more bi-directional nodes of the first plurality of bi-directional nodes that are to be extended by one or more overlay nodes associated with the fractal node, or the like.

In one example, the operation associated with the stimulus may be executed based on the overlay node 612 instead of the generic overlay node 623, the bi-directional overlay node 624, and the overlay node 638. That is to say, the overlay node 612 overrides the generic overlay node 623, the bi-directional overlay node 624, and the overlay node 638 during the execution of the operation associated with the stimulus. In another example, the overlay node 612 overrides the generic overlay node 623, the bi-directional overlay node 624, and the overlay node 638 when a type (for example, an encryption overlay type) associated with the overlay node 612 is similar to the type associated with each of the generic overlay node 623, the bi-directional overlay node 624, and the overlay node 638. In yet another example, the overlay node 612 overrides the generic overlay node 623, the bi-directional overlay node 624, and the overlay node 638 based on the set of rules indicating that a priority of the overlay node 612 is higher in comparison to that of the generic overlay node 623, the bi-directional overlay node 624, and the overlay node 638. In a further example, the generic overlay node 623, the bi-directional overlay node 624, and the overlay node 638 override the overlay node 612 during the execution of the operation associated with the stimulus based on a set of rules associated with each of the generic overlay node 623, the bi-directional overlay node 624, and the overlay node 638 indicating higher priority of the corresponding overlay nodes in comparison to the overlay node 612.

In some embodiments, the overlay node 612 may extend the functionality of one or more bi-directional nodes of the fractal node 602 that do not have any other overlay node associated therewith.

In some embodiments, one or more bi-directional nodes of the fractal node 602 may be utilized for the execution of another operation associated with another stimulus that is outside a context of the fractal node 602. In such embodiments, one or more bi-directional overlay nodes associated with the one or more bi-directional nodes, respectively, may be further utilized for the execution of the other operation.

In some embodiments, prior to the execution of the operation associated with the stimulus, if the fractal node 602 is not present in the executable graph-based model 100, the processing circuitry (for example, the controller module 206, the transaction module 208, the bi-directional node management module 216, or the like) may load the fractal node 602 in entirety into the executable graph-based model 100. The fractal node 602 may be loaded based on the reception of the stimulus. Further, upon execution of the operation associated with the stimulus, the processing circuitry (for example, the controller module 206, the transaction module 208, the bi-directional node management module 216, or the like) may unload the fractal node 602 from the executable graph-based model 100.

In some embodiments, prior to the execution of the operation associated with the stimulus, the processing circuitry (for example, the controller module 206, the transaction module 208, the bi-directional node management module 216, or the like) may identify, based on the stimulus, at least one of a group consisting of one or more fractal nodes, one or more bi-directional nodes, or one or more overlay nodes associated with the fractal node 602, and load the identified nodes in the executable graph-based model 100. Further, upon execution of the operation associated with the stimulus, the processing circuitry (for example, the controller module 206, the transaction module 208, the bi-directional node management module 216, or the like) may unload, from the executable graph-based model 100, at least one of a group consisting of the one or more fractal nodes, the one or more bi-directional nodes, or the one or more overlay nodes associated with the fractal node 602.

Although FIG. 6A illustrates that the fractal node 602 includes various bi-directional nodes, the scope of the present disclosure is not limited to it. In several embodiments, the fractal node 602 may further include a set of fractal nodes. In such embodiments, the operation associated with the stimulus is executed further based on the set of fractal nodes.

In some embodiments, each node illustrated in FIG. 6A may correspond to a run-time node (for example, the run-time node 370) that includes a node template and a node instance, where the node template corresponds to a predefined node structure, whereas the node instance corresponds to an implementation of the node template.

Having discussed a few features of the fractal node 602, the description now moves towards discussion of additional features associated with the fractal node 602.

Referring to FIG. 6B, the fractal node 602 is shown to include the bi-directional nodes 604 and 606 coupled to each other by way of the connection link 614. The bi-directional node 604 is further coupled to a bi-directional node 642 of the second plurality of bi-directional nodes by way of a connection link 644. The connection link 644 includes an ICO 646 and an OCO 648 that define association with the bi-directional node 604 and the bi-directional node 642, respectively.

In an embodiment, the bi-directional node 604 may be private such that the coupling between the bi-directional node 604 and the bi-directional node 642 corresponds to an indirect coupling. That is to say, the bi-directional node 604 is hidden from the bi-directional node 642. In other words, the bi-directional node 642 is aware that the connection link 644 couples the bi-directional node 642 to the fractal node 602, however, the bi-directional node 642 is not aware of the bi-directional node 604 that is present inside the fractal node 602. The fractal node 602 further includes a port 649 that is configured to facilitate the indirect coupling between the bi-directional node 604 and the bi-directional node 642. In other words, the bi-directional node 604 is coupled to the bi-directional node 642 via the port 649. The port 649 may be further configured to expose the ICO 646 to the bi-directional node 642, while the bi-directional node 604 is hidden from the bi-directional node 642.

The bi-directional node 606 is further coupled to a bi-directional node 650 of the second plurality of bi-directional nodes by way of a connection link 652. The connection link 652 includes an OCO 654 and an ICO 656 that define association with the bi-directional node 606 and the bi-directional node 650, respectively.

In an embodiment, the bi-directional node 606 may be private such that the coupling between the bi-directional node 606 and the bi-directional node 650 corresponds to an indirect coupling. That is to say, the bi-directional node 606 is hidden from the bi-directional node 650. In other words, the bi-directional node 650 is aware that the connection link 652 couples the bi-directional node 650 to the fractal node 602, however, the bi-directional node 650 is not aware of the bi-directional node 606 which is present inside the fractal node 602. The fractal node 602 further includes a port 658 that is configured to facilitate the indirect coupling between the bi-directional node 606 and the bi-directional node 650. The port 658 is further configured to expose the OCO 654 to the bi-directional node 650.

The bi-directional node 642 may receive an input from a bi-directional node (not shown) of the second plurality of bi-directional nodes. The input received by the bi-directional node 642 may act as a stimulus (for example, the stimulus 230). The stimulus may correspond to a signal, an event, a query, or a command. The stimulus may be communicated to the bi-directional node 604 by way of the OCO 648 and the ICO 646, that is exposed to the bi-directional node 642 via the port 649. Based on the stimulus, the processing circuitry (for example, the controller module 206, the transaction module 208, the bi-directional node management module 216, or the like) may use the bi-directional node 604 to generate a message (for example, a signal, an event, a query, a command, an instruction, or the like). The message may be generated based on an execution of processing logic associated with at least one of the generic overlay node 623, the bi-directional overlay node 624, or the overlay node 626 associated with the bi-directional overlay node 624. The message may be communicated to the bi-directional node 606 for further execution of an operation associated with stimulus processing of the stimulus in a similar manner as described in FIG. 6A.

At the bi-directional node 606, the processing circuitry (for example, the controller module 206, the transaction module 208, or the like) may execute processing logic associated with the overlay node 638 on the message. Based on the execution of the processing logic associated with the overlay node 638, another message (for example, a signal, an event, a query, a command, an instruction, or the like) is generated at the bi-directional node 606. The message generated at the bi-directional node 606 may have to be communicated to the bi-directional node 650 for further stimulus processing.

The message generated at the bi-directional node 606 may be communicated to the bi-directional node 650 by way of the OCO 654 that is exposed to the bi-directional node 650 via the port 658, and the ICO 656. At the bi-directional node 650, the processing circuitry (for example, the controller module 206, the transaction module 208, or the like) may execute, on the message, the processing logic associated with an overlay node 660 of the bi-directional node 650. The operation associated with the stimulus may be completed and a stimulus response may be generated by the bi-directional node 650. The stimulus response may be published using a publisher overlay node 662 associated with the bi-directional node 650.

The fractal node 602 described in FIG. 6B does not expose the bi-directional nodes 604 and 606 to nodes that are outside the fractal node 602. That is to say, the fractal node 602 corresponds to a private fractal node which may be utilized for performing a specific operation without disclosing any internal operations of the fractal node 602. Thus, the fractal node 602 being a private node may be utilized in scenarios where data and/or processing logic of the bi-directional nodes of the fractal node 602 are to be protected and kept private.

To summarize, FIG. 6B describes an operation associated with the stimulus. The processing circuitry (for example, the controller module 206, the transaction module 208, the bi-directional node management module 216, or the like) executes the operation associated with the stimulus based on the bi-directional nodes 604, 606, 642, and 650, the connection links 614, 644, and 652, and the ports 649 and 658.

Referring to FIG. 6C, the fractal node 602 is shown to include the bi-directional nodes 604 and 606 coupled to each other by way of the connection link 614. Further, the bi-directional node 642 is coupled to the bi-directional node 604 by way of the connection link 644 and the port 649. In the executable graph-based model 100 of FIG. 6C, the bi-directional node 650 may be coupled to the bi-directional node 606 where the coupling therebetween is the direct coupling. The coupling between the bi-directional node 650 and the bi-directional node 606 may be the direct coupling due to the bi-directional node 606 being public.

The second plurality of bi-directional nodes may further include a bi-directional node 664 that is coupled to the bi-directional node 604 by way of a connection link 666. The connection link 666 includes an ICO 668 and an OCO 670 that define association with the bi-directional node 604 and the bi-directional node 664, respectively. Additionally, the bi-directional node 604 may be private. Thus, the coupling between the bi-directional node 604 and the bi-directional node 664 may correspond to the indirect coupling. As a result, the port 649 may expose the ICO 668 to the bi-directional node 664.

The ICO 646 and the ICO 668 may constitute an inward group object 672 associated with the bi-directional node 604. The inward group object 672 may be a convergence point for ICOs 646 and 668 of the connection links 644 and 666 associated with the bi-directional node 604. Further, the port 649 may expose the inward group object 672 to the bi-directional nodes 642 and 664.

The bi-directional node 642 may receive an input from a bi-directional node (not shown) of the second plurality of bi-directional nodes and the bi-directional node 664 may receive another input from another bi-directional node (not shown) of the second plurality of bi-directional nodes. The inputs received by the bi-directional nodes 642 and 664 may act as a stimulus (for example, the stimulus 230). The inputs may be communicated to the inward group object 672. At the inward group object 672, the processing circuitry (for example, the controller module 206, the transaction module 208, the bi-directional node management module 216, or the like) may execute processing logic associated with an overlay node 674 of the inward group object 672 on the received inputs. A message may be generated based on the execution of the processing logic associated with the overlay node 674. The message may be communicated to the bi-directional node 604 via the port 649.

Based on the message, the processing circuitry (for example, the controller module 206, the transaction module 208, the bi-directional node management module 216, or the like) may use the bi-directional node 604 to generate another message (for example, a signal, an event, a query, a command, an instruction, or the like). The message may be generated based on the execution of the processing logic associated with at least one of the generic overlay node 623, the bi-directional overlay node 624, or the overlay node 626. The message may be communicated to the bi-directional node 606 for further stimulus processing in the similar manner as described above in FIG. 6A.

At the bi-directional node 606, the processing circuitry (for example, the controller module 206, the transaction module 208, the bi-directional node management module 216, or the like) may execute the processing logic associated with the overlay node 638 on the message. Based on the execution of the processing logic associated with the overlay node 638, yet another message (for example, a signal, an event, a query, a command, an instruction, or the like) is generated at the bi-directional node 606. The message generated at the bi-directional node may be communicated to the bi-directional node 650 for further stimulus processing.

The message generated at the bi-directional node 606 may be communicated to the bi-directional node 650 by way of the OCO 654 and the ICO 656. As shown, at the bi-directional node 650, the processing circuitry (for example, the controller module 206, the transaction module 208, the bi-directional node management module 216, or the like) may execute processing logic associated with an overlay node 660 of the bi-directional node 650 on the message. The operation associated with the stimulus may be completed and a stimulus response may be generated by the bi-directional node 650. The stimulus response may be published using the publisher overlay node 662 associated with the bi-directional node 650.

The fractal node 602 described in FIG. 6C does not expose the bi-directional node 604 to the nodes that are outside the fractal node 602 and exposes the bi-directional node 606 to the nodes that are outside the fractal node 602. Such a fractal node may be utilized in scenarios where the data and/or processing logic of the bi-directional node 604 are to be protected and kept private whereas the data and/or processing logic of the bi-directional node 606 can be exposed to the nodes that are outside the fractal node 602.

Although FIG. 6C illustrates one port associated with the bi-directional node 604, the scope of the present disclosure is not limited to it. In numerous embodiments, the fractal node 602 may include more than one port associated with the bi-directional node 604. In such embodiments, an outward group object associated with the bi-directional node 604 may be exposed via another port of the fractal node 602.

To summarize, FIGS. 6A-6C describes an operation associated with stimulus processing using the fractal node 602 in the executable graph-based model 100.

Figure 7:
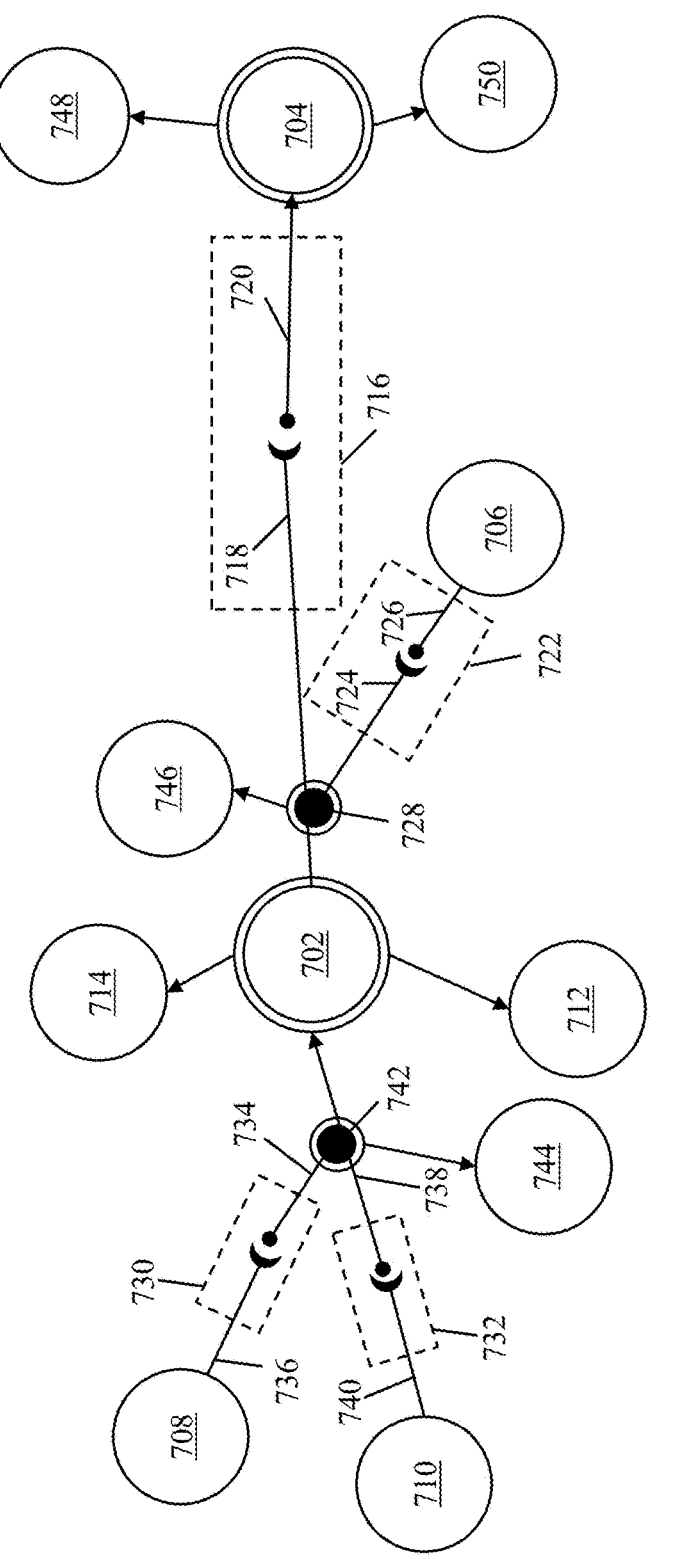
FIG. 7 illustrates a facilitation of fractal nodes in the executable graph-based model, consistent with disclosed embodiments of the present disclosure.

FIG. 7 illustrates the facilitation of fractal nodes in the executable graph-based model 100, consistent with disclosed embodiments of the present disclosure. The executable graph-based model 100 includes the first plurality of fractal nodes. The first plurality of fractal nodes may include fractal nodes 702-710. The fractal node 702 is extended by way of a generic overlay node 712 and a bi-directional overlay node 714. Although not shown in FIG. 7, each fractal node of the first plurality of fractal nodes may include a corresponding plurality of bi-directional nodes and a corresponding plurality of connection links as described in FIGS. 6A-6C. In an example, the fractal node 702 may be similar to the fractal node 602 described in any of the FIGS. 6A-6C.

As shown in FIG. 7, the fractal node 702 may be associated with the fractal node 704 by way of a connection link 716. The connection link 716 includes an OCO 718 defining association with the fractal node 702 and an ICO 720 defining association with the fractal node 704. In other words, the OCO 718 and the ICO 720, collectively, form the connection link 716. The OCO 718 is owned by the fractal node 702 whereas the ICO 720 is owned by the fractal node 704. The OCO 718 may include a primary role that is indicative of a capacity in which the fractal node 702 is associated with the fractal node 704, whereas the ICO 720 may include a secondary role that is indicative of a capacity in which the fractal node 704 is associated with the fractal node 702. The primary role and the secondary role may be complementary. The primary role and the secondary role, collectively, are indicative of a mutual relationship/association between the fractal nodes 702 and 704. In other words, the primary role and the secondary role, collectively, indicate a capacity in which the fractal node 702 and the fractal node 704 are mutually associated.

In some embodiments, the connection link 716 may be realized as a bi-directional node with a role node-type. In such embodiments, the OCO 718 and the ICO 720 may also be associated with corresponding generic overlay nodes and/or bi-directional overlay nodes.

In some embodiments, the association between the fractal nodes 702 and 704 may be based on a dependency therebetween. The connection link 716 may be further indicative of the dependency between the fractal nodes 702 and 704. The dependency between the fractal nodes 702 and 704 may be an own-owned dependency, a use-used dependency, or a share-shared dependency.

In some embodiments, based on the dependency between the fractal nodes 702 and 704 being the own-owned dependency, the fractal node 702 may own the fractal node 704. Thus, the fractal node 704 may be exclusive to the fractal node 702. In other words, exclusively the fractal node 702 may use data and/or processing logic associated with the fractal node 704. In an instance, when the dependency between the fractal nodes 702 and 704 may be the own-owned dependency, the primary role may be 'own' and the secondary role may be 'owned'.

In some embodiments, based on the dependency between the fractal nodes 702 and 704 being the use-used dependency, the fractal node 702 may exclusively use the fractal node 704 at a given time instance. In other words, the fractal node 702 may exclusively use data and/or processing logic associated with the fractal node 704 at the given time-instance. The fractal node 704 may be used by another fractal node associated therewith at a time instance later or prior to the given time instance. Thus, the fractal node 702 uses the fractal node 704 based on an absence of simultaneous use of the fractal node 704 by one or more other fractal nodes. In an instance, when the dependency between the fractal nodes 702 and 704 may be the use-used dependency, the primary role may be 'use' and the secondary role may be 'used'.

In some embodiments, based on the dependency between the fractal nodes 702 and 704 being the share-shared dependency, the fractal node 702 may use the fractal node 704 while sharing the fractal node 704 with one or more other fractal nodes associated therewith. In other words, the fractal node 702 may use the data and/or processing logic associated with the fractal node 704 while sharing the fractal node 704 with the one or more other fractal nodes. In other words, the fractal node 704 may be simultaneously used by the fractal node 702 and the one or more other fractal nodes. In an instance, when the dependency between the fractal nodes 702 and 704 may be the share-shared dependency, the primary role may be 'share' and the secondary role may be 'shared'.

The fractal node 702 is further coupled to the fractal node 706 by way of a connection link 722. The connection link 722 includes an OCO 724 defining association with the fractal node 702 and an ICO 726 defining association with the fractal node 706. The OCO 718 and the OCO 724 constitute an outward group object 728 associated with the fractal node 702. An outward group object is a logical part of an associated fractal node that communicates a message via outward connection objects of one or more connection links associated therewith. The outward group object 728 may be a divergence point for one or more OCOs (for example, the OCOs 718 and 724) of various connection links (for example, the connection links 716 and 722) associated with the fractal node 702.

The fractal node 702 is further coupled to the fractal nodes 708 and 710 by way of connection links 730 and 732, respectively. The connection link 730 includes an ICO 734 defining association with the fractal node 702 and an OCO 736 defining association with the fractal node 708. Further, the connection link 732 includes an ICO 738 defining association with the fractal node 702 and an OCO 740 defining association with the fractal node 710. The ICO 734 and the ICO 738 constitute an inward group object 742 associated with the fractal node 702. An inward group object is a logical part of an associated fractal node that receives inputs via ICOs of one or more connection links associated therewith. The inward group object 742 may be a convergence point for one or more ICOs (for example, the ICOs 734 and 738) of various connection links (for example, the connection links 730 and 732) associated with the fractal node 702.

The fractal node 702 may thus receive inputs from at least one of the fractal nodes 708 and 710 at the inward group object 742. In an instance, the inward group object 742 may forward the received inputs separately to the fractal node 702. In another instance, the inward group object 742 may forward the received inputs as a combined input signal to the fractal node 702. In some embodiments, the inward group object 742 may be associated with one or more overlay nodes (for example, an overlay node 744). In such cases, functionalities of the one or more overlay nodes may be executed on the received inputs. Subsequently, an output of the execution may be provided to the fractal node 702 as the input.

In other embodiments, one or more connection links that provide input to the fractal node 702 may be directly associated with the fractal node 702. In other words, the one or more connection links that provide the input to the fractal node 702 may be associated with the fractal node 702 without being associated with the inward group object 742. In such embodiments, the overlay node functionalities may not be executed on the received input.

The input received by the fractal node 702 may act as a stimulus (for example, the stimulus 230). Based on the stimulus, the processing circuitry (for example, the controller module 206, the transaction module 208, or the like) may use the fractal node 702 to generate a message (for example, a signal, an event, a query, a command, an instruction, or the like). The message may be generated based on the execution of the processing logic associated with the generic overlay node 712 and the bi-directional overlay node 714. The message may be communicated to the fractal node 704 for further stimulus processing. The message may pass through the outward group object 728. Notably, the message being communicated via the outward group object 728 may be communicated to each fractal node that may be associated with the fractal node 702 via connection links with corresponding OCOs diverging from the outward group object 728. Additionally, the outward group object 728 may be extended by an overlay node 746 (for example, a generic overlay node or a bi-directional overlay node).

At the outward group object 728, the processing circuitry (for example, the controller module 206, the transaction module 208, the bi-directional node management module 216, or the like) may identify the overlay node 746 associated with the outward group object 728 and execute the processing logic associated with the overlay node 746 on the message. Subsequently, the message may be communicated to the fractal nodes 704 and 706 via the connection links 716 and 722, respectively. While being communicated to the fractal node 704, the message may pass through the OCO 718 and the ICO 720. Thus, the fractal node 704 may be identified in the executable graph-based model 100 based on the connection link 716.

At the fractal node 704, the processing circuitry (for example, the controller module 206, the transaction module 208, the bi-directional node management module 216, or the like) may execute processing logic associated with an overlay node 748 (for example, a generic overlay node or a bi-directional overlay node) of the fractal node 704 on the message. Based on the execution of the processing logic associated with the overlay node 748, the operation associated with the stimulus may be completed and a stimulus response may be generated by the fractal node 704. The operation associated with the stimulus is thus executed based on the fractal node 702, the generic overlay node 712, the bi-directional overlay node 714, the connection link 716, the fractal node 704, and the overlay node 748. Further, the operation is executed in conformity with the primary role and the secondary role of the connection link 716. The operation associated with the stimulus may be executed further based on the fractal nodes 708 and 710, the connection links 730 and 732, the inward group object 742, the overlay node 744, the outward group object 728, the overlay node 746, the connection link 722, and the fractal node 706. The stimulus response may be published using a publisher overlay node 750 associated with the fractal node 704.

Although not shown, the fractal nodes 702 and 704 may include pluralities of bi-directional nodes and connection links. Thus, the processing circuitry the controller module 206, the transaction module 208, the bi-directional node management module 216, or the like) may determine, in each of the fractal nodes 702 and 704, for processing the stimulus, a set of bi-directional nodes of the corresponding plurality of bi-directional nodes, and a set of connection links, of the corresponding plurality of connection links, that couples the determined set of bi-directional nodes to each other. Further, the operation associated with the stimulus may be executed based on the set of bi-directional nodes and the set of connection links determined for each of the fractal nodes 702 and 704.

It will be apparent to a person skilled in the art that a message being executed between two fractal nodes (for example, between the fractal nodes 708 and/or 710 and the fractal node 704) passes through various junctures (for example, inward group object 742, the fractal node 702, the outward group object 728, the OCO 718, the ICO 720, and the fractal node 704) in a sequential manner. At each juncture, in case one or more associated overlay nodes (for example, a generic overlay node and/or a bi-directional overlay node) are present, the processing logic of each overlay node may be executed on the message and a modified message may be transmitted to the next juncture.

Although not shown, the fractal node 704 may have an inward group object via which the fractal node 704 may be associated with two or more fractal nodes of the first plurality of fractal nodes. The inward group object is a convergence point associated with the fractal node 704 for receiving inputs from the two or more fractal nodes. Thus, the fractal node 704 may receive the message from the associated inward group object. Additionally, the fractal node 704 may have an outward group object via which the fractal node 704 may be associated with two or more fractal nodes of the first plurality of fractal nodes. In some embodiments, the processing circuitry (for example, the controller module 206, the transaction module 208, the bi-directional node management module 216, or the like) may execute the operation associated with the stimulus further based on the two or more fractal nodes associated with the fractal node 704 via the outward group object. The fractal node 704 may communicate with the two or more fractal nodes via the outward group object.

For the sake of brevity, the connection link 716 is assumed to be the node with the role node-type. In other embodiments, the connection link 716 may be implemented as roles that are integral to the fractal nodes 702 and 704 that are edge node-types. In other words, the primary role may be realized by the fractal node 702 and the secondary role may be realized as part of the fractal node 704 without deviating from the scope of the disclosure. In such embodiments, the OCO 718 and the ICO 720 of the connection link 716 may not be associated with any overlay nodes.

It will be apparent to a person skilled in the art that operations being performed by a node of the executable graph-based model 100 are realized by the processing circuitry (for example, the controller module 206, the transaction module 208, the bi-directional node management module 216, or any other component of the overlay system 202) while using relevant nodes.

For the sake of brevity, a single communication link (for example, the connection link 716) is shown between the fractal nodes 702 and 704. The connection link 716 allows the fractal node 702 to communicate with the fractal node 704. For the fractal node 704 to be able to communicate with the fractal node 702, another communication link (not shown) may be instantiated between the fractal nodes 702 and 704 such that an ICO may be associated with the fractal node 702 and an OCO may be associated with the fractal node 704.

It will be apparent to a person skilled in the art that the fractal nodes 702 and 704 may be further associated with one or more generic nodes. In such a scenario, the operation associated with the stimulus may be executed further based on the one or more generic nodes.

To summarize, the processing circuitry (for example, the controller module 206, the transaction module 208, the bi-directional node management module 216, or the like) may receive the stimulus associated with the overlay system 202 and identify the fractal node 702 from the first plurality of fractal nodes in the executable graph-based model 100 based on the stimulus. Further, the processing circuitry may determine the connection link 716 that is coupled to the fractal node 702. The connection link includes the OCO 718 defining the association with the fractal node 702 and the ICO 720 defining the association with the fractal node 704. The processing circuitry may further identify the fractal node 704 in the executable graph-based model 100 based on the connection link 716. The processing circuitry may further execute an operation associated with the stimulus based on the fractal node 702, the fractal node 704, and the connection link 716.

In some embodiments, the fractal node 702 and the fractal node 704 may include at least one common bi-directional node. In other words, a set of bi-directional nodes of the fractal node 702 and a set of bi-directional nodes of the fractal node 704 may include at least one common bi-directional node. The fractal node 702 and the fractal node 704 may thus be mutually inclusive.

Although not shown, the outward group object 728 may be associated with a set of overlay nodes of the executable graph-based model 100 that may include more than one overlay node. The set of overlay nodes extends the functionality of the outward group object 728. In such embodiments, the processing circuitry (for example, the controller module 206, the transaction module 208, the bi-directional node management module 216, or the like) may identify the set of overlay nodes associated with the outward group object 728. The execution of the operation associated with the stimulus may be further based on the identified set of overlay nodes.

Although not shown, the inward group object 742 may be associated with a set of overlay nodes of the executable graph-based model 100 that may include more than one overlay node. The inward group object 742 may extend the functionality of the inward group object 742. In such embodiments, the processing circuitry (for example, the controller module 206, the transaction module 208, the bi-directional node management module 216, or the like) may further identify the set of overlay nodes associated with the inward group object 742. The execution of the operation associated with the stimulus may be further based on the identified set of overlay nodes.

Figure 8A:
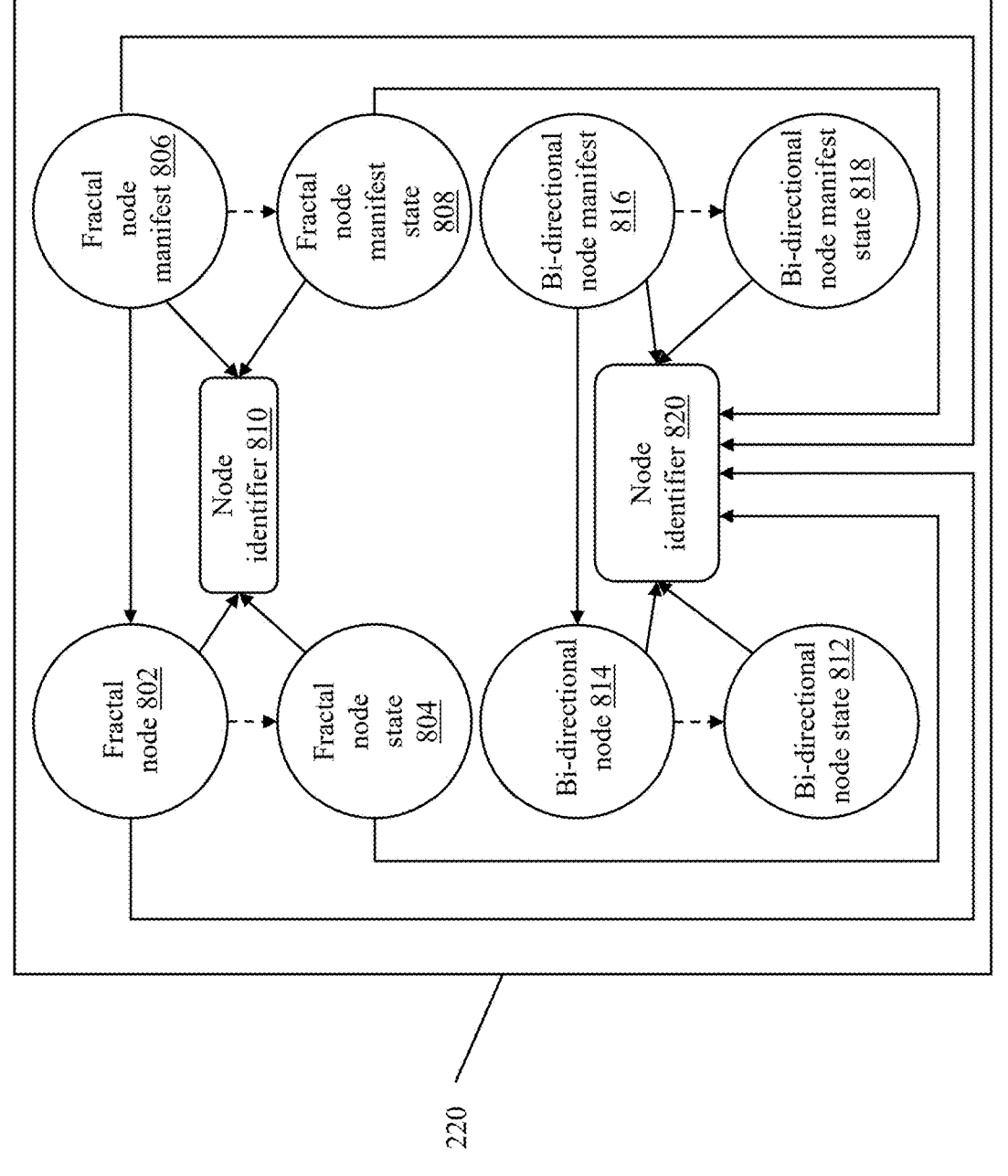
FIG. 8A is a schematic diagram that illustrates a storage mechanism for a fractal node, consistent with disclosed embodiments of the present disclosure.
Figure 8B:
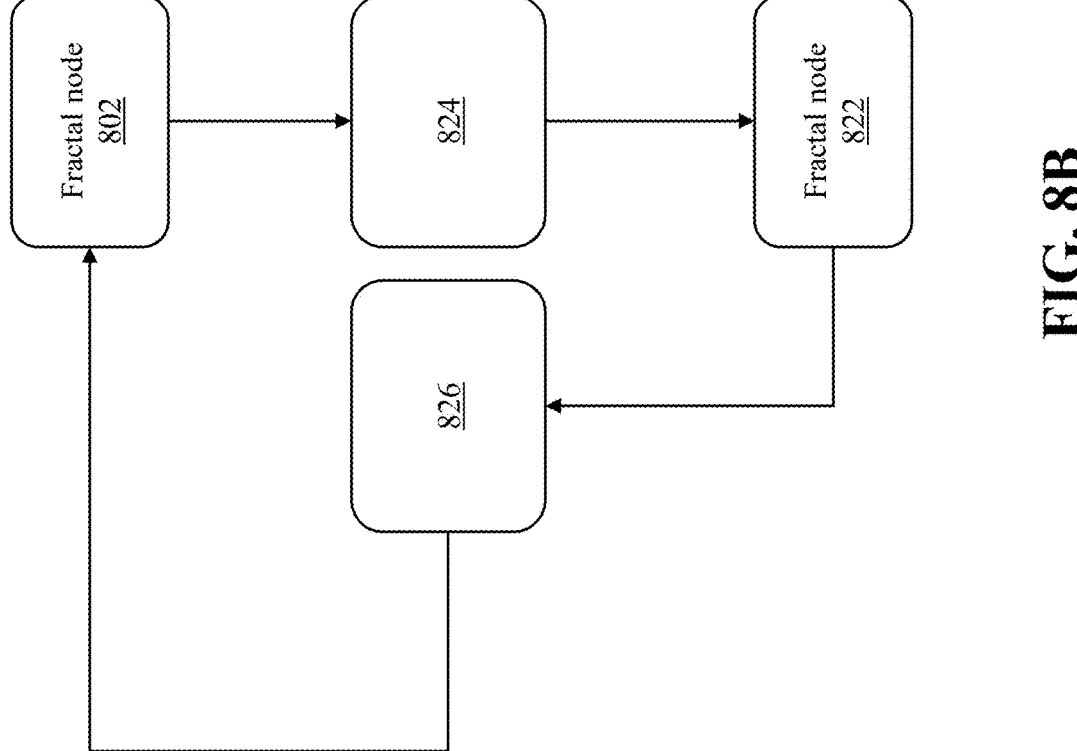
FIGS. 8B and 8C are block diagrams that, collectively, illustrate loading of fractal nodes in the executable graph-based model, consistent with disclosed embodiments of the disclosure.
Figure 8C:
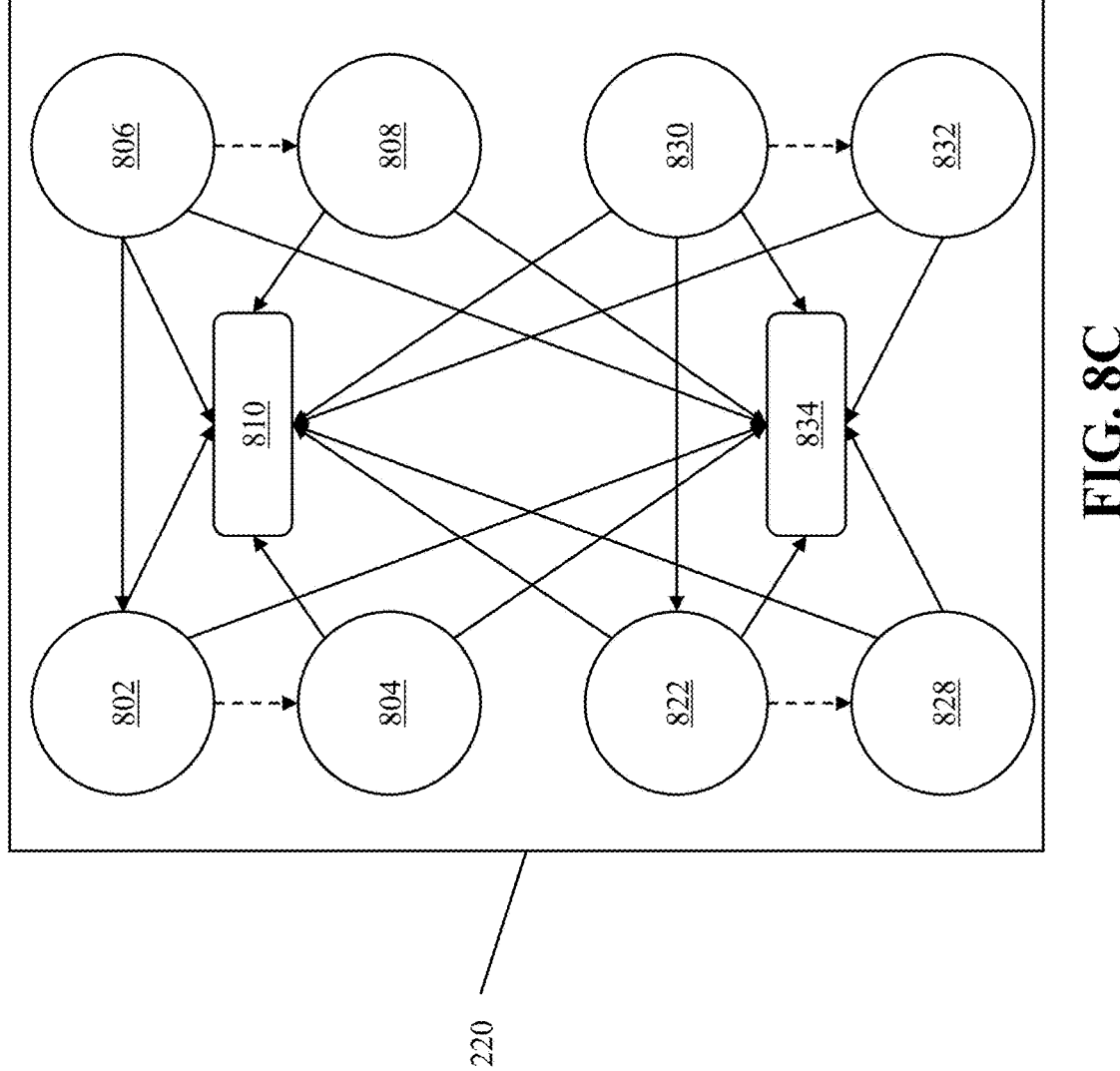
Figure 8C:

As mentioned earlier, prior to execution of the operation associated with the stimulus, relevant nodes are required to be loaded in the executable graph-based model 100. Further, upon execution of the operation, the nodes that are loaded may be unloaded from the executable graph-based model 100. FIGS. 8A-8C, collectively, illustrates a process of loading of fractal nodes required for processing of the stimulus (for example, the stimulus 230) and unloading of the fractal nodes after processing of the stimulus.

FIG. 8A is a schematic diagram 800A that illustrates a storage mechanism for a fractal node 802, consistent with disclosed embodiments of the present disclosure. The fractal node 802 may be similar to the fractal node 602. As mentioned previously, a fractal node (for example, the fractal node 802) includes a plurality of bi-directional nodes. Therefore, the storage of the fractal node corresponds to the storage of each bi-directional node of the plurality of bi-directional nodes. Additionally, the loading of the fractal node corresponds to the loading of one or more bi-directional nodes of the plurality of bi-directional nodes that are required for the execution of an operation associated with a stimulus (for example, the stimulus 230). As shown, the mechanism of the storage of the fractal node 802 is encompassed within the functionalities performed by the storage management module 220. The storage management module 220 may perform such storage and loading of the fractal node 802 in conjunction with the controller module 206 and the memory management module 218.

Referring to FIG. 8A, as shown, the fractal node 802 may be associated with a fractal node state 804 that includes information to re-construct the fractal node 802. That is to say, the fractal node state 804 includes an ID (e.g., a node identifier) associated with each bi-directional node of the plurality of bi-directional nodes. The processing circuitry (such as the memory management module 218 and the storage management module 220) may be configured to create the fractal node state 804 and store the fractal node state 804 in a storage location of a node state storage of the storage management module 220. The processing circuitry (such as the memory management module 218 and the storage management module 220) may be configured to create a fractal node manifest 806 that has the storage location of the fractal node state 804. Subsequently, the processing circuitry (such as the memory management module 218 and the storage management module 220) may be configured to create a fractal node manifest state 808 that includes information to re-construct the fractal node manifest 806. The processing circuitry (such as the memory management module 218 and the storage management module 220) may be configured to store the fractal node manifest state 808 in a manifest storage of the overlay system 202. As shown, each of the fractal node 802, the fractal node state 804, the fractal node manifest 806, and the fractal node manifest state 808 are associated with the same node identifier 810.

The processing circuitry (such as the memory management module 218 and the storage management module 220) may be configured to create a bi-directional node state 812 for a bi-directional node 814 of the fractal node 802. The bi-directional node state 812 includes information to re-construct the bi-directional node 814. The bi-directional node state 812 is stored by the processing circuitry (such as the memory management module 218 and the storage management module 220) at a storage location of the node state storage of the storage management module 220. Subsequently, the processing circuitry (such as the memory management module 218 and the storage management module 220) may be configured to generate a bi-directional node manifest 816 that includes the storage location of the bi-directional node state 812 and a bi-directional node manifest state 818 that includes information to re-construct the bi-directional node manifest 816. The processing circuitry (such as the memory management module 218 and the storage management module 220) may be configured to store the bi-directional node manifest state 818 in the manifest storage of the overlay system 202. As shown, each of the bi-directional node state 812, the bi-directional node 814, the bi-directional node manifest 816, and the bi-directional node manifest state 818 are associated with the same node identifier 820. In addition, the node identifier 820 is also associated with each of the fractal node 802, the fractal node state 804, the fractal node manifest 806, and the fractal node manifest state 808.

In operation, the processing circuitry (such as the controller module 206) may be configured to receive a stimulus (for example, the stimulus 230). A context of the stimulus may be indicative of the node identifier 810 of the fractal node 802. Therefore, the processing circuitry (such as the controller module 206, the memory management module 218, and the storage management module 220) may be configured to determine whether the fractal node 802 is loaded in the executable graph-based model 100. In an instance, the processing circuitry (such as the controller module 206, the memory management module 218, and the storage management module 220) may determine that the fractal node 802 is not loaded in the executable graph-based model 100. In such an instance, based on the node identifier 810, the fractal node state 804 may be retrieved as described in conjunction with FIG. 5. The context of the stimulus may be further indicative of the node identifier 820. As mentioned previously, the fractal node state 804 includes the identifier of each bi-directional node of the plurality of bi-directional nodes. Therefore, the node identifier 820 may be retrieved from the fractal node state 804. Subsequently, the fractal node 802 that includes the bi-directional node 814 is loaded based on the node identifier 820 as described in conjunction with FIG. 5. In some embodiments, when the context of the stimulus is indicative of all bi-directional nodes of the plurality of bi-directional nodes, the fractal node 802 that includes the plurality of bi-directional nodes is loaded in the executable graph-based model 100 in a similar manner. In some further embodiments, when the context of the stimulus is indicative of one or more bi-directional nodes of the plurality of bi-directional nodes, only the one or more bi-directional nodes are loaded in the executable graph-based model 100 in a similar manner.

For the sake of brevity, a single bi-directional node is shown in FIG. 8A. It will be apparent to a person skilled in the art that the remaining bi-directional nodes of the fractal node 802 may be stored and loaded in a similar manner.

FIGS. 8B and 8C are block diagrams 800B and 800C that, collectively, illustrate loading of fractal nodes in the executable graph-based model 100, consistent with disclosed embodiments of the disclosure. Referring to FIG. 8B, the fractal node 802 and a fractal node 822 are shown. The fractal node 802 and the fractal node 822 may be coupled by way of a connection link 824 that enables the fractal node 802 to transmit messages to the fractal node 822. The fractal nodes 802 and 822 are further associated with a connection link 826 that enables the fractal node 822 to transmit messages to the fractal node 802. In an instance, when the fractal nodes 802 and 822 may not be used for any operation associated with the overlay system 202, the fractal nodes 802 and 822 may be unloaded from the executable graph-based model 100. In a subsequent instance, the processing circuitry (for example, the controller module 206 and the transaction module 208) may require using the fractal node 802. Therefore, the processing circuitry may load the fractal node 802 as explained in conjunction with FIG. 8A. Based on the association with the fractal node 802, the fractal node 822 may also get loaded in the executable graph-based model 100.

Referring to FIG. 8C, shown is the storage management module 220 of the overlay system 202 that along with the processing circuitry (for example, the controller module 206 and the transaction module 208) and the memory management module 218 manage storage, loading, and unloading of the fractal nodes of the executable graph-based model 100. As described in FIG. 8A, the fractal node 802 has the fractal node state 804. The fractal node state 804 has the fractal node manifest 806 that has the fractal node manifest state 808. In addition, the fractal node 802, the fractal node state 804, the fractal node manifest 806, and the fractal node manifest state 808 are associated with the node identifier 810.

Similarly, the fractal node 822 has a fractal node state 828. The fractal node state 828 has a fractal node manifest 830 that has a fractal node manifest state 832. The fractal node state 828 is similar to the fractal node state 804, the fractal node manifest 830 is similar to the fractal node manifest 806, and the fractal node manifest state 832 is similar to the description of the fractal node manifest state 808. In addition, the fractal node 822, the fractal node state 828, the fractal node manifest 830, and the fractal node manifest state 832 are associated with a node identifier 834.

Notably, the fractal node 802, the fractal node state 804, the fractal node manifest 806, and the fractal node manifest state 808 also are associated with the node identifier 834, whereas the fractal node 822, the fractal node state 828, the fractal node manifest 830, and the fractal node manifest state 832 are also associated with the node identifier 810.

It will be apparent to a person skilled in the art that a fractal node may be loaded in a manner that is similar to the loading of the base node 302. Notably, an executable fractal node may be loaded in a manner that is similar to the loading of the executable generic node 402.

While loading the fractal node 802, the processing circuitry may determine the node identifier 810 associated with the fractal node 802. Based on the determination of the node identifier 834, the processing circuitry may further load the fractal node 822 in a manner that is similar to the loading of the fractal node 802. Similarly, in other embodiments, while loading the fractal node 822, the processing circuitry may load the fractal node 802.

To summarize, based on the reception of a stimulus associated with the fractal node 802, the fractal node 802, the connection link 824, the fractal node 822, and overlay nodes associated with them may be loaded into the executable graph-based model.

It will be apparent to a person skilled in the art that based on the connection link 826 connecting the fractal node 822 to the fractal node 802, the fractal node 802 may be loaded in an instance when the fractal node 822 gets loaded.

In some embodiments, a fractal node may inherit data and processing logic associated with one or more bi-directional nodes, one or more fractal nodes, or one or more generic nodes. Based on a loading of the fractal node, the one or more bi-directional nodes, the one or more generic nodes, or one or more fractal nodes may also get loaded. Conversely, based on an unloading of the fractal node, the one or more bi-directional nodes, the one or more generic nodes, or the one or more fractal nodes may also get unloaded.

In some embodiments, a fractal node may have a dependency with one or more bi-directional nodes, one or more generic nodes, or one or more fractal nodes. Based on a loading of the fractal node, the one or more bi-directional nodes, the one or more generic nodes, or one or more fractal nodes may also get loaded. Conversely, based on an unloading of the fractal node, the one or more bi-directional nodes, the one or more generic nodes, or the one or more fractal nodes may also get unloaded.

In some embodiments, a fractal node may be associated with a bi-directional overlay node via a connection link. Based on the loading of the fractal node, the bi-directional overlay node may also be loaded. Conversely, based on an unloading of the fractal node, the bi-directional overlay node may also get unloaded.

In some embodiments, when the execution of the stimulus processing of the stimulus gets completed, the fractal nodes 802 and 822, the connection link 824, and overlay nodes associated therewith may be unloaded.

In some embodiments, the fractal node 802 may have the share-shared dependency with the fractal node 822. The fractal node 822 may have a list with entries of fractal nodes currently using data and processing logic associated therewith. In such embodiments, based on a count of entries in the list being non-zero, the fractal node 822 may not be unloaded based on an unloading of the fractal node 802.

Having described the storage, loading, and unloading of fractal nodes, the description now moves towards a use case scenario associated with the overlay system 202 described herein.

Figure 9:
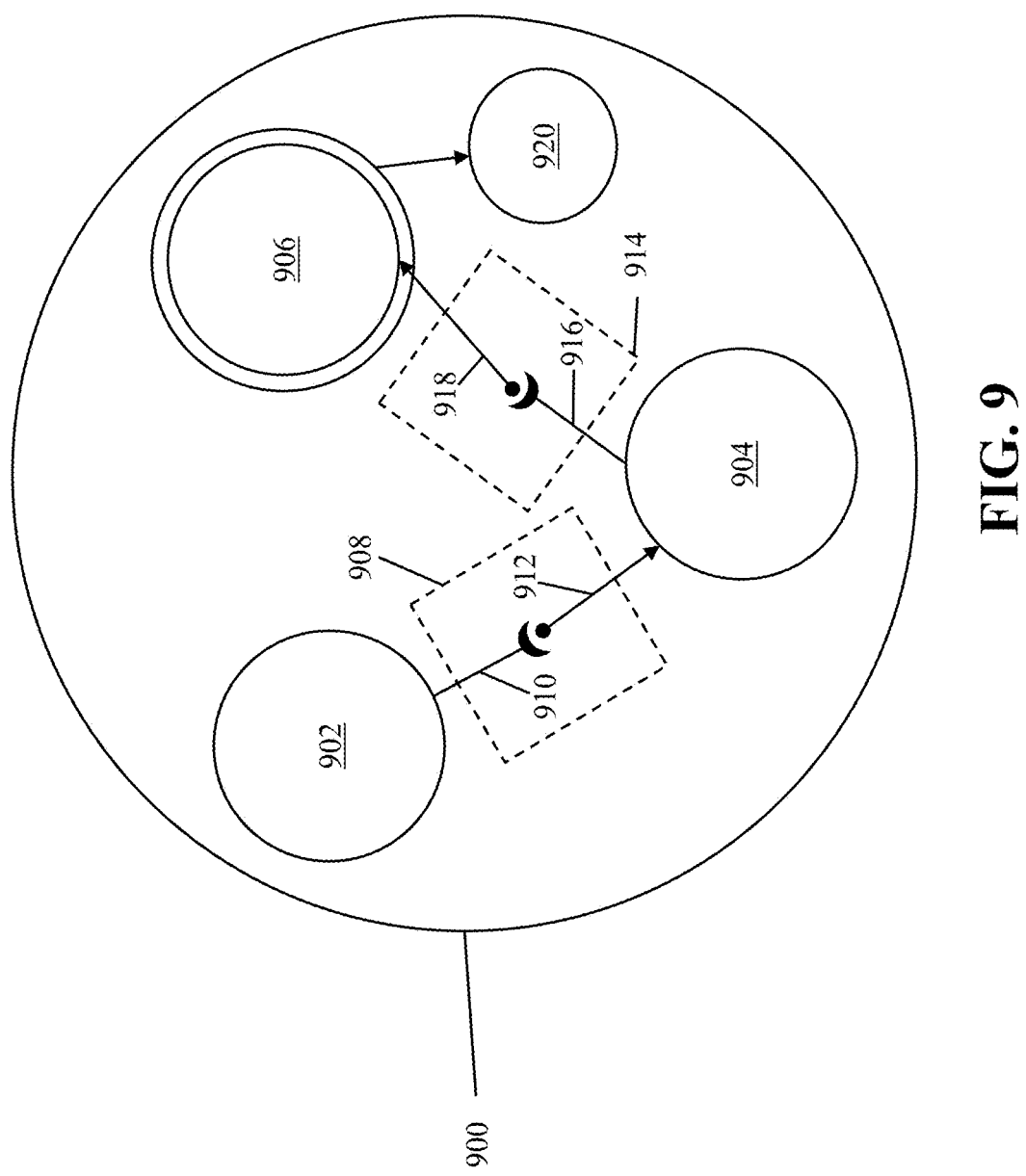
FIG. 9 is a block diagram that illustrates a neural network model in the executable graph-based model for classification of images, consistent with disclosed embodiments of the present disclosure.

FIG. 9 is a block diagram that illustrates a neural network model in the executable graph-based model 100 for classification of images, consistent with disclosed embodiments of the present disclosure. Referring to FIG. 9, the neural network model includes an input layer, a hidden layer, and an output layer. The neural network model corresponds to a fractal node 900 that includes fractal nodes 902-906. The fractal node 902 implements the input layer, the fractal node 904 implements the hidden layer, and the fractal node 906 implements the output layer. The fractal node 902 may receive an image that is to be classified. The fractal node 902 may further capture pixel values associated with the received image. Further, the fractal node 902 may normalize the pixel values based on a requirement for the classification of images. Additionally, the fractal node 902 may resize the image based on a requirement for the classification of images. Thus, the image is modified at the fractal node 902. The image that is modified is hereinafter referred to as "the modified image".

The fractal node 902 is coupled to the fractal node 904 by way of a connection link 908. The connection link 908 may include an OCO 910 and an ICO 912. The fractal node 902 may further communicate the modified image to the fractal node 904 by way of the connection link 908. In other words, the modified image is communicated to the fractal node 902 by way of the OCO 910 and the ICO 912.

The fractal node 904 may perform various operations on the received modified image to extract features associated with the modified image. In an example, a first set of bi-directional nodes of the fractal node 904 may realize convolutional layers that apply filters to the received image to detect patterns. Further, a second set of bi-directional nodes of the fractal node 904 may realize activation functions. The second set of bi-directional nodes may be coupled to the first set of bi-directional nodes and may receive an output of the first set of bi-directional nodes as input. The second set of bi-directional nodes may learn complex patterns based on the received input, and output the learned patterns. Additionally, a third set of bi-directional nodes of the fractal node 904 may be coupled to the second set of bi-directional nodes, and receive the learned patterns. The third set of bi-directional nodes may realize pooling layers that may reduce spatial dimensions of learned patterns and output learned patterns with reduced spatial dimensions. Further, a fourth set of bi-directional nodes of the fractal node 904 may be coupled to the third set of bi-directional nodes, and receive the output of the third set of bi-directional nodes. The fourth set of bi-directional nodes may realize a flatten layer that may flatten the received input and output flattened features. A fifth set of bi-directional nodes of the fractal node 904 may be coupled to the fourth set of bi-directional nodes, and receive the flattened features. The fifth set of bi-directional nodes may realize a fully connected layer that may process the flattened features and output a vector of scores that represents a score of a plurality of classes associated with the neural network model.

The fractal node 904 may be coupled to the fractal node 906 by way of a connection link 914. The connection link 914 may include an OCO 916 and an ICO 918. The fractal node 906 may be further associated with a publisher overlay node 920. The fractal node 906 may receive the vector of scores from the fractal node 904 by way of the connection link 914. The fractal node 906 may classify the image into one or more classes of the plurality of classes based on the vector of scores. Further, the publisher overlay node 920 may publish a classification of the image in one or more of the plurality of classes.

It will be apparent to a person skilled in the art that although a use case scenario for the overlay system 202 is described for an image classification model, implementations of the overlay system 202 are not limited to it. The overlay system 202 may also be implemented for applications in natural language processing, audio processing, robotics, database management, or the like.

Having discussed various concepts, operations, and usage associated with the overlay system 202, the description now moves towards a computing system for implementing the overlay system 202 that incorporates fractal nodes.

Figure 10:
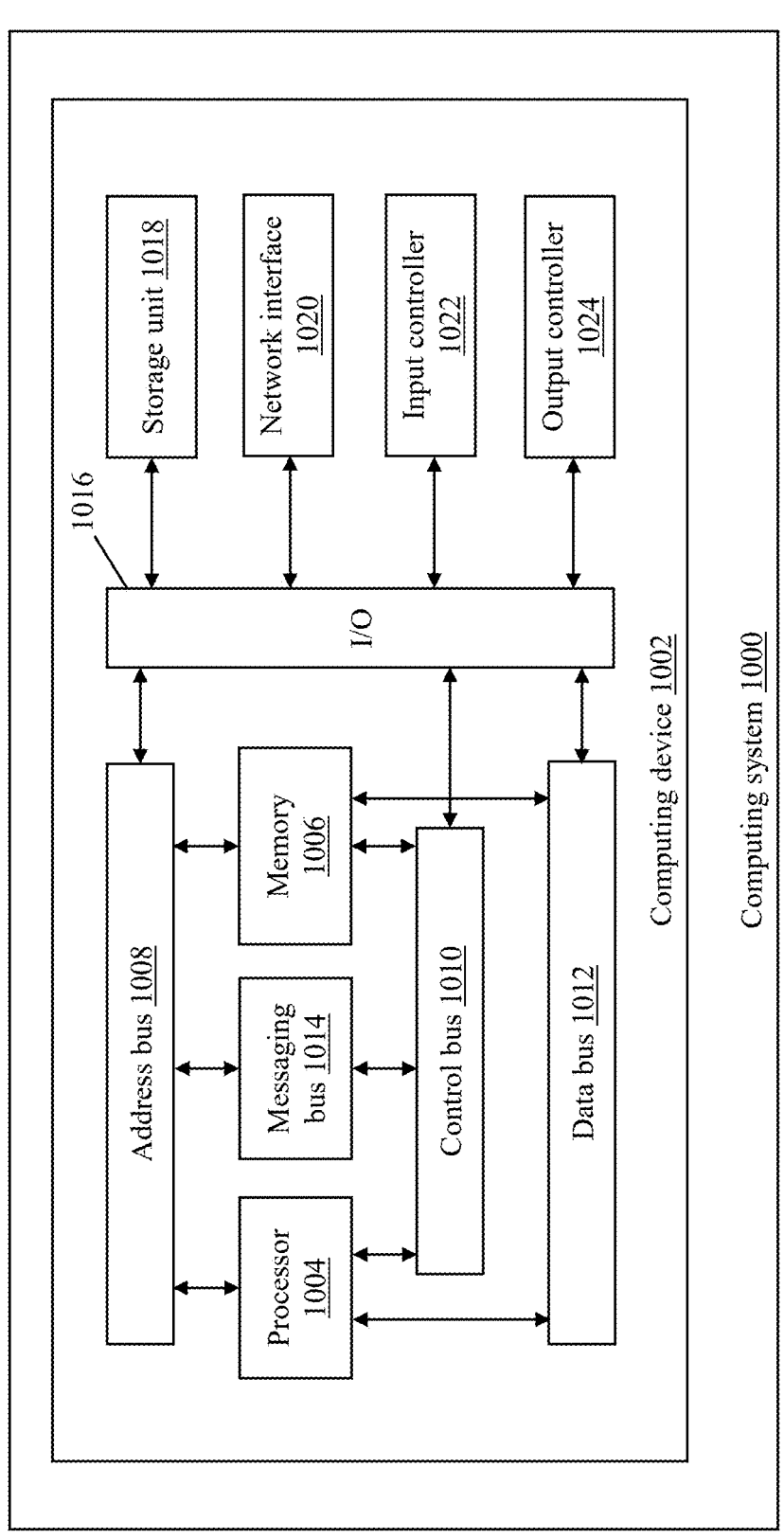
FIG. 10 shows an example computing system for carrying out methods of the present disclosure, consistent with disclosed embodiments of the present disclosure.

FIG. 10 shows an example computing system 1000 for carrying out methods of the present disclosure, consistent with disclosed embodiments of the present disclosure. Specifically, FIG. 10 shows a block diagram of an embodiment of the computing system 1000 according to example embodiments of the present disclosure.

The computing system 1000 may be configured to perform any of the operations disclosed herein, such as, for example, any of the operations discussed with reference to the functional modules described in relation to FIG. 2. The computing system 1000 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1000 is a distributed system configured to function using multiple computing machines interconnected via a data network or bus system.

The computing system 1000 includes computing devices (such as a computing device 1002). The computing device 1002 includes one or more processors (such as a processor 1004) and a memory 1006. The processor 1004 may be any general-purpose processor(s) configured to execute a set of instructions. For example, the processor 1004 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1004 may be multiple processing units, a single processing core, multiple processing cores, special purpose processing cores, co-processors, or any combination thereof. The processor 1004 may be communicatively coupled to the memory 1006 via an address bus 1008, a control bus 1010, a data bus 1012, and a messaging bus 1014.

The memory 1006 may include non-volatile memories such as a read-only memory (ROM), a programable read-only memory (PROM), an erasable programmable read-only memory (EPROM), a flash memory, or any other device capable of storing program instructions or data with or without applied power. The memory 1006 may also include volatile memories, such as a random-access memory (RAM), a static random-access memory (SRAM), a dynamic random-access memory (DRAM), and a synchronous dynamic random-access memory (SDRAM). The memory 1006 may include single or multiple memory modules. While the memory 1006 is depicted as part of the computing device 1002, a person skilled in the art will recognize that the memory 1006 can be separate from the computing device 1002.

The memory 1006 may store information that can be accessed by the processor 1004. For instance, the memory 1006 (e.g., one or more non-transitory computer-readable storage mediums, memory devices) may include computer-readable instructions (not shown) that can be executed by the processor 1004. The computer-readable instructions may be software written in any suitable programming language or may be implemented in hardware. Additionally, or alternatively, the computer-readable instructions may be executed in logically and/or virtually separate threads on the processor 1004. For example, the memory 1006 may store instructions (not shown) that when executed by the processor 1004 cause the processor 1004 to perform operations such as any of the operations and functions for which the computing system 1000 is configured, as described herein. Additionally, or alternatively, the memory 1006 may store data (not shown) that can be obtained, received, accessed, written, manipulated, created, and/or stored. The data can include, for instance, the data and/or information described herein in relation to FIGS. 1-9. In some implementations, the computing device 1002 may obtain from and/or store data in one or more memory device(s) that are remote from the computing system 1000.

The computing device 1002 may further include an input/output (I/O) interface 1016 communicatively coupled to the address bus 1008, the control bus 1010, and the data bus 1012. The data bus 1012 and messaging bus 1014 may include a plurality of tunnels that may support parallel execution of messages by the overlay system 202. The I/O interface 1016 is configured to couple to one or more external devices (e.g., to receive and send data from/to one or more external devices). Such external devices, along with the various internal devices, may also be known as peripheral devices. The I/O interface 1016 may include both electrical and physical connections for operably coupling the various peripheral devices to the computing device 1002. The I/O interface 1016 may be configured to communicate data, addresses, and control signals between the peripheral devices and the computing device 1002. The I/O interface 1016 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, Fire Wire, various video buses, or the like. The I/O interface 1016 is configured to implement only one interface or bus technology. Alternatively, the I/O interface 1016 is configured to implement multiple interfaces or bus technologies. The I/O interface 1016 may include one or more buffers for buffering transmissions between one or more external devices, internal devices, the computing device 1002, or the processor 1004. The I/O interface 1016 may couple the computing device 1002 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1016 may couple the computing device 1002 to various output devices, including video displays, speakers, printers, projectors, tactile feedback devices, automation control, robotic components, actuators, motors, fans, solenoids, valves, pumps, transmitters, signal emitters, lights, and so forth.

The computing system 1000 may further include a storage unit 1018, a network interface 1020, an input controller 1022, and an output controller 1024. The storage unit 1018, the network interface 1020, the input controller 1022, and the output controller 1024 are communicatively coupled to the central control unit (e.g., the memory 1006, the address bus 1008, the control bus 1010, and the data bus 1012) via the I/O interface 1016. The network interface 1020 communicatively couples the computing system 1000 to one or more networks such as wide area networks (WAN), local area networks (LAN), intranets, the Internet, wireless access networks, wired networks, mobile networks, telephone networks, optical networks, or combinations thereof. The network interface 1020 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1018 is a computer-readable medium, preferably a non-transitory computer-readable medium, comprising one or more programs, the one or more programs comprising instructions which when executed by the processor 1004 cause the computing system 1000 to perform the method steps of the present disclosure. Alternatively, the storage unit 1018 is a transitory computer-readable medium. The storage unit 1018 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1018 stores one or more operating systems, application programs, program modules, data, or any other information. The storage unit 1018 is part of the computing device 1002. Alternatively, the storage unit 1018 is part of one or more other computing machines that are in communication with the computing device 1002, such as servers, database servers, cloud storage, network attached storage, and so forth.

The input controller 1022 may include suitable logic, circuitry, interfaces, and/or code, executable by the circuitry, that may be configured to control one or more input devices that may be configured to receive an input (e.g., the stimulus 230) for the overlay system 202. The output controller 1024 may include suitable logic, circuitry, interfaces, and/or code, executable by the circuitry, that may be configured to control one or more output devices that may be configured to render/output the outcome (e.g., the outcome 234) of the operation executed to process the received input (e.g., the stimulus 230).

FIG. 11 illustrates a flowchart 1100 of a method for processing a stimulus using a fractal node, consistent with disclosed embodiments of the present disclosure. Referring to FIG. 11, at 1102, a stimulus is received. The processing circuitry (such as the controller module 206 and the stimuli management module 212) receives the stimulus associated with the overlay system 202. The stimulus is indicative of an operation to be performed using a first fractal node. The first fractal node may include a first plurality of bi-directional nodes and a first plurality of connection links. At 1104, the context of the stimulus is matched with the set of defined contexts. The processing circuitry (such as the controller module 206 and the stimuli management module 212) may match the context of the stimulus with the set of defined contexts. At 1106, it is determined whether a context of the stimulus matches any defined context of the set of defined contexts. The processing circuitry (such as the context module 210) may determine whether the context of the stimulus matches any defined context of the set of defined contexts. In an instance, when it is determined that the context of the stimulus does not match with any of the set of defined contexts, the method terminates. In another instance, when it is determined that the context of the stimulus matches with one or more contexts of the set of defined contexts, 1108 is executed.

At 1108, the first fractal node is identified from the first plurality of fractal nodes of the executable graph-based model 100 based on the context of the stimulus. The processing circuitry (such as the controller module 206, the context module 210, the stimuli management module 212, and the bi-directional node management module 216) may identify the first fractal node from the first plurality of fractal nodes.

At 1110, a first set of bi-directional nodes of the first plurality of bi-directional nodes and a first set of connection links, of the first plurality of connection links, that couples the first set of bi-directional nodes to each other, are determined in the first fractal node for processing the stimulus. The processing circuitry (such as the controller module 206, the context module 210, the stimuli management module 212, and the bi-directional node management module 216) may determine the first set of bi-directional nodes and the first set of connection links in the first fractal node.

At 1112, an operation associated with the stimulus is executed based on the first set of bi-directional nodes and the first set of connection links. The processing circuitry (such as the controller module 206, the context module 210, the stimuli management module 212, and the bi-directional node management module 216) may execute the operation associated with the stimulus based on the first set of bi-directional nodes and the first set of connection links. FIG. 12 describes the execution of the operation associated with the stimulus in detail.

FIG. 12 illustrates a flowchart 1200 of a method for execution of the operation associated with the stimulus using the executable graph-based model 100, consistent with disclosed embodiments of the present disclosure. Referring to FIG. 12, at 1202, the first fractal node may receive an instruction to execute the operation associated with the stimulus. The processing circuitry (such as the controller module 206, the context module 210, the stimuli management module 212, and the bi-directional node management module 216) may receive, using the first fractal node, the instruction to execute the operation associated with the stimulus. The stimulus is indicative of the first set of bi-directional nodes and the first set of connection links. The first set of bi-directional nodes may include a first bi-directional node and a second bi-directional node. The first bi-directional node is coupled to the second bi-directional node by way of a first connection link of the first set of connection links. The first connection link may include an OCO and an ICO coupled to the first bi-directional node and the second bi-directional node, respectively. Thus, the first bi-directional node may receive the instruction to execute the operation associated with the stimulus.

At 1204, one or more generic overlay nodes and/or one or more bi-directional overlay nodes associated with the first bi-directional node may be executed to generate a first intermediate message. The processing circuitry (such as the controller module 206, the context module 210, the stimuli management module 212, and the bi-directional node management module 216) may execute the one or more generic overlay nodes and/or the one or more bi-directional overlay nodes associated with the first bi-directional node to generate the first intermediate message.

At 1206, one or more generic overlay nodes and/or one or more bi-directional overlay nodes associated with an outward group object associated with the first bi-directional node may be executed on the first intermediate message to generate a second intermediate message. The processing circuitry (such as the controller module 206, the context module 210, the stimuli management module 212, and the bi-directional node management module 216) may execute the one or more generic overlay nodes and/or the one or more bi-directional overlay nodes associated with the outward group object to generate the second intermediate message.

At 1208, one or more generic overlay nodes and/or one or more bi-directional overlay nodes associated with the OCO associated with the first bi-directional node may be executed on the second intermediate message to generate a third intermediate message. The processing circuitry (such as the controller module 206, the context module 210, the stimuli management module 212, and the bi-directional node management module 216) may execute the one or more generic overlay nodes and/or the one or more bi-directional overlay nodes associated with the OCO to generate the third intermediate message.

At 1210, one or more generic overlay nodes and/or one or more bi-directional overlay nodes associated with the ICO associated with the second bi-directional node may be executed on the third intermediate message to generate a fourth intermediate message. The processing circuitry (such as the controller module 206, the context module 210, and the stimuli management module 212) may execute the one or more generic overlay nodes and/or the one or more bi-directional overlay nodes associated with the ICO to generate the fourth intermediate message.

At 1212, one or more generic overlay nodes and/or one or more bi-directional overlay nodes associated with an inward group object associated with the second bi-directional node may be executed on the fourth intermediate message to generate a fifth intermediate message. The processing circuitry (such as the controller module 206, the context module 210, the stimuli management module 212, and the bi-directional node management module 216) may execute the one or more generic overlay nodes and/or the one or more bi-directional overlay nodes associated with the inward group object to generate the fifth intermediate message.

At 1214, one or more generic overlay nodes and/or one or more bi-directional overlay nodes associated with the second bi-directional node may be executed on the fifth intermediate message to generate a stimulus response for the stimulus. The processing circuitry (such as the controller module 206, the context module 210, the stimuli management module 212, and the bi-directional node management module 216) may execute the one or more generic overlay nodes and/or the one or more bi-directional overlay nodes associated with the second bi-directional node to generate the stimulus response for the stimulus.

The disclosed embodiments encompass numerous advantages including a simple and user-friendly implementation of the executable graph-based model 100 that may be in turn used to implement various complex and advanced applications. Further, the disclosed systems and methods allow for the facilitation of fractal nodes in the executable graph-based model 100. A fractal node includes the plurality of bi-directional nodes. As a result, a single instantiation and connection with an overlay node is sufficient for executing processing logic associated therewith on each bi-directional node of the plurality of bi-directional nodes. In addition, the plurality of bi-directional nodes may be associated with an operation, therefore only the fractal node is required to be loaded, by way of a single transaction, for execution of the operation which makes the loading and referring to the bi-directional nodes easier. Hence, the execution of the operation is also efficient as the time complexity and cost complexity associated therewith are optimized. Additionally, a first fractal node is associated with a second fractal node by way of a connection link that includes a primary role for the first fractal node and a secondary role for the second fractal node. The primary role and the secondary role indicate a capacity in which the first and second fractal nodes are mutually associated. To ensure optimal use of resources, the first and second fractal nodes are unloaded from the executable graph-based model 100 and stored in a storage element associated with the executable graph-based model 100. Subsequently, in an instance when the first fractal node may be required to be used, the first fractal node is loaded. The use of the first fractal node may also require the use of other fractal nodes associated with the first fractal node. Notably, the first fractal node is stored with an identifier of the second fractal node. This allows for an identification of the association between the first and second fractal nodes. Based on the identification the second fractal node gets loaded. This allows for a quick identification of fractal nodes associated with the first fractal node by way of dependency, inheritance, role, or the like. Such identification eliminates the requirement of executing multiple look-up operations for identifying the fractal nodes associated with the first fractal nodes. Hence, the fractal nodes may be loaded in significantly less time and thus increase throughput and decrease latency associated with operations performed in the overlay system. In a real-life scenario, when each fractal node in the executable graph-based model 100 is associated with multiple other fractal nodes, such an approach of identification of association among fractal nodes and loading of the fractal nodes allows for a seamless and simplified approach for implementing solutions associated with various domains. Additionally, the executable graph-based model 100 provides a provision to isolate one or more operations in a fractal node from remaining nodes in the executable graph-based model 100, thereby strengthening the security of the overlay system 202. Application areas of the systems and methods disclosed herein are fintech platforms, social media platforms, gaming platforms, research and analytics platforms, robotics, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems, and methods for facilitating a plurality of fractal nodes in the executable graph-based model. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
    a storage element configured to store an executable graph-based model that includes a plurality of fractal nodes; and
    processing circuitry that is coupled to the storage element, and configured to:
        receive a stimulus associated with the overlay system;
        identify, based on the stimulus, a first fractal node from the plurality of fractal nodes, wherein the first fractal node includes a first plurality of bi-directional nodes and a first plurality of connection links;
        determine, in the first fractal node, for processing the stimulus, (i) a first set of bi-directional nodes of the first plurality of bi-directional nodes, and (ii) a first set of connection links, of the first plurality of connection links, that couples the first set of bi-directional nodes to each other; and
        execute an operation associated with the stimulus based on the first set of bi-directional nodes and the first set of connection links.

2. The overlay system of 1,
   wherein the first set of bi-directional nodes includes a first bi-directional node and a second bi-directional node that are coupled by way of a first connection link of the first set of connection links, and
   wherein the first connection link includes a first outward connection object and a first inward connection object that define association with the first bi-directional node and the second bi-directional node, respectively.

3. The overlay system of 1,
   wherein the executable graph-based model further includes a plurality of overlay nodes,
   wherein the processing circuitry is further configured to identify, from the plurality of overlay nodes, a first set of overlay nodes that is associated with the first fractal node,
   wherein the first set of overlay nodes is configured to extend functionality of at least one of a group consisting of the first fractal node or one or more bi-directional nodes of the first set of bi-directional nodes, and
   wherein the operation associated with the stimulus is executed further based on the first set of overlay nodes.

4. The overlay system of 3,
   wherein the processing circuitry is further configured to identify, from the plurality of overlay nodes, a second set of overlay nodes that is associated with a first bi-directional node of the first set of bi-directional nodes,
   wherein the second set of overlay nodes is configured to extend functionality of the first bi-directional node, and
   wherein during the execution of the operation associated with the stimulus, the first set of overlay nodes overrides the second set of overlay nodes.

5. The overlay system of 3, wherein the first set of overlay nodes extends functionality of at least one of the group consisting of the first fractal node or the one or more bi-directional nodes based on a set of rules associated with each overlay node of the first set of overlay nodes.

6. The overlay system of 3, wherein an overlay node of the plurality of overlay nodes corresponds to one of a group consisting of a bi-directional overlay node or a generic overlay node.

7. The overlay system of 1,
   wherein the executable graph-based model further includes a plurality of overlay nodes,
   wherein the processing circuitry is further configured to identify, from the plurality of overlay nodes, a set of overlay nodes that is associated with a first bi-directional node of the first set of bi-directional nodes,
   wherein the set of overlay nodes is configured to extend functionality of the first bi-directional node, and
   wherein the operation associated with the stimulus is executed further based on the set of overlay nodes.

8. The overlay system of 1,
   wherein the first set of bi-directional nodes includes a first bi-directional node,
   wherein the executable graph-based model further includes a third bi-directional node and a second connection link that couples the first bi-directional node to the third bi-directional node,
   wherein the second connection link includes a second inward connection object and a second outward connection object that define association with the first bi-directional node and the third bi-directional node, respectively, and
   wherein the operation associated with the stimulus is executed further based on the third bi-directional node and the second connection link.

9. The overlay system of 8, wherein the first bi-directional node is public such that the coupling between the first bi-directional node and the third bi-directional node corresponds to a direct coupling.

10. The overlay system of 8,
    wherein the first bi-directional node is private such that the coupling between the first bi-directional node and the third bi-directional node corresponds to an indirect coupling,
    wherein the first fractal node further includes a first port that is configured to facilitate the indirect coupling between the first bi-directional node and the third bi-directional node, and
    wherein the operation associated with the stimulus is executed further based on the first port.

11. The overlay system of 10, wherein the first port is further configured to expose the second inward connection object to the third bi-directional node.

12. The overlay system of 10,
    wherein the executable graph-based model further includes a fourth bi-directional node and a third connection link that couples the first bi-directional node to the fourth bi-directional node,
    wherein the third connection link includes a third inward connection object and a third outward connection object that define association with the first bi-directional node and the fourth bi-directional node, respectively,
    wherein the second inward connection object and the third inward connection object constitute a first inward group object associated with the first bi-directional node, and
    wherein the operation associated with the stimulus is executed further based on the first inward group object, the fourth bi-directional node, and the third connection link.

13. The overlay system of 12, wherein the first port is further configured to expose the first inward group object to the third bi-directional node and the fourth bi-directional node.

14. The overlay system of 12,
    wherein the executable graph-based model further includes a plurality of overlay nodes,
    wherein the processing circuitry is further configured to identify, from the plurality of overlay nodes, a set of overlay nodes that is associated with the first inward group object,
    wherein the set of overlay nodes is configured to extend functionality of the first inward group object, and
    wherein the operation associated with the stimulus is executed further based on the set of overlay nodes.

15. The overlay system of 1,
    wherein the first set of bi-directional nodes includes a first bi-directional node,
    wherein the executable graph-based model further includes (i) a fifth bi-directional node, (ii) a fourth connection link that couples the first bi-directional node to the fifth bi-directional node, (iii) a sixth bi-directional node, (iv) a fifth connection link that couples the first bi-directional node to the sixth bi-directional node, wherein the fourth connection link includes a fourth outward connection object and a fourth inward connection object that define association with the first bi-directional node and the fifth bi-directional node, respectively, wherein the fifth connection link includes a fifth outward connection object and a fifth inward connection object that define association with the first bi-directional node and the sixth bi-directional node, respectively, wherein the fourth outward connection object and the fifth outward connection object constitute a first outward group object associated with the first bi-directional node, and wherein the operation associated with the stimulus is executed further based on the first outward group object, the fifth bi-directional node, the sixth bi-directional node, the fourth connection link, and the fifth connection link.

16. The overlay system of 15, wherein the executable graph-based model further includes a plurality of overlay nodes, wherein the processing circuitry is further configured to identify, from the plurality of overlay nodes, a set of overlay nodes that is associated with the first outward group object, wherein the set of overlay nodes is configured to extend functionality of the first outward group object, and wherein the operation associated with the stimulus is executed further based on the set of overlay nodes.

17. The overlay system of 1, wherein the executable graph-based model further includes a second plurality of connection links, wherein the processing circuitry is further configured to:

determine a sixth connection link, of the second plurality of connection links, that is coupled to the first fractal node, the sixth connection link including a sixth outward connection object defining association with the first fractal node and a sixth inward connection object defining association with a second fractal node of the plurality of fractal nodes; and identify, based on the sixth connection link, the second fractal node in the executable graph-based model, and wherein the operation associated with the stimulus is executed further based on the second fractal node and the sixth connection link.

18. The overlay system of 17, wherein the second fractal node includes a second plurality of bi-directional nodes and a third plurality of connection links, wherein the processing circuitry is further configured to determine, in the second fractal node, for processing the stimulus, (i) a second set of bi-directional nodes of the second plurality of bi-directional nodes, and (ii) a second set of connection links, of the third plurality of connection links, that couples the second set of bi-directional nodes to each other, and wherein the operation associated with the stimulus is executed further based on the second set of bi-directional nodes and the second set of connection links.

19. The overlay system of 18, wherein the first set of bi-directional nodes and the second set of bi-directional nodes include at least one common bi-directional node.

20. The overlay system of 17, wherein the sixth outward connection object and the sixth inward connection object have a primary role and a secondary role, respectively, wherein the primary role and the secondary role, collectively, indicate a capacity in which the first fractal node and the second fractal node are mutually associated, and wherein the operation associated with the stimulus is executed in conformity with the primary role and the secondary role.

21. The overlay system of 20, wherein the primary role and the secondary role are complementary.

22. The overlay system of 20, wherein the sixth connection link is a bi-directional node with a role node-type.

23. The overlay system of 17, wherein the sixth connection link is indicative of a dependency between the first fractal node and the second fractal node, and wherein the dependency between the first fractal node and the second fractal node is one of a group consisting of an own-owned dependency, a use-used dependency, or a share-shared dependency.

24. The overlay system of 23, wherein based on the dependency being the own-owned dependency, the first fractal node owns the second fractal node.

25. The overlay system of 23, wherein based on the dependency being the share-shared dependency, the first fractal node shares the second fractal node with one or more fractal nodes of the plurality of fractal nodes.

26. The overlay system of 23, wherein based on the dependency being the use-used dependency, the first fractal node uses the second fractal node based on an absence of simultaneous use of the second fractal node by one or more other fractal nodes of the plurality of fractal nodes.

27. The overlay system of 17, wherein the first fractal node is further coupled to a third fractal node of the plurality of fractal nodes by way of a seventh connection link of the second plurality of connection links, wherein the seventh connection link includes a seventh outward connection object and a seventh inward connection object that define association with the first fractal node and the third fractal node, respectively, wherein the sixth outward connection object and the seventh outward connection object constitute a second outward group object associated with the first fractal node, and wherein the operation associated with the stimulus is executed further based on the second outward group object, the third fractal node, and the seventh connection link.

28. The overlay system of 27, wherein the executable graph-based model further includes a plurality of overlay nodes, wherein the processing circuitry is further configured to identify, from the plurality of overlay nodes, a set of overlay nodes that is associated with the second outward group object, wherein the set of overlay nodes is configured to extend functionality of the second outward group object, and wherein the operation associated with the stimulus is executed further based on the set of overlay nodes.

29. The overlay system of 1, wherein the executable graph-based model further includes a second plurality of connection links that include (i) an eighth connection link that couples the first fractal node to a fourth fractal node of the plurality of fractal nodes and (ii) a ninth connection link that couples the first fractal node to a fifth fractal node of the plurality of fractal nodes, wherein the eighth connection link includes an eighth inward connection object and an eighth outward connection object that define association with the first fractal node and the fourth fractal node, respectively, wherein the ninth connection link includes a ninth inward connection object and a ninth outward connection object that define association with the first fractal node and the fifth fractal node, respectively, wherein the eighth inward connection object and the ninth inward connection object constitute a second inward group object associated with the first fractal node, and wherein the operation associated with the stimulus is executed further based on the second inward group object, the fourth fractal node, the fifth fractal node, the eighth connection link, and the ninth connection link.

30. The overlay system of 29, wherein the executable graph-based model further includes a plurality of overlay nodes, wherein the processing circuitry is further configured to identify, from the plurality of overlay nodes, a set of overlay nodes that is associated with the second inward group object, wherein the set of overlay nodes is configured to extend functionality of the second inward group object, and wherein the operation associated with the stimulus is executed further based on the set of overlay nodes.

31. The overlay system of 1, wherein the first fractal node further includes a set of fractal nodes of the plurality of fractal nodes, and wherein the operation associated with the stimulus is executed further based on the set of fractal nodes.

32. The overlay system of 1, wherein each fractal node of the plurality of fractal nodes is a run-time node that includes a node template and a node instance, where the node template corresponds to a predefined node structure, whereas the node instance corresponds to an implementation of the node template.

33. The overlay system of 1, wherein prior to the execution of the operation associated with the stimulus, the processing circuitry is further configured to load, in the executable graph-based model, the first fractal node.

34. The overlay system of 33, wherein prior to the execution of the operation associated with the stimulus, the processing circuitry is further configured to:

identify, based on the stimulus, at least one of a group consisting of (i) one or more fractal nodes, (ii) one or more bi-directional nodes, or (iii) one or more overlay nodes, associated with the first fractal node; and load, in the executable graph-based model, at least one of the group consisting of (i) the one or more fractal nodes, (ii) the one or more bi-directional nodes, or (iii) the one or more overlay nodes, associated with the first fractal node.

35. The overlay system of 1, wherein upon execution of the operation associated with the stimulus, the processing circuitry is further configured to unload the first fractal node from the executable graph-based model.

36. The overlay system of 1, wherein upon execution of the operation associated with the stimulus, the processing circuitry is further configured to unload at least one of a group consisting of (i) one or more fractal nodes, (ii) one or more bi-directional nodes, or (iii) one or more overlay nodes, associated with the first fractal node, from the executable graph-based model.

37. The overlay system of 1, wherein the first fractal node is associated with a predefined operation.

38. The overlay system of 1, wherein the executable graph-based model further includes a plurality of generic nodes, wherein a node-type of each generic node of the plurality of generic nodes is one of a group consisting of a vertex node-type, an edge node-type, a role node-type, or an overlay node-type, wherein the first fractal node is associated with a first generic node of the plurality of generic nodes by way of a first generic role that indicates a capacity in which the first fractal node is associated with the first generic node, and wherein the operation associated with the stimulus is executed further based on the first generic node and the first generic role.

39. A method, comprising:

receiving, by processing circuitry of an overlay system, a stimulus associated with the overlay system, wherein an executable graph-based model is stored in a storage element of the overlay system, and wherein the executable graph-based model includes a plurality of fractal nodes;

identifying, by the processing circuitry, based on the stimulus, a first fractal node from the plurality of fractal nodes, wherein the first fractal node includes a first plurality of bi-directional nodes and a first plurality of connection links;

determining, by the processing circuitry, from the first fractal node, for processing the stimulus, a first set of bi-directional nodes and a first set of connection links that couples the first set of bi-directional nodes to each other; and executing, by the processing circuitry, an operation associated with the stimulus based on the first set of bi-directional nodes and the first set of connection links.

What is claimed is:

1. An overlay system, comprising:

a storage element configured to store an executable graph-based model that includes a plurality of fractal nodes; and processing circuitry that is coupled to the storage element, and configured to:

receive a stimulus associated with the overlay system;

identify, based on the stimulus, a first fractal node from the plurality of fractal nodes, wherein the first fractal node includes a first plurality of bi-directional nodes and a first plurality of connection links;

determine, in the first fractal node, for processing the stimulus, (i) a first set of bi-directional nodes of the first plurality of bi-directional nodes, and (ii) a first set of connection links, of the first plurality of connection links, that couples the first set of bi-directional nodes to each other; and execute an operation associated with the stimulus based on the first set of bi-directional nodes and the first set of connection links.

2. The overlay system of claim 1, wherein the first set of bi-directional nodes includes a first bi-directional node and a second bi-directional node that are coupled by way of a first connection link of the first set of connection links, and wherein the first connection link includes a first outward connection object and a first inward connection object that define association with the first bi-directional node and the second bi-directional node, respectively.

3. The overlay system of claim 1, wherein the executable graph-based model further includes a plurality of overlay nodes, wherein the processing circuitry is further configured to identify, from the plurality of overlay nodes, a first set of overlay nodes that is associated with the first fractal node, wherein the first set of overlay nodes is configured to extend functionality of at least one of a group consisting of the first fractal node or one or more bi-directional nodes of the first set of bi-directional nodes, wherein the first set of overlay nodes extends functionality of at least one of the group consisting of the first fractal node or the one or more bi-directional nodes based on a set of rules associated with each overlay node of the first set of overlay nodes, and wherein the operation associated with the stimulus is executed further based on the first set of overlay nodes.

4. The overlay system of claim 3, wherein the processing circuitry is further configured to identify, from the plurality of overlay nodes, a second set of overlay nodes that is associated with a first bi-directional node of the first set of bi-directional nodes, wherein the second set of overlay nodes is configured to extend functionality of the first bi-directional node, and wherein during the execution of the operation associated with the stimulus, the first set of overlay nodes overrides the second set of overlay nodes.

5. The overlay system of claim 1, wherein the executable graph-based model further includes a plurality of overlay nodes, wherein the processing circuitry is further configured to identify, from the plurality of overlay nodes, a set of overlay nodes that is associated with a first bi-directional node of the first set of bi-directional nodes, wherein the set of overlay nodes is configured to extend functionality of the first bi-directional node, and wherein the operation associated with the stimulus is executed further based on the set of overlay nodes.

6. The overlay system of claim 1, wherein the first set of bi-directional nodes includes a first bi-directional node, wherein the executable graph-based model further includes a third bi-directional node and a second connection link that couples the first bi-directional node to the third bi-directional node, wherein the second connection link includes a second inward connection object and a second outward connection object that define association with the first bi-directional node and the third bi-directional node, respectively, and wherein the operation associated with the stimulus is executed further based on the third bi-directional node and the second connection link.

7. The overlay system of claim 6, wherein the first bi-directional node is public such that the coupling between the first bi-directional node and the third bi-directional node corresponds to a direct coupling.

8. The overlay system of claim 6, wherein the first bi-directional node is private such that the coupling between the first bi-directional node and the third bi-directional node corresponds to an indirect coupling, wherein the first fractal node further includes a first port that is configured to facilitate the indirect coupling between the first bi-directional node and the third bi-directional node, wherein the operation associated with the stimulus is executed further based on the first port, and wherein the first port is further configured to expose the second inward connection object to the third bi-directional node.

9. The overlay system of claim 8, wherein the executable graph-based model further includes a fourth bi-directional node and a third connection link that couples the first bi-directional node to the fourth bi-directional node, wherein the third connection link includes a third inward connection object and a third outward connection object that define association with the first bi-directional node and the fourth bi-directional node, respectively, wherein the second inward connection object and the third inward connection object constitute a first inward group object associated with the first bi-directional node, wherein the operation associated with the stimulus is executed further based on the first inward group object, the fourth bi-directional node, and the third connection link, and wherein the first port is further configured to expose the first inward group object to the third bi-directional node and the fourth bi-directional node.

10. The overlay system of claim 1, wherein the first set of bi-directional nodes includes a first bi-directional node, wherein the executable graph-based model further includes (i) a fifth bi-directional node, (ii) a fourth connection link that couples the first bi-directional node to the fifth bi-directional node, (iii) a sixth bi-directional node, (iv) a fifth connection link that couples the first bi-directional node to the sixth bi-directional node, wherein the fourth connection link includes a fourth outward connection object and a fourth inward connection object that define association with the first bi-directional node and the fifth bi-directional node, respectively, wherein the fifth connection link includes a fifth outward connection object and a fifth inward connection object that define association with the first bi-directional node and the sixth bi-directional node, respectively, wherein the fourth outward connection object and the fifth outward connection object constitute a first outward group object associated with the first bi-directional node, and wherein the operation associated with the stimulus is executed further based on the first outward group object, the fifth bi-directional node, the sixth bi-directional node, the fourth connection link, and the fifth connection link.

11. The overlay system of claim 1,
wherein the executable graph-based model further includes a second plurality of connection links,
wherein the processing circuitry is further configured to:
determine a sixth connection link, of the second plurality of connection links, that is coupled to the first fractal node, the sixth connection link including a sixth outward connection object defining association with the first fractal node and a sixth inward connection object defining association with a second fractal node of the plurality of fractal nodes; and
identify, based on the sixth connection link, the second fractal node in the executable graph-based model, and
wherein the operation associated with the stimulus is executed further based on the second fractal node and the sixth connection link.

12. The overlay system of claim 11,
wherein the sixth outward connection object and the sixth inward connection object have a primary role and a secondary role, respectively,
wherein the primary role and the secondary role, collectively, indicate a capacity in which the first fractal node and the second fractal node are mutually associated, and
wherein the operation associated with the stimulus is executed in conformity with the primary role and the secondary role.

13. The overlay system of claim 11,
wherein the sixth connection link is indicative of a dependency between the first fractal node and the second fractal node,
wherein the dependency between the first fractal node and the second fractal node is one of a group consisting of an own-owned dependency, a use-used dependency, or a share-shared dependency,
wherein based on the dependency being the own-owned dependency, the first fractal node owns the second fractal node,
wherein based on the dependency being the share-shared dependency, the first fractal node shares the second fractal node with one or more fractal nodes of the plurality of fractal nodes, and
wherein based on the dependency being the use-used dependency, the first fractal node uses the second fractal node based on an absence of simultaneous use of the second fractal node by one or more other fractal nodes of the plurality of fractal nodes.

14. The overlay system of claim 11,
wherein the first fractal node is further coupled to a third fractal node of the plurality of fractal nodes by way of a seventh connection link of the second plurality of connection links,
wherein the seventh connection link includes a seventh outward connection object and a seventh inward connection object that define association with the first fractal node and the third fractal node, respectively,
wherein the sixth outward connection object and the seventh outward connection object constitute a second outward group object associated with the first fractal node, and
wherein the operation associated with the stimulus is executed further based on the second outward group object, the third fractal node, and the seventh connection link.

15. The overlay system of claim 14,
wherein the executable graph-based model further includes a plurality of overlay nodes,
wherein the processing circuitry is further configured to identify, from the plurality of overlay nodes, a set of overlay nodes that is associated with the second outward group object,
wherein the set of overlay nodes is configured to extend functionality of the second outward group object, and
wherein the operation associated with the stimulus is executed further based on the set of overlay nodes.

16. The overlay system of claim 1,
wherein the executable graph-based model further includes a second plurality of connection links that include (i) an eighth connection link that couples the first fractal node to a fourth fractal node of the plurality of fractal nodes and (ii) a ninth connection link that couples the first fractal node to a fifth fractal node of the plurality of fractal nodes,
wherein the eighth connection link includes an eighth inward connection object and an eighth outward connection object that define association with the first fractal node and the fourth fractal node, respectively,
wherein the ninth connection link includes a ninth inward connection object and a ninth outward connection object that define association with the first fractal node and the fifth fractal node, respectively,
wherein the eighth inward connection object and the ninth inward connection object constitute a second inward group object associated with the first fractal node, and
wherein the operation associated with the stimulus is executed further based on the second inward group object, the fourth fractal node, the fifth fractal node, the eighth connection link, and the ninth connection link.

17. The overlay system of claim 16,
wherein the executable graph-based model further includes a plurality of overlay nodes,
wherein the processing circuitry is further configured to identify, from the plurality of overlay nodes, a set of overlay nodes that is associated with the second inward group object,
wherein the set of overlay nodes is configured to extend functionality of the second inward group object, and
wherein the operation associated with the stimulus is executed further based on the set of overlay nodes.

18. The overlay system of claim 1,
wherein the first fractal node further includes a set of fractal nodes of the plurality of fractal nodes, and
wherein the operation associated with the stimulus is executed further based on the set of fractal nodes.

19. The overlay system of claim 1, wherein each fractal node of the plurality of fractal nodes is a run-time node that includes a node template and a node instance, where the node template corresponds to a predefined node structure, whereas the node instance corresponds to an implementation of the node template.

20. A method, comprising:
receiving, by processing circuitry of an overlay system, a stimulus associated with the overlay system,
wherein an executable graph-based model is stored in a storage element of the overlay system, and
wherein the executable graph-based model includes a plurality of fractal nodes;
identifying, by the processing circuitry, based on the stimulus, a first fractal node from the plurality of fractal nodes, wherein the first fractal node includes a first plurality of bi-directional nodes and a first plurality of connection links;

determining, by the processing circuitry, from the first fractal node, for processing the stimulus, a first set of bi-directional nodes and a first set of connection links that couples the first set of bi-directional nodes to each other; and executing, by the processing circuitry, an operation associated with the stimulus based on the first set of bi-directional nodes and the first set of connection links.

\* \* \* \* \*